United States Patent
Schmeling et al.

(10) Patent No.: US 12,539,425 B2
(45) Date of Patent: Feb. 3, 2026

(54) THERAPY PROGRAMMING BASED ON EVOKED COMPOUND ACTION POTENTIALS

(71) Applicant: Medtronic, Inc., Minneapolis, MN (US)

(72) Inventors: Andrew L. Schmeling, Holmen, WI (US); Rebecca A. Miron, Center City, MN (US); Christopher J. Edwards, Mahtomedi, MN (US); David W. Simons, Edina, MN (US); Nikita Tandon, San Jose, CA (US); Reid K. Bornhoft, Lina Lakes, MN (US)

(73) Assignee: Medtronic, Inc., Minneapolis, MN (US)

( * ) Notice: Subject to any disclaimer, the term of this patent is extended or adjusted under 35 U.S.C. 154(b) by 606 days.

(21) Appl. No.: 18/049,960

(22) Filed: Oct. 26, 2022

(65) Prior Publication Data
US 2023/0149722 A1    May 18, 2023

Related U.S. Application Data

(60) Provisional application No. 63/280,976, filed on Nov. 18, 2021, provisional application No. 63/280,967, filed on Nov. 18, 2021.

(51) Int. Cl.
*A61N 1/372* (2006.01)
*A61N 1/36* (2006.01)

(52) U.S. Cl.
CPC ..... *A61N 1/37247* (2013.01); *A61N 1/36139* (2013.01); *A61N 1/36071* (2013.01)

(58) Field of Classification Search
CPC ............ A61N 1/37247; A61N 1/36139; A61N 1/36071; A61N 1/36062; A61N 1/025;
(Continued)

(56) References Cited

U.S. PATENT DOCUMENTS 8,190,268 B2    5/2012 Botros et al.
10,183,168 B2   1/2019 Baru et al.
(Continued)

FOREIGN PATENT DOCUMENTS

AU    2014302297 A1 * 12/2015 ......... A61N 1/36139
WO    2020/087135 A1    5/2020
WO    2021126432 A1    6/2021

OTHER PUBLICATIONS

U.S. Appl. No. 18/049,971, filed Oct. 26, 2022, naming inventors Schmeling et al.
(Continued)

*Primary Examiner* — Carl H Layno
*Assistant Examiner* — Mary Grace Schlueter
(74) *Attorney, Agent, or Firm* — Shumaker & Sieffert, P.A.

(57) ABSTRACT

This disclosure is directed to devices, systems, and techniques for controlling electrical stimulation. In some examples, a computing device includes a therapy-management application configured to assist a user to: capture a representative evoked compound action potential (ECAP) signal from a patient based; apply one or more filters to the representative ECAP signal to select one or more parameters of the representative ECAP signal; and control electrical stimulation therapy based at least in part on the one or more parameters.

20 Claims, 20 Drawing Sheets

(58) Field of Classification Search
CPC ............... A61N 1/36125; A61N 1/108; A61N 1/36171; A61N 1/36178; A61N 1/36192
USPC .................................. 607/46; 600/547, 554
See application file for complete search history.

(56) References Cited

U.S. PATENT DOCUMENTS

| | | |
|---|---|---|
| 10,213,148 B2 | 2/2019 | Min et al. |
| 10,279,182 B2 | 5/2019 | Hou et al. |
| 2008/0270188 A1 | 10/2008 | Garg et al. |
| 2014/0214129 A1 | 7/2014 | Waataja et al. |
| 2017/0106193 A1 | 4/2017 | Carcieri |
| 2019/0099602 A1* | 4/2019 | Esteller .............. A61N 1/37241 |
| 2019/0275334 A1 | 9/2019 | Hou et al. |
| 2019/0365271 A1 | 12/2019 | Ghosh et al. |
| 2019/0388692 A1* | 12/2019 | Dinsmoor .......... A61N 1/36153 |
| 2019/0388695 A1 | 12/2019 | Dinsmoor et al. |
| 2020/0171313 A1 | 6/2020 | Dinsmoor et al. |
| 2020/0230410 A1 | 7/2020 | Zhang et al. |
| 2021/0001133 A1 | 1/2021 | Williams et al. |
| 2021/0046322 A1* | 2/2021 | Zhang ................. A61N 1/0551 |
| 2021/0121699 A1 | 4/2021 | Dinsmoor et al. |
| 2021/0162215 A1* | 6/2021 | Torgerson .......... A61N 1/36062 |
| 2021/0244356 A1 | 8/2021 | Sun et al. |
| 2021/0252287 A1 | 8/2021 | Esteller et al. |
| 2021/0275817 A1 | 9/2021 | Li |

OTHER PUBLICATIONS

Response to Communication pursuant to Article 94(3) EPC dated Feb. 7, 2024, from counterpart European Application No. 222206997.3 filed Jun. 3, 2024, 7 pp.
Extended Search Report from counterpart European Application No. 22206997.3 dated Mar. 21, 2023, 8 pp.
Communication pursuant to Article 94(3) EPC from counterpart European Application No. 222206997.3 dated Feb. 7, 2024, 4 pp.
Response to Extended Search Report dated Mar. 21, 2023, from counterpart European Application No. 22206997.3 filed Nov. 2, 2023, 22 pp.

* cited by examiner

FIG. 6G

THERAPY PROGRAMMING BASED ON EVOKED COMPOUND ACTION POTENTIALS

This application claims the benefit of U.S. Provisional Patent Application No. 63/280,976, filed Nov. 18, 2021 and U.S. Provisional Patent Application No. 63/280,967, filed Nov. 18, 2021, the entire contents of each application is incorporated herein by reference.

TECHNICAL FIELD

This disclosure generally relates to electrical stimulation therapy, and more specifically, control of electrical stimulation therapy.

BACKGROUND

Medical devices may be external or implanted and may be used to deliver electrical stimulation therapy to patients via various tissue sites to treat a variety of symptoms or conditions such as chronic pain, tremor, Parkinson's disease, epilepsy, urinary or fecal incontinence, sexual dysfunction, obesity, or gastroparesis. A medical device may deliver electrical stimulation therapy via one or more leads that include electrodes located proximate to target locations associated with the brain, the spinal cord, pelvic nerves, peripheral nerves, or the gastrointestinal tract of a patient. Stimulation proximate the spinal cord, proximate the sacral nerve, within the brain, and proximate peripheral nerves are often referred to as spinal cord stimulation (SCS), sacral neuromodulation (SNM), deep brain stimulation (DBS), and peripheral nerve stimulation (PNS), respectively.

An evoked compound action potential (ECAP) is synchronous firing of a population of neurons which occurs in response to the application of a stimulus including, in some cases, an electrical stimulus by a medical device. The ECAP may be detectable as being a separate event from the stimulus itself, and the ECAP may reveal characteristics of the effect of the stimulus on the nerve fibers. Electrical stimulation may be delivered to a patient by the medical device in a train of electrical pulses, and parameters of the electrical pulses may include a frequency, an amplitude, a pulse width, and a pulse shape. The parameters of the electrical pulses may be altered in response to sensory input, such as ECAPs sensed in response to the train of electrical pulses. Such alterations may affect the patient's perception of the electrical pulses, or lack thereof.

SUMMARY

In general, this disclosure is directed to devices, systems, and techniques for controlling electrical stimulation therapy. For example, a computing device running a therapy-management application is configured to interface with a medical device to control a level of electrical stimulation based on a sensed plurality of evoked compound action potentials (ECAPs). The computing device, in some cases, may cause the medical device to reduce an intensity of stimulation pulses in response to a characteristic of a detected ECAP signal exceeding a "reaction" threshold ECAP value, and increase the intensity of stimulation pulses in response to the characteristic of a detected ECAP signal dropping below a "recovery" threshold ECAP value. Accordingly, the therapy-management applications described herein include a graphical user interface (GUI) enabling a user to customize these threshold values.

In some cases, it may be beneficial to initially program, or change, a control policy that defines the electrical stimulation, e.g., in order to account for patient-specific characteristics, movement of electrodes coupled to the medical device, or other variables. More specifically, the therapy-management applications of this disclosure not only enable customization and execution of a control policy defining parameters of the electrical stimulation, but also real-time user-modification of the control policy based on feedback displayed via the GUI. As detailed further below, a therapy-management application GUI can include one or more different screens or windows enabling such functionality, such as: a capture-signal screen, a review-signal screen, and a configure-thresholds screen. The capture-signal screen may be configured to guide a patient through a process for capturing a representative ECAP signal which the therapy-management application may then use to inform selection of default ECAP thresholds and/or other therapy parameters. The review-signal screen can enable a user to analyze and manipulate the representative ECAP signal, e.g., by applying one or more filters, in order to further refine the ECAP thresholds and/or other therapy parameters. The configure-threshold screen may enable a user, in real time, to modify ECAP thresholds as well as target amplitude(s) for stimulation therapy for adjusting how ECAP signals can be used as feedback to modulate electrical stimulation.

In some examples, a system includes a user interface and processing circuitry. The processing circuitry is configured to: receive data indicative of a plurality of evoked compound action potentials (ECAPs) sensed from a patient; control a user interface to display the data over a time window; identify an amplitude in the data at a specific time in the time window, wherein the amplitude exceeds a threshold amplitude; control the user interface to display a slidable marker that identifies the amplitude at the specific time over the displayed data, wherein the slidable marker is configured to be user-movable to different times within the time window; and control the user interface to display an ECAP waveform corresponding to the amplitude identified by the slidable marker.

In another example, a method includes: receiving, by processing circuitry, data indicative of a plurality of evoked compound action potentials (ECAPs) sensed from a patient; controlling, by the processing circuitry, a user interface to display the data over a time window; identifying, by the processing circuitry, an amplitude in the data at a specific time in the time window, wherein the amplitude exceeds a threshold amplitude; controlling, by the processing circuitry, the user interface to display a slidable marker that identifies the amplitude at the specific time over the displayed data, wherein the slidable marker is configured to be user-movable to different times within the time window; and controlling, by the processing circuitry, the user interface to display an ECAP waveform corresponding to the amplitude identified by the slidable marker.

In another example, a method includes: receiving an ECAP signal; determining, based on the ECAP signal, one or more parameters for electrical stimulation therapy; and outputting for display a configure-thresholds screen of a graphical user interface (GUI), wherein the configure-thresholds screen comprises: a sensed-signal graph displaying the ECAP signal over time; a stimulation-amplitude graph displaying the one or more determined parameters for the electrical stimulation therapy over time; a target-amplitude widget configured to receive first user input indicating a desired change in a target amplitude of at least one therapy program of the electrical stimulation therapy; and an ECAP thresholds widget configured to receive second user input indicating a desired change in an amplitude of an ECAP threshold for adjusting the one or more parameters for the electrical stimulation therapy.

The summary is intended to provide an overview of the subject matter described in this disclosure. It is not intended to provide an exclusive or exhaustive explanation of the systems, device, and methods described in detail within the accompanying drawings and description below. Further details of one or more examples of this disclosure are set forth in the accompanying drawings and in the description below. Other features, objects, and advantages will be apparent from the description and drawings, and from the claims.

BRIEF DESCRIPTION OF DRAWINGS

FIGS. 6G-6I are examples of a capture-signal screen of the GUI of FIGS. 6A-6F.

Like reference characters denote like elements throughout the description and figures.

DETAILED DESCRIPTION

Figure 1:
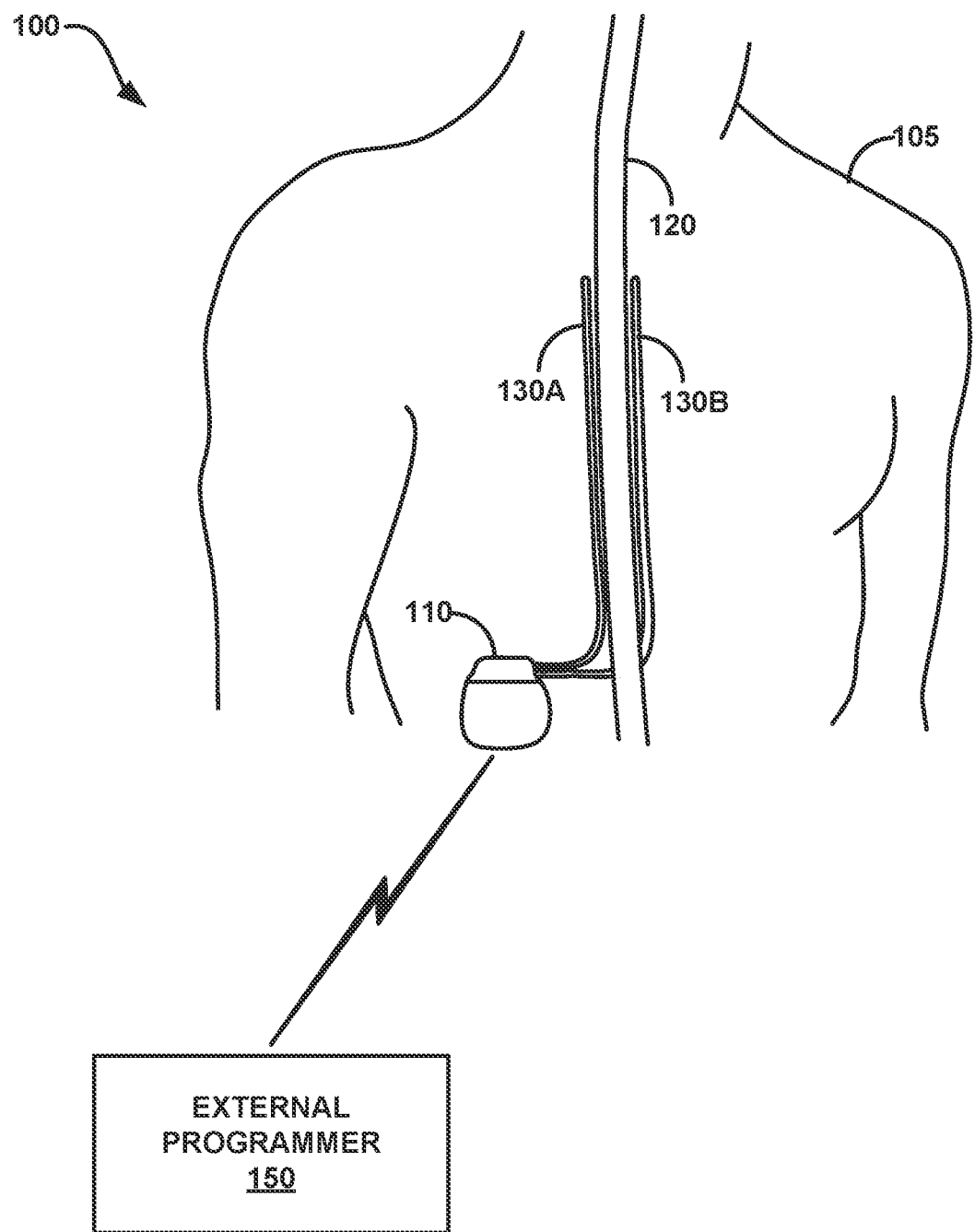
FIG. 1 is a conceptual diagram illustrating an example system that includes an implantable medical device (IMD) configured to deliver spinal cord stimulation (SCS) therapy and an external programmer.

This disclosure describes examples of medical devices, systems, and techniques for setting or adjusting parameters that define a control policy employed by a medical device to make automatic adjustments to stimulation parameters that define electrical stimulation. A medical device may thus automatically adjust electrical stimulation therapy delivered to a patient based on the control policy and one or more characteristics of evoked compound action potentials (ECAPs) received by a medical device. In particular, this disclosure describes therapy-management applications (e.g., software or programs running on a computing device interfaced with a medical device) for initially programming and/or adjusting the control policy that the medical device employs to adjust stimulation parameter values that define the electrical stimulation therapy.

Electrical stimulation therapy is typically delivered to a target tissue (e.g., one or more nerves or muscle) of a patient via two or more electrodes. Parameters of the electrical stimulation therapy (e.g., electrode combination, voltage or current amplitude, pulse width, pulse frequency, etc.) are selected by a clinician and/or the patient to provide relief from various symptoms, such as pain, muscle disorders, etc. However, as the patient moves, the distance between the electrodes and the target tissues changes. Posture changes or patient activity can cause electrodes to move closer or farther from target nerves. Lead migration over time may also change this distance between electrodes and target tissue. In some examples, transient patient conditions such as coughing, sneezing, laughing, Valsalva maneuvers, leg lifting, cervical motions, or deep breathing may temporarily cause the stimulation electrodes of the medical device to move closer to the target tissue of the patient, intermittently changing the patient's perception of electrical stimulation therapy.

Since neural recruitment is a function of stimulation intensity and distance between the target tissue and the electrodes, movement of the electrode closer to the target tissue may result in increased perception by the patient (e.g., possible uncomfortable, undesired, or painful sensations), and movement of the electrode further from the target tissue may result in decreased efficacy of the therapy for the patient. For example, if stimulation is held consistent and the stimulation electrodes are moved closer to the target tissue, the patient may perceive the stimulation as more intense, uncomfortable, or even painful. Conversely, consistent stimulation while electrodes are moved farther from target tissue may result in the patient perceiving less intense stimulation which may reduce the therapeutic effect for the patient. Discomfort or pain caused by transient patient conditions may be referred to herein as "transient overstimulation." Therefore, in some examples, it may be beneficial to adjust stimulation parameters in response to patent movement or other conditions that can cause transient overstimulation.

An ECAP may be evoked by a stimulation pulse delivered to nerve fibers of the patient. After being evoked, the ECAP may propagate down the nerve fibers away from the initial stimulus. Sensing circuitry of the medical device may, in some cases, detect this ECAP. Characteristics of the detected ECAP signal may indicate the distance between electrodes and target tissue is changing. For example, a sharp increase in ECAP amplitude over a short period of time (e.g., less than one second) may indicate that the distance between the electrodes and the target tissue is decreasing due to a transient patient action such as a cough. A gradual increase in ECAP amplitude over a longer period of time (e.g., days, weeks, or months) may indicate that the distance between the electrodes and the target tissue is decreasing due to long-term lead migration after the medical device is implanted. It may be beneficial to adjust one or more therapy parameter values in order to prevent the patient from experiencing uncomfortable sensations due to one or both of short-term movement of the electrodes relative to the target tissue and long-term movement of the electrodes relative to the target tissue.

Certain "transient" patient actions may cause a distance between the electrodes and the target tissue to temporarily change during the respective transient patient action. This transient patient action may include one or more quick movements on the order of seconds or less. During this transient movement, the distance between the electrodes and the target tissue may change and affect the patient's perception of the electrical stimulation therapy delivered by the medical device. If stimulation pulses are constant and the electrodes move closer to the target tissue, the patient may experience a greater or heightened "feeling" or sensation from the therapy. This heightened feeling may be perceived as discomfort or pain (e.g., transient overstimulation) in response to the electrodes moving closer to the target tissue. ECAPs are a measure of neural recruitment because each ECAP signal represents the superposition of electrical potentials generated from axons firing in response to an electrical stimulus (e.g., a stimulation pulse). Changes in a characteristic (e.g., an amplitude of a portion of the signal) of an ECAP signal occurs as a function of how many axons have been activated by the delivered stimulation pulse.

Since ECAPs may provide an indication of the patient's perception of the electrical stimulation therapy, the medical device may decrease one or more parameters of stimulation pulses delivered to the target tissue in response to a first ECAP exceeding a "reaction" threshold ECAP characteristic value. By decreasing the one or more parameters of the informed pulses, the medical device may prevent the patient from experiencing transient overstimulation. Conversely, if the medical device determines that sensed ECAPs have fallen below a "recovery" threshold ECAP characteristic value, the medical device may restore, or begin to restore over time, the stimulation pulses to parameter values that were set before the medical device decreased the one or more parameters of the stimulation pulses in response to the exceeded reaction threshold ECAP value.

A graphical user interface (GUI) of a therapy-management application may facilitate the initial set-up for using ECAPs as feedback to control stimulation therapy. The GUI may include a set of prompts for display to a user interface (UI) of an external device, enabling a patient to provide a set of responses indicating aspects of one or more sensations experienced by the patient. For example, the set of prompts may include a prompt for the patient to perform a physical action that may change the ECAP signal from a state before and/or after the physical action. Additionally, the set of prompts may include one or more prompts for the patient to characterize one or more sensations before, during, or after the action performed by the patient. Based on the set of responses, processing circuitry may execute the algorithm to provide one or more changes to the control policy that determines adjustments to stimulation parameters defining therapy delivered to the target tissue. The processing circuitry may automatically change the one or more parameters of the control policy based on the recommendation, but this is not required.

The techniques described herein may provide one or more advantages. For example, the GUI may enable a user to select and/or confirm ECAP signals appropriate for detecting one or more physical actions of the patient. The GUI may accept use adjustments to sensing windows or other aspects of ECAP sensing which may improve the capture of each ECAP signal. In addition, the use may select different filtering algorithms in order to improve signal to noise ratio or other sensing characteristics. In some examples, the GUI may be configured to receive user input selecting one or more thresholds to which ECAP characteristic values are compared to adjust one or more stimulation parameters of subsequent stimulation. In addition, the GUI may provide a step-by-step process for initially setting up one or more of these aspects to closed-loop stimulation based on ECAP signals which can facilitate user input and simplify closed-loop stimulation set-up or adjustment.

In some examples, the medical device may deliver stimulation that includes pulses (e.g., control pulses) that contribute to therapy and also elicit detectable ECAP signals. In other examples, the medical device may deliver the stimulation pulses to include control (or "ping") pulses and informed pulses. Nerve impulses detectable as the ECAP signal travel quickly along the nerve fiber after the delivered stimulation pulse first depolarizes the nerve. Therefore, if the stimulation pulse delivered by first electrodes has a pulse width that is too long, different electrodes configured to sense the ECAP will sense the stimulation pulse itself as an artifact that obscures the lower amplitude ECAP signal. However, the ECAP signal loses fidelity as the electrical potentials propagate from the electrical stimulus because different nerve fibers propagate electrical potentials at different speeds. Therefore, sensing the ECAP at a large distance from the stimulating electrodes may avoid the artifact caused by a stimulation pulse with a long pulse width, but the ECAP signal may lose fidelity needed to detect changes to the ECAP signal that occur when the electrode to target tissue distance changes. In other words, the system may not be able to identify, at any distance from the stimulation electrodes, ECAPs from stimulation pulses configured to provide a therapy to the patient. Therefore, the medical device may employ control pulses configured to elicit detectable ECAPs and informed pulses that may contribute to therapeutic effects for the patient by may not elicit detectable ECAPs.

In these examples, a medical device is configured to deliver a plurality of informed pulses configured to provide a therapy to the patient and a plurality of control pulses that may or may not contribute to therapy. At least some of the control pulses may elicit a detectable ECAP signal without the primary purpose of providing a therapy to the patient. The control pulses may be interleaved with the delivery of the informed pulses. For example, the medical device may alternate the delivery of informed pulses with control pulses such that a control pulse is delivered, and an ECAP signal is sensed, between consecutive informed pulses. In some examples, multiple control pulses are delivered, and respective ECAP signals sensed, between the delivery of consecutive informed pulses. In some examples, multiple informed pulses will be delivered between consecutive control pulses. In any case, the informed pulses may be delivered according to a predetermined pulse frequency selected so that the informed pulses can produce a therapeutic result for the patient. One or more control pulses are then delivered, and the respective ECAP signals sensed, within one or more time windows between consecutive informed pulses delivered according to the predetermined pulse frequency. In this manner, a medical device can deliver informed pulses from the medical device uninterrupted while ECAPs are sensed from control pulses delivered during times at which the informed pulses are not being delivered. In other examples described herein, ECAPs are sensed by the medical device in response to the informed pulses delivered by the medical device, and control pulses are not used to elicit ECAPs.

In some examples, a medical device is configured to deliver stimulation pulses as including control pulses or a combination of a plurality of control pulses and a plurality of informed pulses. The plurality of control pulses, in some cases, may be therapeutic and contribute to therapy received by the patient. In other examples, the plurality of the control pulses may be non-therapeutic and not contribute to the therapy received by the patient. Put another way, the control pulses configured to elicit detectable ECAPs may or may not contribute to alleviating the patient's condition or symptoms of the patient's condition. In contrast to control pulses, informed pulses may not elicit a detectable ECAP or the system may not utilize ECAPs from informed pulses as feedback to control therapy. Therefore, the medical device or other component associated with the medical device may determine values of one or more stimulation parameters that at least partially define the informed pulses based on an ECAP signal elicited by a control pulse instead. In this manner, the informed pulse may be informed by the ECAP elicited from a control pulse. The medical device or other component associated with the medical device may determine values of one or more stimulation parameters that at least partially define the control pulses based on an ECAP signal elicited by previous control pulse.

Although electrical stimulation is generally described herein in the form of electrical stimulation pulses, electrical stimulation may be delivered in non-pulse form in other examples. For example, electrical stimulation may be delivered as a signal having various waveform shapes, frequencies, and amplitudes. Therefore, electrical stimulation in the form of a non-pulse signal may be a continuous signal than may have a sinusoidal waveform or other continuous waveform.

FIG. 1 is a conceptual diagram illustrating an example system 100 that includes an implantable medical device (IMD) 110 configured to deliver spinal cord stimulation (SCS) therapy and an external programmer 150, in accordance with one or more techniques of this disclosure. Although the techniques described in this disclosure are generally applicable to a variety of medical devices including external devices and IMDs, application of such techniques to IMDs and, more particularly, implantable electrical stimulators (e.g., neurostimulators) will be described for purposes of illustration. More particularly, the disclosure will refer to an implantable SCS system for purposes of illustration, but without limitation as to other types of medical devices or other therapeutic applications of medical devices.

As shown in FIG. 1, system 100 includes an IMD 110, leads 130A and 130B, and external programmer 150 shown in conjunction with a patient 105, who is ordinarily a human patient. In the example of FIG. 1, 1 MB 110 is an implantable electrical stimulator that is configured to generate and deliver electrical stimulation therapy to patient 105 via one or more electrodes of electrodes of leads 130A and/or 130B (collectively, "leads 130"), e.g., for relief of chronic pain or other symptoms. In other examples, IMD 110 may be coupled to a single lead carrying multiple electrodes or more than two leads each carrying multiple electrodes. As a part of delivering stimulation pulses of the electrical stimulation therapy, IMD 110 may be configured to generate and deliver control pulses configured to elicit ECAP signals. The control pulses may provide therapy in some examples. In other examples, IMD 110 may deliver informed pulses that contribute to the therapy for the patient, but which do not elicit detectable ECAPs. IMD 110 may be a chronic electrical stimulator that remains implanted within patient 105 for weeks, months, or even years. In other examples, IMD 110 may be a temporary, or trial, stimulator used to screen or evaluate the efficacy of electrical stimulation for chronic therapy. In one example, IMD 110 is implanted within patient 105, while in another example, IMD 110 is an external device coupled to percutaneously implanted leads. In some examples, IMD 110 uses one or more leads, while in other examples, IMD 110 is leadless.

IMD 110 may be constructed of any polymer, metal, or composite material sufficient to house the components of IMD 110 (e.g., components illustrated in FIG. 2) within patient 105. In this example, IMD 110 may be constructed with a biocompatible housing, such as titanium or stainless steel, or a polymeric material such as silicone, polyurethane, or a liquid crystal polymer, and surgically implanted at a site in patient 105 near the pelvis, abdomen, or buttocks. In other examples, IMD 110 may be implanted within other suitable sites within patient 105, which may depend, for example, on the target site within patient 105 for the delivery of electrical stimulation therapy. The outer housing of IMD 110 may be configured to provide a hermetic seal for components, such as a rechargeable or non-rechargeable power source. In addition, in some examples, the outer housing of IMD 110 is selected from a material that facilitates receiving energy to charge the rechargeable power source.

Electrical stimulation energy, which may be constant current or constant voltage-based pulses, for example, is delivered from IMD 110 to one or more target tissue sites of patient 105 via one or more electrodes (not shown) of implantable leads 130. In the example of FIG. 1, leads 130 carry electrodes that are placed adjacent to the target tissue of spinal cord 120. One or more of the electrodes may be disposed at a distal tip of a lead 130 and/or at other positions at intermediate points along the lead. Leads 130 may be implanted and coupled to IMD 110. The electrodes may transfer electrical stimulation generated by an electrical stimulation generator in IMD 110 to tissue of patient 105. Although leads 130 may each be a single lead, lead 130 may include a lead extension or other segments that may aid in implantation or positioning of lead 130. In some other examples, IMD 110 may be a leadless stimulator with one or more arrays of electrodes arranged on a housing of the stimulator rather than leads that extend from the housing. In addition, in some other examples, system 100 may include one lead or more than two leads, each coupled to IMD 110 and directed to similar or different target tissue sites.

The electrodes of leads 130 may be electrode pads on a paddle lead, circular (e.g., ring) electrodes surrounding the body of the lead, conformable electrodes, cuff electrodes, segmented electrodes (e.g., electrodes disposed at different circumferential positions around the lead instead of a continuous ring electrode), any combination thereof (e.g., ring electrodes and segmented electrodes) or any other type of electrodes capable of forming unipolar, bipolar or multipolar electrode combinations for therapy. Ring electrodes arranged at different axial positions at the distal ends of lead 130 will be described for purposes of illustration.

The deployment of electrodes via leads 130 is described for purposes of illustration, but arrays of electrodes may be deployed in different ways. For example, a housing associated with a leadless stimulator may carry arrays of electrodes, e.g., rows and/or columns (or other patterns), to which shifting operations may be applied. Such electrodes may be arranged as surface electrodes, ring electrodes, or protrusions. As a further alternative, electrode arrays may be formed by rows and/or columns of electrodes on one or more paddle leads. In some examples, electrode arrays include electrode segments, which are arranged at respective positions around a periphery of a lead, e.g., arranged in the form of one or more segmented rings around a circumference of a cylindrical lead. In other examples, one or more of leads 130 are linear leads having 8 ring electrodes along the axial length of the lead. In another example, the electrodes are segmented rings arranged in a linear fashion along the axial length of the lead and at the periphery of the lead.

The stimulation parameter of a therapy stimulation program that defines the stimulation pulses of electrical stimulation therapy by IMD 110 through the electrodes of leads 130 may include information identifying which electrodes have been selected for delivery of stimulation according to a stimulation program, the polarities of the selected electrodes, i.e., the electrode combination for the program, and voltage or current amplitude, pulse frequency, pulse width, pulse shape of stimulation delivered by the electrodes. These stimulation parameters of stimulation pulses (e.g., control pulses and/or informed pulses) are typically predetermined parameter values determined prior to delivery of the stimulation pulses (e.g., set according to a stimulation program). However, in some examples, system 100 changes one or more parameter values automatically based on one or more factors or based on user input and/or the control policy.

An ECAP test stimulation program may define stimulation parameter values that define control pulses delivered by IMD 110 through at least some of the electrodes of leads 130. These stimulation parameter values may include information identifying which electrodes have been selected for delivery of control pulses, the polarities of the selected electrodes, i.e., the electrode combination for the program, and voltage or current amplitude, pulse frequency, pulse width, and pulse shape of stimulation delivered by the electrodes. The stimulation signals (e.g., one or more stimulation pulses or a continuous stimulation waveform) defined by the parameters of each ECAP test stimulation program are configured to evoke a compound action potential from nerves. In some examples, the ECAP test stimulation program defines when the control pulses are to be delivered to the patient based on the frequency and/or pulse width of the informed pulses when informed pulse are also delivered. In some examples, the stimulation defined by each ECAP test stimulation program are not intended to provide or contribute to therapy for the patient. In other examples, the stimulation defined by each ECAP test stimulation program may contribute to therapy when the control pulses elicit detectable ECAP signals and contribute to therapy. In this manner, the ECAP test stimulation program may define stimulation parameters the same or similar to the stimulation parameters of therapy stimulation programs.

Although FIG. 1 is directed to SCS therapy, e.g., used to treat pain, in other examples system 100 may be configured to treat any other condition that may benefit from electrical stimulation therapy. For example, system 100 may be used to treat tremor, Parkinson's disease, epilepsy, a pelvic floor disorder (e.g., urinary incontinence or other bladder dysfunction, fecal incontinence, pelvic pain, bowel dysfunction, or sexual dysfunction), obesity, gastroparesis, or psychiatric disorders (e.g., depression, mania, obsessive compulsive disorder, anxiety disorders, and the like). In this manner, system 100 may be configured to provide therapy taking the form of deep brain stimulation (DBS), peripheral nerve stimulation (PNS), peripheral nerve field stimulation (PNFS), cortical stimulation (CS), pelvic floor stimulation, gastrointestinal stimulation, or any other stimulation therapy capable of treating a condition of patient 105.

In some examples, lead 130 includes one or more sensors configured to allow IMD 110 to monitor one or more parameters of patient 105, such as patient activity, pressure, temperature, or other characteristics. The one or more sensors may be provided in addition to, or in place of, therapy delivery by lead 130.

IMD 110 is configured to deliver electrical stimulation therapy to patient 105 via selected combinations of electrodes carried by one or both of leads 130, alone or in combination with an electrode carried by or defined by an outer housing of IMD 110. The target tissue for the electrical stimulation therapy may be any tissue affected by electrical stimulation, which may be in the form of electrical stimulation pulses or continuous waveforms. In some examples, the target tissue includes nerves, smooth muscle or skeletal muscle. In the example illustrated by FIG. 1, the target tissue is tissue proximate spinal cord 120, such as within an intrathecal space or epidural space of spinal cord 120, or, in some examples, adjacent nerves that branch off spinal cord 120. Leads 130 may be introduced into spinal cord 120 in via any suitable region, such as the thoracic, cervical or lumbar regions. Stimulation of spinal cord 120 may, for example, prevent pain signals from traveling through spinal cord 120 and to the brain of patient 105. Patient 105 may perceive the interruption of pain signals as a reduction in pain and, therefore, efficacious therapy results. In other examples, stimulation of spinal cord 120 may produce paresthesia which may be reduce the perception of pain by patient 105, and thus, provide efficacious therapy results.

IMD 110 generates and delivers electrical stimulation therapy to a target stimulation site within patient 105 via the electrodes of leads 130 to patient 105 according to one or more therapy stimulation programs. A therapy stimulation program defines values for one or more parameters that define an aspect of the therapy delivered by IMD 110 according to that program. For example, a therapy stimulation program that controls delivery of stimulation by IMD 110 in the form of pulses may define values for voltage or current pulse amplitude, pulse width, and pulse rate (e.g., pulse frequency) for stimulation pulses delivered by IMD 110 according to that program.

In some examples where ECAP signals cannot be detected from the types of pulses intended to be delivered to provide therapy to the patient, control pulses and informed pulses may be delivered. For example, IMD 110 is configured to deliver control stimulation to patient 105 via a combination of electrodes of leads 130, alone or in combination with an electrode carried by or defined by an outer housing of IMD 110. The tissue targeted by the control stimulation may be the same tissue targeted by the electrical stimulation therapy, but IMD 110 may deliver control stimulation pulses via the same, at least some of the same, or different electrodes. Since control stimulation pulses are delivered in an interleaved manner with informed pulses, a clinician and/or user may select any desired electrode combination for informed pulses. Like the electrical stimulation therapy, the control stimulation may be in the form of electrical stimulation pulses or continuous waveforms. In one example, each control stimulation pulse may include a balanced, bi-phasic square pulse that employs an active recharge phase. However, in other examples, the control stimulation pulses may include a monophasic pulse followed by a passive recharge phase. In other examples, a control pulse may include an imbalanced bi-phasic portion and a passive recharge portion. Although not necessary, a bi-phasic control pulse may include an interphase interval between the positive and negative phase to promote propagation of the nerve impulse in response to the first phase of the bi-phasic pulse. The control stimulation may be delivered without interrupting the delivery of the electrical stimulation informed pulses, such as during the window between consecutive informed pulses. The control pulses may elicit an ECAP signal from the tissue, and IMD 110 may sense the ECAP signal via two or more electrodes on leads 130. In cases where the control stimulation pulses are applied to spinal cord 120, the signal may be sensed by IMD 110 from spinal cord 120.

IMD 110 may deliver control stimulation to a target stimulation site within patient 105 via the electrodes of leads 130 according to one or more ECAP test stimulation programs. The one or more ECAP test stimulation programs may be stored in a storage device of IMD 110. Each ECAP test program of the one or more ECAP test stimulation programs includes values for one or more parameters that define an aspect of the control stimulation delivered by IMD 110 according to that program, such as current or voltage amplitude, pulse width, pulse frequency, electrode combination, and, in some examples timing based on informed pulses to be delivered to patient 105. In some examples, IMD 110 delivers control stimulation to patient 105 according to multiple ECAP test stimulation programs.

A user, such as a clinician or patient 105, may interact with a user interface ("UI") of an external programmer 150 to program IMD 110. In particular, the user may interact with a graphical user interface (GUI) of a therapy-management application running on external programmer 150 and displayed via the UI of external programmer 150. Programming of IMD 110 may refer generally to the generation and transfer of commands, programs, or other information to control the operation of IMD 110. In this manner, IMD 110 may receive the transferred commands and programs from external programmer 150 to control electrical stimulation therapy (e.g., informed pulses) and/or control stimulation (e.g., control pulses). For example, external programmer 150 may transmit therapy stimulation programs, ECAP test stimulation programs, stimulation parameter adjustments, therapy stimulation program selections, ECAP test program selections, user input, or other information to control the operation of IMD 110, e.g., by wireless telemetry or wired connection.

In some cases, external programmer 150 may be characterized as a physician or clinician programmer if it is primarily intended for use by a physician or clinician. In other cases, external programmer 150 may be characterized as a patient programmer if it is primarily intended for use by a patient. A patient programmer may be generally accessible to patient 105 and, in many cases, may be a portable device that may accompany patient 105 throughout the patient's daily routine. For example, a patient programmer may receive input from patient 105 when the patient wishes to terminate or change electrical stimulation therapy. In general, a physician or clinician programmer may support selection and generation of programs by a clinician for use by IMD 110, whereas a patient programmer may support adjustment and selection of such programs by a patient during ordinary use. In other examples, external programmer 150 may include, or be part of, an external charging device that recharges a power source of IMD 110. In this manner, a user may program and charge IMD 110 using one device, or multiple devices.

Information may be transmitted between external programmer 150 and IMD 110. Therefore, IMD 110 and external programmer 150 may communicate via wireless communication using any techniques known in the art. Examples of communication techniques may include, for example, radiofrequency (RF) telemetry and inductive coupling, but other techniques are also contemplated. In some examples, external programmer 150 includes a communication head that may be placed proximate to the patient's body near the IMD 110 implant site to improve the quality or security of communication between IMD 110 and external programmer 150. Communication between external programmer 150 and IMD 110 may occur during power transmission or separate from power transmission.

In some examples, IMD 110, in response to commands from external programmer 150, delivers electrical stimulation therapy according to a plurality of therapy stimulation programs to a target tissue site of the spinal cord 120 of patient 105 via electrodes (not depicted) on leads 130. In some examples, IMD 110 modifies therapy stimulation programs as therapy needs of patient 105 evolve over time. For example, the modification of the therapy stimulation programs may cause the adjustment of at least one parameter of the plurality of informed pulses. When patient 105 receives the same therapy for an extended period, the efficacy of the therapy may be reduced. In some cases, parameters of the plurality of informed pulses may be automatically updated.

In this disclosure, efficacy of electrical stimulation therapy may be indicated by one or more characteristics (e.g. an amplitude of or between one or more peaks or an area under the curve of one or more peaks) of an action potential that is evoked by a stimulation pulse (or "ping pulse") delivered by IMD 110 (i.e., a characteristic of the ECAP signal). Electrical stimulation therapy delivery by leads 130 of IMD 110 may cause neurons within the target tissue to evoke a compound action potential that travels up and down the target tissue, eventually arriving at sensing electrodes of IMD 110. Furthermore, control stimulation may also elicit at least one ECAP, and ECAPs responsive to control stimulation may also be a surrogate for the effectiveness of the therapy. The number of action potentials (e.g., number of neurons propagating action potential signals) that are evoked may be based on the various parameters of electrical stimulation pulses such as amplitude, pulse width, frequency, pulse shape (e.g., slew rate at the beginning and/or end of the pulse), etc. The slew rate may define the rate of change of the voltage and/or current amplitude of the pulse at the beginning and/or end of each pulse or each phase within the pulse. For example, a very high slew rate indicates a steep or even near vertical edge of the pulse, and a low slew rate indicates a longer ramp-up (or ramp-down) in the amplitude of the pulse. In some examples, these parameters contribute to an intensity of the electrical stimulation. In addition, a characteristic of the ECAP signal (e.g., an amplitude) may change based on the distance between the stimulation electrodes and the nerves subject to the electrical field produced by the delivered control stimulation pulses.

In one example, each therapy pulse may have a pulse width greater than approximately 300 µs, such as between approximately 300 µs and 1000 µs (i.e., 1 millisecond) in some examples. At these pulse widths, IMD 110 may not sufficiently detect an ECAP signal (as indicated in the example GUI shown in FIG. 6H, below) because the therapy pulse is also detected as an artifact that obscures the ECAP signal. If ECAPs are not adequately recorded, then ECAPs arriving at IMD 110 cannot be compared to the target ECAP characteristic (e.g. a target ECAP amplitude), and electrical therapy stimulation cannot be altered according to responsive ECAPs. When informed pulses have these longer pulse widths, IMD 110 may deliver control stimulation in the form of control pulses. The control pulses may have pulse widths of less than approximately 300 µs, such as a bi-phasic pulse with each phase having a duration of approximately 100 µs. Since the control pulses may have shorter pulse widths than the informed pulses, the ECAP signal may be sensed and identified following each control pulse and used to inform IMD 110 about any changes that should be made to the informed pulses (and control pulses in some examples). In general, the term "pulse width" refers to the collective duration of every phase, and interphase interval when appropriate, of a single pulse. A single pulse includes a single phase in some examples (i.e., a monophasic pulse) or two or more phases in other examples (e.g., a bi-phasic pulse or a tri-phasic pulse). The pulse width defines a period of time beginning with a start time of a first phase of the pulse and concluding with an end time of a last phase of the pulse (e.g., a biphasic pulse having a positive phase lasting 100 µs, a negative phase lasting 100 µs, and an interphase interval lasting 30 µs defines a pulse width of 230 µs). In another example, a control pulse may include a positive phase lasting 90 µs, a negative phase lasting 90 µs, and an interphase interval lasting 30 µs to define a pulse width of 210 µs In another example, a control pulse may include a positive phase lasting 120 µs, a negative phase lasting 120 µs, and an interphase interval lasting 30 µs to define a pulse width of 270 µs. In other examples, the therapy pulse may be less than 300 µs, such as 170 µs, 200 µs, or any other pulse width. Therefore, in some examples, a therapy pulse, or pulse that is configured to contribute to therapy for the patient, may be between approximately 100 µs and 1000 µs.

Example techniques for adjusting stimulation parameter values for informed pulses are based on comparing the value of a characteristic of a measured (or "sensed") ECAP signal to a target ECAP characteristic value (or range of values). During delivery of control stimulation pulses defined by one or more ECAP test stimulation programs, IMD 110, via two or more electrodes interposed on leads 130, senses electrical potentials of tissue of the spinal cord 120 of patient 105 to measure the electrical activity of the tissue. IMD 110 senses ECAPs from the target tissue of patient 105, e.g., with electrodes on one or more leads 130 and associated sense circuitry. In some examples, IMD 110 receives a signal indicative of the ECAP from one or more sensors, e.g., one or more electrodes and circuitry, internal or external to patient 105. Such an example signal may include a signal indicating an ECAP of the tissue of patient 105. Examples of the one or more sensors include one or more sensors configured to measure a compound action potential of patient 105, or a physiological effect indicative of a compound action potential. For example, to measure a physiological effect indicative of a compound action potential, the one or more sensors may be an accelerometer, a pressure sensor, a bending sensor, a sensor configured to detect a posture of patient 105, or a sensor configured to detect a respiratory function of patient 105. In this manner, although the ECAP may be indicative of a posture change or other patient action, other sensors may also detect similar posture changes or movements using modalities separate from the ECAP. However, in other examples, external programmer 150 receives a signal indicating a compound action potential in the target tissue of patient 105 and transmits a notification to IMD 110.

The therapy-management applications (running on external programmer 150) enable the control stimulation parameters and the target ECAP characteristic values to be set and/or adjusted at the clinic, or set and/or adjusted at home by patient 105. Once the target ECAP characteristic values are set, the therapy-management applications described herein allow for both automatic and manual adjustment of therapy pulse parameters to maintain consistent volume of neural activation and consistent perception of therapy for the patient when the electrode-to-neuron distance changes. The ability to change the stimulation parameter values may also allow the therapy to have long-term efficacy, with the ability to keep the intensity of the stimulation (e.g., as indicated by the ECAP) consistent by comparing the measured ECAP values to target ECAP characteristic value(s). IMD 110 may perform these changes without intervention by a physician or patient 105.

In some examples, IMD 110 includes stimulation generation circuitry configured to deliver electrical stimulation therapy to the patient 105, where the electrical stimulation therapy includes a plurality of informed pulses. Additionally, the stimulation generation circuitry of IMD 110 may be configured to deliver a plurality of control pulses, where the plurality of control pulses is interleaved with at least some informed pulses of the plurality of informed pulses. In some examples, IMD 110 includes sensing circuitry configured to detect a plurality of ECAPs, where the sensing circuitry is configured to detect each ECAP of the plurality of ECAPs after a control pulse of the plurality of control pulses and prior to a subsequent therapy pulse of the plurality of informed pulses. Even though the plurality of ECAPs may be received by IMD 110 based on IMD 110 delivering the plurality of control pulses (e.g., the plurality of control pulses may evoke the plurality of ECAPs received by IMD 110), the plurality of ECAPs may indicate an efficacy of the plurality of informed pulses. In other words, although the plurality of ECAPs might, in some cases, not be evoked by the plurality of informed pulses themselves, the plurality of ECAPs may still reveal one or more properties of the plurality of informed pulses or one or more effects of the plurality of informed pulses on patient 105. In some examples, the plurality of informed pulses are delivered by IMD 110 at above a perception threshold, where patient 105 is able to perceive the plurality of informed pulses delivered at above the perception threshold. In other examples, the plurality of informed pulses are delivered by IMD 110 at below a perception threshold, where the patient 105 not able to perceive the plurality of informed pulses delivered at below the perception threshold.

IMD 110 may include processing circuitry which, in some examples, is configured to process the plurality of ECAPs received by the sensing circuitry of IMD 110. For example, the processing circuitry of IMD 110 is configured to determine if a parameter of a first ECAP is greater than a reaction-threshold parameter value. The processing circuitry may monitor a characteristic value of each ECAP of the plurality of ECAPs and the first ECAP may be the first ECAP of the plurality of ECAPs recorded by IMD 110 that exceeds the reaction-threshold characteristic value. In some examples, the characteristic monitored by IMD 110 may be an ECAP amplitude. The ECAP amplitude may, in some examples, be given by a voltage difference between an N1 ECAP peak and a P2 ECAP peak. More description related to the N1 ECAP peak, and other ECAP peaks may be found below in the FIG. 4 description. In other examples, IMD 110 may monitor another characteristic or more than one characteristic of the plurality of ECAPs, such as current amplitude, slope, slew rate, ECAP frequency, ECAP duration, or any combination thereof. In some examples where the characteristic includes an ECAP amplitude, the threshold ECAP characteristic value may be selected from a range of approximately 5 microvolts (µV) to approximately 30 µV.

If the processing circuitry of IMD 110 determines that the characteristic of the first ECAP is greater than the reaction-threshold ECAP characteristic value, the processing circuitry may decrement (or reduce) a parameter of a set of informed pulses delivered by the stimulation generation circuitry after the first ECAP. In some examples, in order to decrement the parameter of the set of informed pulses, IMD 110 may decrease a current amplitude of each therapy pulse of each consecutive therapy pulse of the set of informed pulses by a current amplitude value. In other examples, in order to decrement the parameter of the set of informed pulses, IMD 110 may decrease a magnitude of a parameter (e.g., voltage) other than current. Since the plurality of ECAPs may indicate some effects of the therapy delivered by IMD 110 on patient 105, IMD 110 may decrement the parameter of the set of informed pulses in order to improve the therapy delivered to patient 105. In some cases, ECAPs received by IMD 110 exceeding the reaction-threshold ECAP characteristic value may indicate to IMD 110 that one or more of leads 130 have moved closer to the target tissue (e.g., spinal cord 120) of patient 105. In these cases, if therapy delivered to spinal cord 120 is maintained at present levels, patient 105 may experience transient overstimulation since the distance between leads 130 and the target tissue of patient 105 is a factor in determining the effects of electrical stimulation therapy on patient 105. Consequently, decrementing the first set of informed pulses based on determining that the first ECAP exceeds the reaction-threshold ECAP characteristic value may reduce the likelihood that patient 105 experiences transient overstimulation due to the electrical stimulation therapy delivered by IMD 110.

After determining that the first ECAP exceeds the reaction-threshold ECAP characteristic value, the processing circuitry of IMD 110 may continue to monitor the plurality of ECAPs detected by the sensing circuitry. In some examples, the processing circuitry of IMD 110 may identify a second ECAP which occurs after the first ECAP, where a characteristic of the second ECAP is less than a recovery-threshold ECAP characteristic value, which may or may not be equal to the reaction-threshold ECAP characteristic value. The second ECAP may, in some cases, be a leading ECAP occurring after the first ECAP, which includes a characteristic value less than the recovery-threshold ECAP characteristic value. In other words, each ECAP occurring between the first ECAP and the second ECAP may include a characteristic value greater than or equal to the recovery-threshold ECAP characteristic value. In this manner, since IMD 110 may decrement the informed pulses delivered to patient 105 between the first ECAP and the second ECAP, decreasing a risk that patient 105 experiences transient overstimulation during a period of time extending between the reception of the first ECAP and the reception of the second ECAP. Based on the characteristic of the second ECAP being less than the recovery-threshold ECAP characteristic value, the processing circuitry of IMD 110 may increment a parameter of a second set of informed pulses delivered by the stimulation generation circuitry after the second ECAP.

The rate of incrementing or decrementing may be different, such as a higher rate of decrement and a lower rate of increment. In some examples, external programmer 150 may accept user input selecting from a plurality of increment or decrement rates or defining a desired increment and/or decrement rate. For example, it may be beneficial to change the rate at which the medical device decreases and subsequently increases the one or more parameters of the stimulation pulses delivered to the target tissue in response to a transient patient action or in response to a change in control policy. For example, processing circuitry may execute an algorithm which generates one or more recommendations or automatically changes one or more parameters that define a control policy which controls how the medical device changes stimulation parameters based on a physiological signal such as an ECAP characteristic value. Based on receiving an indication that the patient experienced transient overstimulation at a beginning of a transient patient action, the processing circuitry may increase the rate at which the medical device decreases one or more stimulation parameters defining the stimulation pulses responsive to the first ECAP exceeding the reaction threshold ECAP characteristic value. Additionally, or alternatively, based on receiving an indication that the patient experienced transient overstimulation at an end of a transient patient action, the processing circuitry may decrease the rate at which the medical device increases one or more parameters of the stimulation pulses following a decrease in the one or more parameters responsive to the first ECAP exceeding the threshold ECAP characteristic value. Instead of automatically adjusting the parameters of the control policy, the system may generate a recommendation to be presented to a user indicating an appropriate adjustment to the control policy. In this manner a user, such as a clinician or a patient, can accept or confirm the recommended change in some examples.

In some examples, IMD 110 may deliver electrical stimulation therapy to patient 105 based on a "control policy." In some examples, IMD 110 stores the control policy in a memory (not illustrated in FIG. 1). The control policy may be set and/or updated by processing circuitry of IMD 110 or processing circuitry of external programmer 150, processing circuitry of one or more other devices, or any combination thereof. The control policy drives one or more therapy configurations of the electrical stimulation therapy delivered by IMD 110. For example, the control policy may determine an amplitude of one or more stimulation pulses delivered by IMD 110, a frequency of electrical stimulation therapy delivered by IMD 110, a response to one or more detected ECAPs (e.g., changes in pulse amplitude and/or pulse frequency), or any combination thereof.

External programmer 150, or another computing device, may include a user interface (UI), and in particular, a graphical user interface (GUI) displayed via a display screen of the computing device. As detailed further below with respect to FIGS. 6A-6N, processing circuitry (e.g., processing circuitry of external programmer 150 and/or processing circuitry of IMD 110) may output, for display by the GUI, a message requesting the patient 105 perform a set of actions. These set of actions may be selected to cause a change in the ECAP signals detectable by IMD 110. The processing circuitry may determine, based on the detectable ECAP signals, one or more adjustments to a control policy which controls electrical stimulation delivered by IMD 110 based on at least one evoked compound action potential (ECAP) sensed by IMD 110.

In some examples, responsive to determining the one or more adjustments to the control policy, the processing circuitry is configured to output, to IMD 110 via communication circuitry of external programmer 150, an instruction to configure the one or more adjustments to the control policy, but this is not required. The one or more adjustments may be implemented in other ways.

In some examples, to determine the one or more adjustments to the control policy, the processing circuitry is configured to determine the one or more adjustments in order to cause the control policy to perform any one or combination of: decrease a decrement step size or a decrement step rate of a plurality of stimulation pulses delivered to IMD 110 responsive to one or more events associated with a patient response, increase the decrement step size or the decrement step rate of the plurality of stimulation pulses responsive to the one or more events associated with the patient response, decrease an increment step size or an increment step rate of the plurality of stimulation pulses responsive to the one or more events associated with the patient response, or increase the increment step size or the increment step rate of the plurality of stimulation pulses responsive to the transient one or more events associated with the patient response. The one or more adjustments to the control policy are not meant to be limited to these examples. An adjustment to the control policy may cause the control policy to make any kind of change to the therapy delivered to patient 105 by IMD 110 or another device.

The message requesting patient 105 to perform a set of actions, and the user input indicative of the patient response, may be associated with an evaluation technique implemented at least in part by a therapy-management application (e.g., a methodology for setting up stimulation therapy and/or control policy for therapy using a GUI to provide and receive information to and from a user such as a clinician and/or patient) running on external programmer 150. The therapy-management application may represent a technique in which processing circuitry outputs, via a GUI of external programmer 150, the message requesting patient 105 to perform an action (e.g., an arch of the back, a cough, or another action). Subsequently, as part of the therapy-management application, the processing circuitry may output a set of requests via the GUI of external programmer 150 or another device and receive a set of responses to the set of requests. Each request of the set of requests may include a prompt for information relating to one or more patient sensations corresponding to the action and each response may include information relating to the respective request. Based on the set of responses received from the GUI, the processing circuitry may determine the one or more adjustments to be made to the therapy delivered by patient 105.

As detailed further below with respect to FIGS. 6A-6N, the GUI of the therapy-management application running on external programmer 150 can include a plurality of different screens or windows, collectively configured to inform and guide a user through set-up of how to determine or capture ECAP signals from a received body signal and/or how to manually modify stimulation therapy parameters (e.g., ECAP thresholds and/or target stimulation amplitudes), as needed.

For instance, in some examples, stimulation generation circuitry of IMD 110 is configured to deliver electrical stimulation to patient 105, where the electrical stimulation therapy includes a plurality of stimulation pulses. Additionally, IMD 110 may include sensing circuitry configured to sense a body signal indicative of one or more evoked compound action potentials (ECAPs) over a defined window of time, wherein the sensing circuitry is configured to sense each ECAP of the one or more ECAPs elicited by a respective stimulation pulse of the plurality of stimulation pulses. Via a capture-signal screen (e.g., FIGS. 6G-6I) of the therapy-management application, a user is able to select a representative ECAP signal peak from among the one or more sensed body signals. The therapy-management application may use the selected representative ECAP signal peak to configure parameters that define how the system can sense or detect subsequent ECAP signals, such as the timing and duration of ECAP sense windows, signal filtering techniques, etc. Then, using subsequently detected ECAP signals, the therapy-management application may automatically determine and/or guide the user to configure initial control-policy parameters for stimulation therapy, such as an ECAP-reaction threshold value, and/or an ECAP-recovery threshold value. The therapy-management application may additionally include a review-signal screen (e.g., FIGS. 6J and 6K, below), enabling the user to further analyze and refine the selected representative ECAP signal peak, such as by applying one or more filters to the sensed signal, in order to further customize the initial control-policy parameters.

Additionally or alternatively, the therapy-management-application GUI may include a configure-thresholds screen (e.g., FIGS. 6L-6N) enabling the user to directly and manually modify the control policy parameters in real-time, e.g., while IMD 110 delivers the stimulation therapy. In this way, the techniques of this disclosure include a highly user-friendly methodology for both intelligently determining patient-specific therapy parameters, and also manually modifying the parameters in real-time, thereby providing for uniquely patient-specific, comfortable, and effective stimulation therapy.

Figure 2:
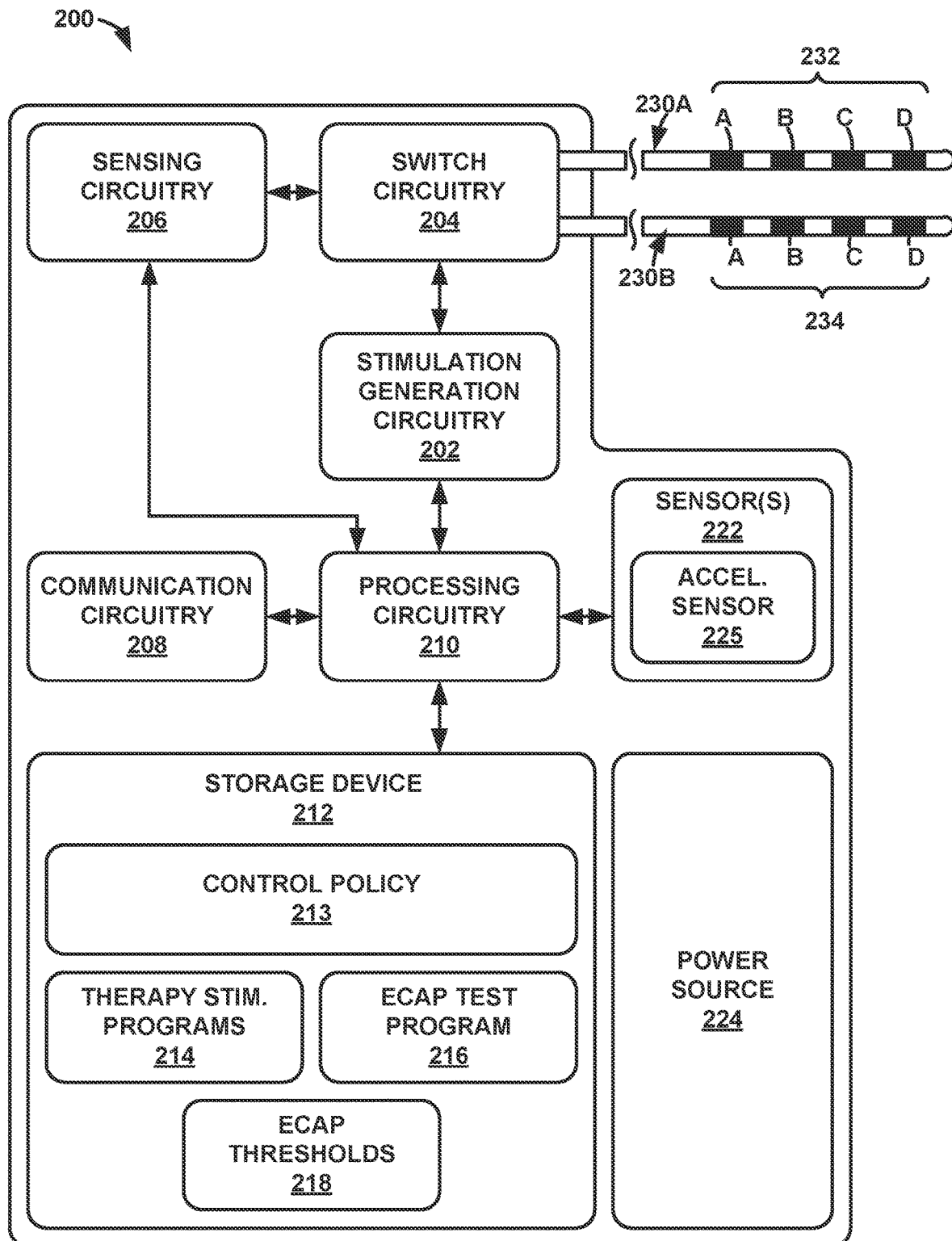
FIG. 2 is a block diagram illustrating an example configuration of components of the IMD of FIG. 1.

FIG. 2 is a block diagram illustrating an example configuration of components of IMD 200, in accordance with one or more techniques of this disclosure. IMD 200 may be an example of IMD 110 of FIG. 1. In the example shown in FIG. 2, IMD 200 includes stimulation generation circuitry 202, switch circuitry 204, sensing circuitry 206, communication circuitry 208, processing circuitry 210, storage device 212, sensor(s) 222, and power source 224.

In the example shown in FIG. 2, storage device 212 stores therapy stimulation programs 214 and ECAP test stimulation programs 216 in separate memories within storage device 212 or separate areas within storage device 212. Storage device 212 also stores rolling buffer 218 and histogram data 220. Each stored therapy stimulation program of therapy stimulation programs 214 defines values for a set of electrical stimulation parameters (e.g., a stimulation parameter set), such as a stimulation electrode combination, electrode polarity, current or voltage amplitude, pulse width, pulse rate, and pulse shape. Each stored ECAP test stimulation programs 216 defines values for a set of electrical stimulation parameters (e.g., a control stimulation parameter set), such as a stimulation electrode combination, electrode polarity, current or voltage amplitude, pulse width, pulse rate, and pulse shape. ECAP test stimulation programs 216 may also have additional information such as instructions regarding when to deliver control pulses based on the pulse width and/or frequency of the informed pulses defined in therapy stimulation programs 214. In examples in which control pulses are provided to the patient without the need for informed pulses, a separate ECAP test stimulation program may not be needed. Instead, the ECAP test stimulation program for therapy that only includes control pulses may define the same control pulses as the corresponding therapy stimulation program for those control pulses.

Accordingly, in some examples, stimulation generation circuitry 202 generates electrical stimulation signals in accordance with the electrical stimulation parameters noted above. Other ranges of stimulation parameter values may also be useful and may depend on the target stimulation site within patient 105. While stimulation pulses are described, stimulation signals may be of any form, such as continuous-time signals (e.g., sine waves) or the like. Switch circuitry 204 may include one or more switch arrays, one or more multiplexers, one or more switches (e.g., a switch matrix or other collection of switches), or other electrical circuitry configured to direct stimulation signals from stimulation generation circuitry 202 to one or more of electrodes 232, 234, or directed sensed signals from one or more of electrodes 232, 234 to sensing circuitry 206. In other examples, stimulation generation circuitry 202 and/or sensing circuitry 206 may include sensing circuitry to direct signals to and/or from one or more of electrodes 232, 234, which may or may not also include switch circuitry 204.

Sensing circuitry 206 monitors signals from any combination of electrodes 232, 234. In some examples, sensing circuitry 206 includes one or more amplifiers, filters, and analog-to-digital converters. Sensing circuitry 206 may be used to sense physiological signals, such as ECAPs. In some examples, sensing circuitry 206 detects ECAPs from a particular combination of electrodes 232, 234. In some cases, the particular combination of electrodes for sensing ECAPs includes different electrodes than a set of electrodes 232, 234 used to deliver stimulation pulses. Alternatively, in other cases, the particular combination of electrodes used for sensing ECAPs includes at least one of the same electrodes as a set of electrodes used to deliver stimulation pulses to patient 105. Sensing circuitry 206 may provide signals to an analog-to-digital converter, for conversion into a digital signal for processing, analysis, storage, or output by processing circuitry 210.

Communication circuitry 208 supports wireless communication between IMD 200 and an external programmer (not shown in FIG. 2) or another computing device under the control of processing circuitry 210. Processing circuitry 210 of IMD 200 may receive, as updates to programs, values for various stimulation parameters such as amplitude and electrode combination, from the external programmer via communication circuitry 208. Updates to the therapy stimulation programs 214 and ECAP test stimulation programs 216 may be stored within storage device 212. Communication circuitry 208 in IMD 200, as well as telemetry circuits in other devices and systems described herein, such as the external programmer, may accomplish communication by radiofrequency (RF) communication techniques. In addition, communication circuitry 208 may communicate with an external medical device programmer (not shown in FIG. 2) via proximal inductive interaction of IMD 200 with the external programmer. The external programmer may be one example of external programmer 150 of FIG. 1. Accordingly, communication circuitry 208 may send information to the external programmer on a continuous basis, at periodic intervals, or upon request from IMD 110 or the external programmer.

Processing circuitry 210 may include any one or more of a microprocessor, a controller, a digital signal processor (DSP), an application specific integrated circuit (ASIC), a field-programmable gate array (FPGA), discrete logic circuitry, or any other processing circuitry configured to provide the functions attributed to processing circuitry 210 herein may be embodied as firmware, hardware, software or any combination thereof. Processing circuitry 210 controls stimulation generation circuitry 202 to generate stimulation signals according to therapy stimulation programs 214 and ECAP test stimulation programs 216 stored in storage device 212 to apply stimulation parameter values specified by one or more of programs, such as amplitude, pulse width, pulse rate, and pulse shape of each of the stimulation signals.

In the example shown in FIG. 2, the set of electrodes 232 includes electrodes 232A, 232B, 232C, and 232D, and the set of electrodes 234 includes electrodes 234A, 234B, 234C, and 234D. In other examples, a single lead may include all eight electrodes 232 and 234 along a single axial length of the lead. Processing circuitry 210 also controls stimulation generation circuitry 202 to generate and apply the stimulation signals to selected combinations of electrodes 232, 234. In some examples, stimulation generation circuitry 202 includes a switch circuit (instead of, or in addition to, switch circuitry 204) that may couple stimulation signals to selected conductors within leads 230, which, in turn, deliver the stimulation signals across selected electrodes 232, 234. Such a switch circuit may be a switch array, switch matrix, multiplexer, or any other type of switching circuit configured to selectively couple stimulation energy to selected electrodes 232, 234 and to selectively sense bioelectrical neural signals of a spinal cord of the patient (not shown in FIG. 2) with selected electrodes 232, 234.

In other examples, however, stimulation generation circuitry 202 does not include a switch circuit and switch circuitry 204 does not interface between stimulation generation circuitry 202 and electrodes 232, 234. In these examples, stimulation generation circuitry 202 includes a plurality of pairs of voltage sources, current sources, voltage sinks, or current sinks connected to each of electrodes 232, 234 such that each pair of electrodes has a unique signal circuit. In other words, in these examples, each of electrodes 232, 234 is independently controlled via its own signal circuit (e.g., via a combination of a regulated voltage source and sink or regulated current source and sink), as opposed to switching signals between electrodes 232, 234.

Electrodes 232, 234 on respective leads 230 may be constructed of a variety of different designs. For example, one or both of leads 230 may include one or more electrodes at each longitudinal location along the length of the lead, such as one electrode at different perimeter locations around the perimeter of the lead at each of the locations A, B, C, and D. In one example, the electrodes may be electrically coupled to stimulation generation circuitry 202, e.g., via switch circuitry 204 and/or switching circuitry of the stimulation generation circuitry 202, via respective wires that are straight or coiled within the housing of the lead and run to a connector at the proximal end of the lead. In another example, each of the electrodes of the lead may be electrodes deposited on a thin film. The thin film may include an electrically conductive trace for each electrode that runs the length of the thin film to a proximal end connector. The thin film may then be wrapped (e.g., a helical wrap) around an internal member to form the lead 230. These and other constructions may be used to create a lead with a complex electrode geometry.

Although sensing circuitry 206 is incorporated into a common housing with stimulation generation circuitry 202 and processing circuitry 210 in FIG. 2, in other examples, sensing circuitry 206 may be in a separate housing from IMD 200 and may communicate with processing circuitry 210 via wired or wireless communication techniques.

In some examples, one or more of electrodes 232 and 234 are suitable for sensing the ECAPs. For instance, electrodes 232 and 234 may sense the voltage amplitude of a portion of the ECAP signals, where the sensed voltage amplitude is a characteristic the ECAP signal.

Storage device 212 may be configured to store information within IMD 200 during operation. Storage device 212 may include a computer-readable storage medium or computer-readable storage device. In some examples, storage device 212 includes one or more of a short-term memory or a long-term memory. Storage device 212 may include, for example, random access memory (RAM), dynamic random access memory (DRAM), static random access memory (SRAM), ferroelectric random access memory (FRAM), magnetic discs, optical discs, flash memory, or forms of electrically programmable memory (EPROM) or electrically erasable and programmable memory (EEPROM). In some examples, storage device 212 is used to store data indicative of instructions for execution by processing circuitry 210. As discussed above, storage device 212 is configured to store therapy stimulation programs 214 and ECAP test stimulation programs 216.

In some examples, stimulation generation circuitry 202 may be configured to deliver electrical stimulation therapy to patient 105. The electrical stimulation therapy may, in some cases, include a plurality of informed pulses. Additionally, stimulation generation circuitry 202 may be configured to deliver a plurality of control pulses, where the plurality of control pulses is interleaved with at least some informed pulses of the plurality of informed pulses. Stimulation generation circuitry may deliver the plurality of informed pulses and the plurality of control pulses to target tissue (e.g., spinal cord 120) of patient 105 via electrodes 232, 234 of leads 230. By delivering such informed pulses and control pulses, stimulation generation circuitry 202 may evoke responsive ECAPs in the target tissue, the responsive ECAPs propagating through the target tissue before arriving back at electrodes 232, 234. In some examples, a different combination of electrodes 232, 234 may sense responsive ECAPs than a combination of electrodes 232, 234 that delivers informed pulses and a combination of electrodes 232, 234 that delivers control pulses. Sensing circuitry 206 may be configured to detect the responsive ECAPs via electrodes 232, 234 and leads 230. In other examples, stimulation generation circuitry 202 may be configured to deliver a plurality of control pulses, without any informed pulses, when control pulses also provide therapeutic effects for the patient.

Processing circuitry 210 may, in some cases, direct sensing circuitry 206 to continuously monitor for ECAPs. In other cases, processing circuitry 210 may direct sensing circuitry 206 to may monitor for ECAPs based on signals from sensor(s) 222. For example, processing circuitry 210 may activate sensing circuitry 206 based on an activity level of patient 105 exceeding an activity-level threshold (e.g., an accelerometer signal of sensor(s) 222 rises above a threshold). Activating and deactivating sensing circuitry 206 may, in some examples, extend a battery life of power source 224.

In some examples, processing circuitry 210 determines if a characteristic of a first ECAP is greater than a reaction-threshold ECAP characteristic value. The reaction-threshold ECAP characteristic value may be stored in storage device 212. In some examples, the characteristic of the first ECAP is a voltage amplitude of the first ECAP. In some such examples, the reaction-threshold ECAP characteristic value is selected from a range of approximately 10 microvolts (μV) to approximately 20 μV. In other examples, processing circuitry 210 determines if another characteristic (e.g., ECAP current amplitude, ECAP slew rate, area underneath the ECAP, ECAP slope, or ECAP duration) of the first ECAP is greater than the reaction-threshold ECAP characteristic value.

If processing circuitry 210 determines that the characteristic of the first ECAP is greater than the reaction-threshold ECAP characteristic value, processing circuitry 210 is configured to activate a decrement mode, altering at least one parameter of each therapy pulse of a set of informed pulses delivered by IMD 200 after the first ECAP is sensed by sensing circuitry 206. Additionally, while the decrement mode is activated, processing circuitry 210 may change at least one parameter of each control pulse of a set of control pulses delivered by IMD 200 after the first ECAP is sensed by sensing circuitry 206. In some examples, the at least one parameter of the informed pulses and the at least one parameter of the control pulses adjusted by processing circuitry 210 during the decrement mode includes a stimulation current amplitude. In some such examples, during the decrement mode, processing circuitry 210 decreases an electrical current amplitude of each consecutive stimulation pulse (e.g., each therapy pulse and each control pulse) delivered by IMD 200. In other examples, the at least one parameter of the stimulation pulses adjusted by processing circuitry 210 during the decrement mode include any combination of electrical current amplitude, electrical voltage amplitude, slew rate, pulse shape, pulse frequency, or pulse duration.

In the example illustrated by FIG. 2, the decrement mode is stored in storage device 212 as a part of control policy 213. The decrement mode may include a list of instructions which enable processing circuitry 210 to adjust parameters of stimulation pulses according to a function. In some examples, when the decrement mode is activated, processing circuitry 210 decreases a parameter (e.g., an electrical current) of each consecutive therapy pulse and each consecutive control pulse according to a linear function. In other examples, when the decrement mode is activated, processing circuitry 210 decreases a parameter (e.g., an electrical current) of each consecutive therapy pulse and each consecutive control pulse according to an exponential function, a logarithmic function, or a piecewise function. While the decrement mode is activated, sensing circuitry 206 may continue to monitor responsive ECAPs. In turn, sensing circuitry 206 may detect ECAPs responsive to control pulses delivered by IMD 200.

Throughout the decrement mode, processing circuitry may monitor ECAPs responsive to stimulation pulses. Processing circuitry 210 may determine if a characteristic of a second ECAP is less than a recovery-threshold ECAP characteristic value, which may or may not be the same as the reaction-threshold ECAP characteristic value. The second ECAP may, in some cases, be the leading ECAP occurring after the first ECAP, which is less than the recovery-threshold ECAP characteristic value. In other words, each ECAP recorded by sensing circuitry 206 between the first ECAP and the second ECAP is greater than or equal to the recovery-threshold ECAP characteristic value. Based on the characteristic of the second ECAP being less than the recovery-threshold ECAP characteristic value, processing circuitry 210 may deactivate the decrement mode and activate an increment mode, thus altering at least one parameter of each therapy pulse of a set of informed pulses delivered by IMD 200 after the second ECAP is sensed by sensing circuitry 206. Additionally, while the increment mode is activated, processing circuitry 210 may change at least one parameter of each control pulse of a set of control pulses delivered by IMD 200 after the second ECAP is sensed by sensing circuitry 206.

In some examples, the at least one parameter of the informed pulses and the at least one parameter of the control pulses adjusted by processing circuitry 210 during the increment mode includes a stimulation current amplitude. In some such examples, during the increment mode, processing circuitry 210 increases an electrical current amplitude of each consecutive stimulation pulse (e.g., each therapy pulse and each control pulse) delivered by IMD 200. In other examples, the at least one parameter of the stimulation pulses adjusted by processing circuitry 210 during the increment mode include any combination of electrical current amplitude, electrical voltage amplitude, slew rate, pulse shape, pulse frequency, or pulse duration.

In the example illustrated by FIG. 2, the increment mode is stored in storage device 212 as a part of control policy 213. The increment mode may include a list of instructions which enable processing circuitry 210 to adjust parameters of stimulation pulses according to a function. In some examples, when the increment mode is activated, processing circuitry 210 increases a parameter (e.g., an electrical current) of each consecutive therapy pulse and each consecutive control pulse according to a linear function. In other examples, when the increment mode is activated, processing circuitry 210 increases a parameter (e.g., an electrical current) of each consecutive therapy pulse and each consecutive control pulse according to a non-linear function, such as an exponential function, a logarithmic function, or a piecewise function. While the increment mode is activated, sensing circuitry 206 may continue to monitor responsive ECAPs. In turn, sensing circuitry 206 may detect ECAPs responsive to control pulses delivered by IMD 200.

Processing circuitry 210 may complete the increment mode such that the one or more parameters of the stimulation pulses return to baseline parameter values of stimulation pulses delivered before processing circuitry 210 activates the decrement mode (e.g., before sensing circuitry 206 detects the first ECAP). By first decrementing and subsequently incrementing stimulation pulses in response to ECAPs exceeding a reaction-threshold ECAP characteristic value, processing circuitry 210 may prevent patient 105 from experiencing transient overstimulation or decrease a severity of transient overstimulation experienced by patient 105.

Although in some examples sensing circuitry 206 senses ECAPs that occur in response to control pulses delivered according to ECAP test stimulation programs 216, in other examples, sensing circuitry 206 senses ECAPs that occur in response to informed pulses delivered according to therapy stimulation programs 214. For instance, IMD 200 may toggle the decrement mode and the increment mode using any combination of ECAPs corresponding to informed pulses and ECAPs corresponding to control pulses.

Sensor(s) 222 may include one or more sensing elements that sense values of a respective patient parameter. As described, electrodes 232 and 234 may be the electrodes that sense the characteristic value of the ECAP. Sensor(s) 222 may include one or more accelerometers, optical sensors, chemical sensors, temperature sensors, pressure sensors, or any other types of sensors. Sensor(s) 222 may output patient parameter values that may be used as feedback to control delivery of therapy. For example, sensor(s) 222 may indicate patient activity, and processing circuitry 210 may increase the frequency of control pulses and ECAP sensing in response to detecting increased patient activity. In one example, processing circuitry 210 may initiate control pulses and corresponding ECAP sensing in response to a signal from sensor(s) 222 indicating that patient activity has exceeded an activity threshold. Conversely, processing circuitry 210 may decrease the frequency of control pulses and ECAP sensing in response to detecting decreased patient activity. For example, in response to sensor(s) 222 no longer indicating that the sensed patient activity exceeds a threshold, processing circuitry 210 may suspend or stop delivery of control pulses and ECAP sensing. In this manner, processing circuitry 210 may dynamically deliver control pulses and sense ECAP signals based on patient activity to reduce power consumption of the system when the electrode-to-neuron distance is not likely to change and increase system response to ECAP changes when electrode-to-neuron distance is likely to change. IMD 200 may include additional sensors within the housing of IMD 200 and/or coupled via one of leads 130 or other leads. In addition, IMD 200 may receive sensor signals wirelessly from remote sensors via communication circuitry 208, for example. In some examples, one or more of these remote sensors may be external to patient (e.g., carried on the external surface of the skin, attached to clothing, or otherwise positioned external to patient 105). In some examples, signals from sensor(s) 222 indicate a position or body state (e.g., sleeping, awake, sitting, standing, or the like), and processing circuitry 210 may select target ECAP characteristic values according to the indicated position or body state.

Power source 224 is configured to deliver operating power to the components of IMD 200. Power source 224 may include a battery and a power generation circuit to produce the operating power. In some examples, the battery is rechargeable to allow extended operation. In some examples, recharging is accomplished through proximal inductive interaction between an external charger and an inductive charging coil within IMD 200. Power source 224 may include any one or more of a plurality of different battery types, such as nickel cadmium batteries and lithium ion batteries.

Figure 3:
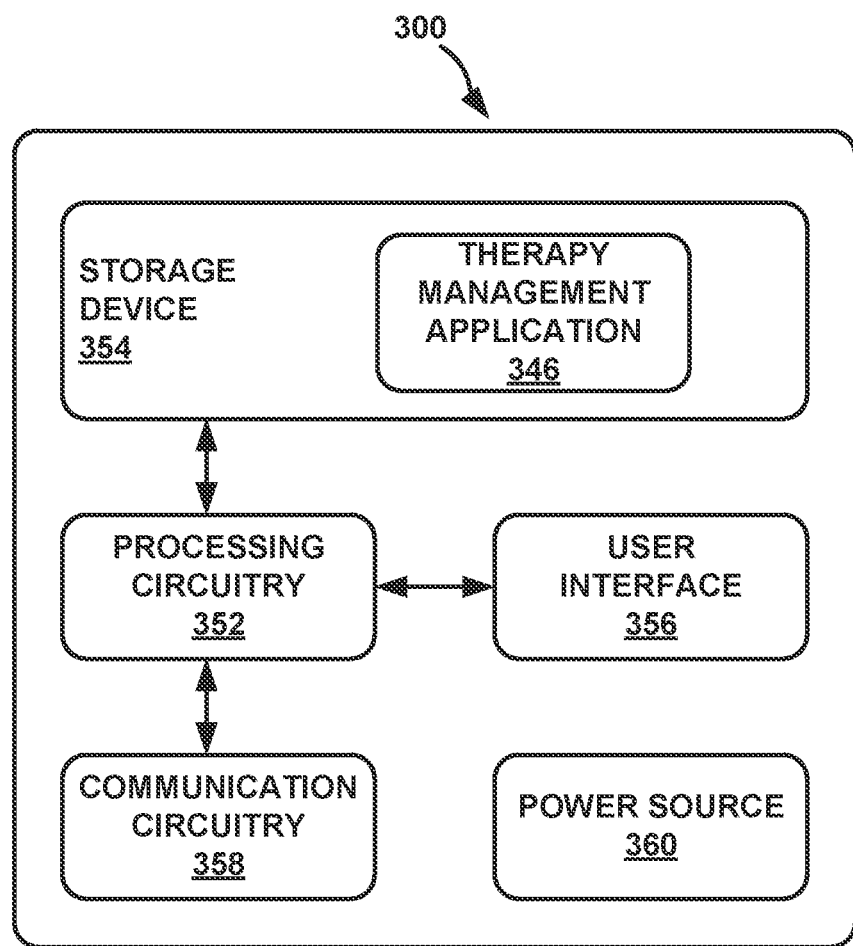
FIG. 3 is a block diagram illustrating an example configuration of components of the external programmer of FIG. 1.

FIG. 3 is a block diagram illustrating an example configuration of components of external programmer 300, in accordance with one or more techniques of this disclosure. External programmer 300 may be an example of external programmer 150 of FIG. 1. Although external programmer 300 may generally be described as a hand-held device, external programmer 300 may be a larger portable device or a more stationary device. In addition, in other examples, external programmer 300 may be included as part of an external charging device or include the functionality of an external charging device. As illustrated in FIG. 3, external programmer 300 may include processing circuitry 352, storage device 354, user interface 356, communication circuitry 358, and power source 360. Storage device 354 may store instructions that, when executed by processing circuitry 352, cause processing circuitry 352 and external programmer 300 to provide the functionality ascribed to external programmer 300 throughout this disclosure, and in particular, the functionality of therapy-management applications described herein. Each of these components, circuitry, or modules, may include electrical circuitry that is configured to perform some, or all of the functionality described herein. For example, processing circuitry 352 may include processing circuitry configured to perform the processes discussed with respect to programmer 150 and/or processing circuitry 210 of IMD 110.

In general, external programmer 300 includes any suitable arrangement of hardware, alone or in combination with software and/or firmware, to perform the techniques attributed to external programmer 300, and processing circuitry 352, user interface 356, and communication circuitry 358 of external programmer 300. In various examples, external programmer 300 may include one or more processors, such as one or more microprocessors, DSPs, ASICs, FPGAs, or any other equivalent integrated or discrete logic circuitry, as well as any combinations of such components. External programmer 300 also, in various examples, may include a storage device 354, such as RAM, ROM, PROM, EPROM, EEPROM, flash memory, a hard disk, a CD-ROM, including executable instructions for causing the one or more processors to perform the actions attributed to them. Moreover, although processing circuitry 352 and communication circuitry 358 are described as separate modules, in some examples, processing circuitry 352 and communication circuitry 358 are functionally integrated. In some examples, processing circuitry 352 and communication circuitry 358 correspond to individual hardware units, such as ASICs, DSPs, FPGAs, or other hardware units.

Storage device 354 (e.g., a storage device) may store instructions that, when executed by processing circuitry 352, cause processing circuitry 352 and external programmer 300 to provide the functionality ascribed to external programmer 300 throughout this disclosure. In particular, storage device 354 is configured to store instructions collectively defining therapy-management application 346, as detailed further below with respect to FIGS. 6A-6N.

As non-limiting examples, storage device 354 may include specific instructions that cause processing circuitry 352 to obtain a parameter set from memory, select a spatial electrode movement pattern, or receive a user input and send a corresponding command to IMD 200, or instructions for any other functionality. In addition, storage device 354 may include a plurality of programs, where each program includes a parameter set that defines stimulation pulses, such as control pulses and/or informed pulses. Storage device 354 may also store data received from a medical device (e.g., IMD 110). For example, storage device 354 may store ECAP-related data recorded at a sensing module of the medical device, and storage device 354 may also store data from one or more sensors of the medical device.

User interface 356 may include a button or keypad, lights, and/or a speaker for voice commands. In particular, user interface 356 includes at least a display, such as a liquid crystal (LCD), light-emitting diode (LED), or organic light-emitting diode (OLED), configured to display a graphical user interface (GUI) associated with therapy-management application 346. In some examples the display includes a touch screen. User interface 356 may be configured to display any information related to the delivery of electrical stimulation, identified patient behaviors, sensed patient parameter values, patient behavior criteria, or any other such information. User interface 356 may also receive user input via user interface 356. The input may be, for example, in the form of pressing a button on a keypad or selecting an icon from a touch screen. The input may request starting or stopping electrical stimulation, the input may request a new spatial electrode movement pattern or a change to an existing spatial electrode movement pattern, of the input may request some other change to the delivery of electrical stimulation. In some examples, user interface 356 may display one or more requests of the patient guidance wizard performed by the system including external programmer 300 and/or IMD 110, and user interface 356 may receive one or more user responses to the one or more requests.

Communication circuitry 358 may support wireless communication between the medical device and external programmer 300 under the control of processing circuitry 352. Communication circuitry 358 may also be configured to communicate with another computing device via wireless communication techniques, or direct communication through a wired connection. In some examples, communication circuitry 358 provides wireless communication via an RF or proximal inductive medium. In some examples, communication circuitry 358 includes an antenna, which may take on a variety of forms, such as an internal or external antenna.

Examples of local wireless communication techniques that may be employed to facilitate communication between external programmer 300 and IMD 110 include RF communication according to the 802.11 or Bluetooth® specification sets or other standard or proprietary telemetry protocols. In this manner, other external devices may be capable of communicating with external programmer 300 without needing to establish a secure wireless connection. As described herein, communication circuitry 358 may be configured to transmit a spatial electrode movement pattern or other stimulation parameter values to IMD 110 for delivery of electrical stimulation therapy.

In some examples, selection of stimulation parameters or therapy stimulation programs are transmitted to the medical device for delivery to a patient (e.g., patient 105 of FIG. 1).

In other examples, the therapy may include medication, activities, or other instructions that patient 105 must perform themselves or a caregiver perform for patient 105. In some examples, external programmer 300 provides visual, audible, and/or tactile notifications that indicate there are new instructions. External programmer 300 requires receiving user input acknowledging that the instructions have been completed in some examples.

In accordance with techniques of this disclosure, user interface 356 of external programmer 300 receives an indication from a clinician instructing a processor of the medical device to update one or more therapy stimulation programs, or to update one or more ECAP test stimulation programs. Updating therapy stimulation programs and ECAP test stimulation programs may include changing one or more parameters of the stimulation pulses delivered by the medical device according to the programs, such as amplitude, pulse width, frequency, and pulse shape of the informed pulses and/or control pulses. User interface 356 may also receive instructions from the clinician commanding any electrical stimulation, including control pulses and/or informed pulses to commence or to cease.

Power source 360 is configured to deliver operating power to the components of external programmer 300. Power source 360 may include a battery and a power generation circuit to produce the operating power. In some examples, the battery is rechargeable to allow extended operation. Recharging may be accomplished by electrically coupling power source 360 to a cradle or plug that is connected to an alternating current (AC) outlet. In addition, recharging may be accomplished through proximal inductive interaction between an external charger and an inductive charging coil within external programmer 300. In other examples, traditional batteries (e.g., nickel cadmium or lithium ion batteries) may be used. In addition, external programmer 300 may be directly coupled to an alternating current outlet to operate.

The architecture of external programmer 300 illustrated in FIG. 3 is shown as an example. The techniques as set forth in this disclosure may be implemented in the example external programmer 300 of FIG. 3, as well as other types of systems not described specifically herein. Nothing in this disclosure should be construed so as to limit the techniques of this disclosure to the example architecture illustrated by FIG. 3.

Figure 4:
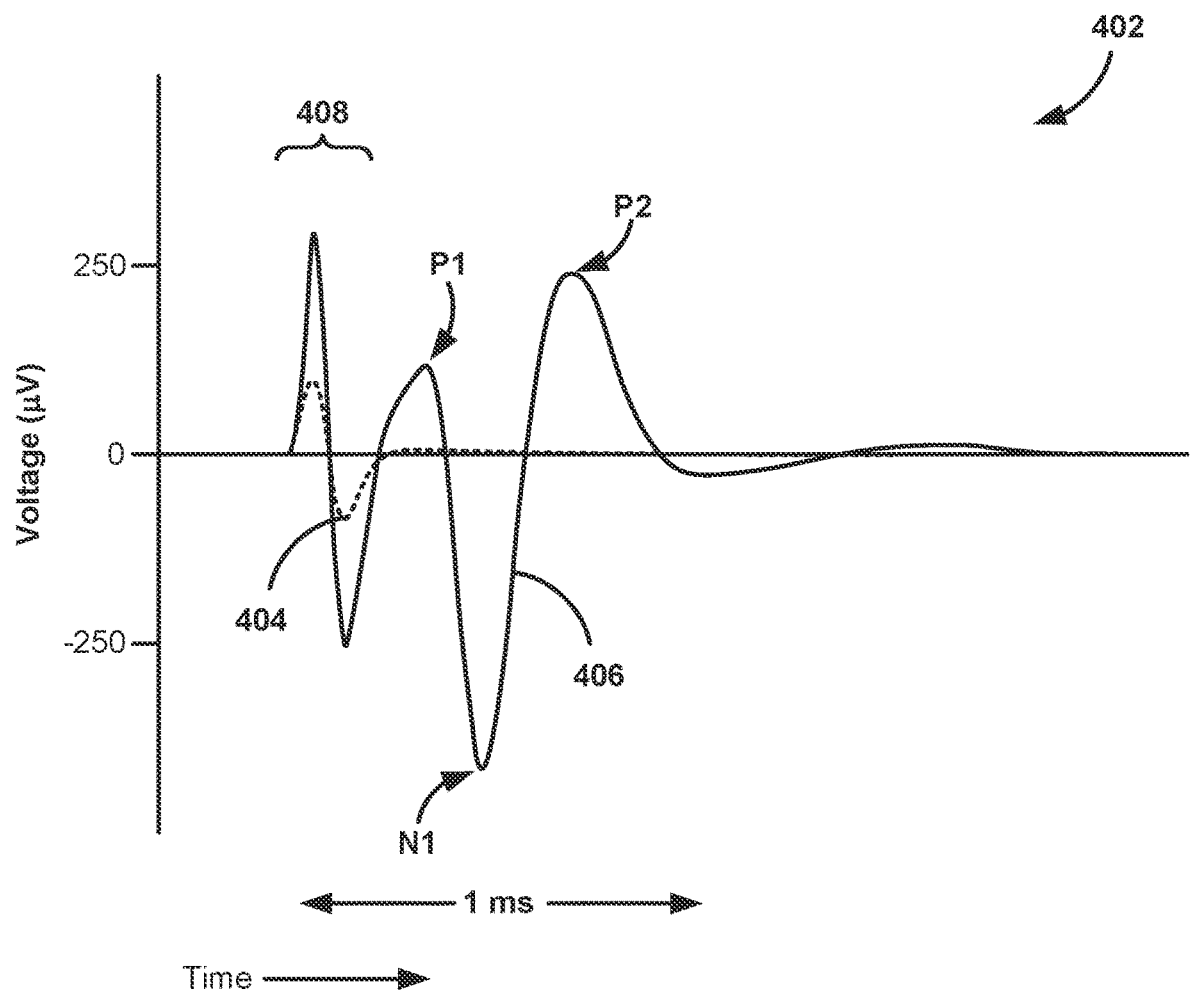
FIG. 4 is a graph of example evoked compound action potentials (ECAPs) sensed for respective stimulation pulses.

FIG. 4 is a graph 402 of example evoked compound action potentials (ECAPs) sensed for respective stimulation pulses, in accordance with one or more techniques of this disclosure. As shown in FIG. 4, graph 402 shows example ECAP signal 404 (dotted line) and ECAP signal 406 (solid line). In some examples, each of ECAP signals 404 and 406 are sensed from control pulses that were delivered from a guarded cathode, where the control pulses are bi-phasic pulses including an interphase interval between each positive and negative phase of the pulse. In some such examples, the guarded cathode includes stimulation electrodes located at the end of an 8-electrode lead (e.g., leads 130 of FIG. 1) while two sensing electrodes are provided at the other end of the 8-electrode lead. ECAP signal 404 illustrates the voltage amplitude sensed as a result from a sub-detection threshold stimulation pulse, or a stimulation pulse which results in no detectable ECAP. Peaks 408 of ECAP signal 404 are detected and represent the artifact of the delivered control pulse. However, no propagating signal is detected after the artifact in ECAP signal 404 because the control pulse was sub-detection stimulation threshold.

In contrast to ECAP signal 404, ECAP signal 406 represents the voltage amplitude detected from a supra-detection stimulation threshold control pulse. Peaks 408 of ECAP signal 406 are detected and represent the artifact of the delivered control pulse. After peaks 408, ECAP signal 406 also includes peaks P1, N1, and P2, which are three typical peaks representative of propagating action potentials from an ECAP. The example duration of the artifact and peaks P1, N1, and P2 is approximately 1 millisecond (ms). When detecting the ECAP of ECAP signal 406, different characteristics may be identified. For example, the characteristic of the ECAP may be the amplitude between N1 and P2. This N1-P2 amplitude may be easily detectable even if the artifact impinges on P1, a relatively large signal, and the N1-P2 amplitude may be minimally affected by electronic drift in the signal. In other examples, the characteristic of the ECAP used to control subsequent control pulses and/or informed pulses may be an amplitude of P1, N1, or P2 with respect to neutral or zero voltage. In some examples, the characteristic of the ECAP used to control subsequent control pulses or informed pulses is a sum of two or more of peaks P1, N1, or P2. In other examples, the characteristic of ECAP signal 406 may be the area under one or more of peaks P1, N1, and/or P2. In other examples, the characteristic of the ECAP may be a ratio of one of peaks P1, N1, or P2 to another one of the peaks. In some examples, the characteristic of the ECAP is a slope between two points in the ECAP signal, such as the slope between N1 and P2. In other examples, the characteristic of the ECAP may be the time between two points of the ECAP, such as the time between N1 and P2. The time between when the stimulation pulse is delivered and a point in the ECAP signal may be referred to as a latency of the ECAP and may indicate the types of fibers being captured by the stimulation pulse (e.g., a control pulse). ECAP signals with lower latency (i.e., smaller latency values) indicate a higher percentage of nerve fibers that have faster propagation of signals, whereas ECAP signals with higher latency (i.e., larger latency values) indicate a higher percentage of nerve fibers that have slower propagation of signals. Latency may also refer to the time between an electrical feature is detected at one electrode and then detected again at a different electrode. This time, or latency, is inversely proportional to the conduction velocity of the nerve fibers. Other characteristics of the ECAP signal may be used in other examples.

The amplitude of the ECAP signal increases with increased amplitude of the control pulse, as long as the pulse amplitude is greater than threshold such that nerves depolarize and propagate the signal. The target ECAP characteristic (e.g., the target ECAP amplitude) may be determined from the ECAP signal detected from a control pulse when informed pulses are determined to deliver effective therapy to patient 105. The ECAP signal thus is representative of the distance between the stimulation electrodes and the nerves appropriate for the stimulation parameter values of the informed pulses delivered at that time. Therefore, IMD 110 may attempt to use detected changes to the measured ECAP characteristic value to change therapy pulse parameter values and maintain the target ECAP characteristic value during therapy pulse delivery.

Figure 5A:
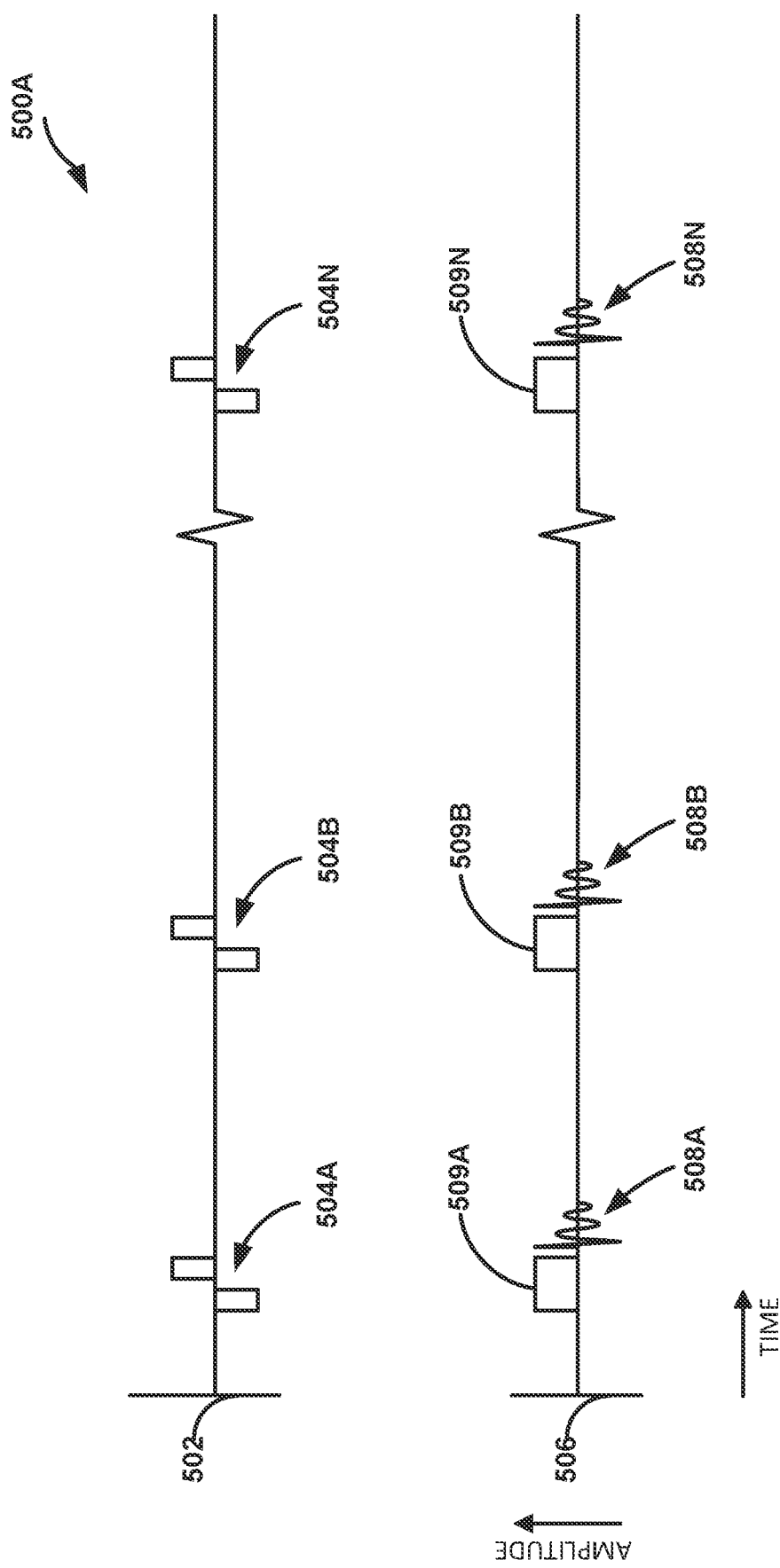
FIG. 5A is a timing diagram illustrating an example of electrical stimulation pulses, respective stimulation signals, and respective sensed ECAPs.

FIG. 5A is a timing diagram 500A illustrating an example of electrical stimulation pulses, respective stimulation signals, and respective sensed ECAPs, in accordance with one or more techniques of this disclosure. For convenience, FIG. 5A is described with reference to IMD 200 of FIG. 2. As illustrated, timing diagram 500A includes first channel 502, a plurality of stimulation pulses 504A-504N (collectively "stimulation pulses 504"), second channel 506, a plurality of respective ECAPs 508A-508N (collectively "ECAPs 508"), and a plurality of stimulation signals 509A-509N (collectively "stimulation signals 509"). In some examples, stimulation pulses 504 may represent control pulses which are configured to elicit ECAPs 508 that are detectible by IMD 200, but this is not required. Stimulation pulses 504 may represent any type of pulse that is deliverable by IMD 200. In the example of FIG. 5A, IMD 200 can deliver therapy with control pulses instead of, or without, informed pulses.

First channel 502 is a time/voltage (and/or current) graph indicating the voltage (or current) of at least one electrode of electrodes 232, 234. In one example, the stimulation electrodes of first channel 502 may be located on the opposite side of the lead as the sensing electrodes of second channel 506. Stimulation pulses 504 may be electrical pulses delivered to the spinal cord of the patient by at least one of electrodes 232, 234, and stimulation pulses 504 may be balanced biphasic square pulses with an interphase interval. In other words, each of stimulation pulses 504 are shown with a negative phase and a positive phase separated by an interphase interval. For example, a stimulation pulse 504 may have a negative voltage for the same amount of time and amplitude that it has a positive voltage. It is noted that the negative voltage phase may be before or after the positive voltage phase. Stimulation pulses 504 may be delivered according to test stimulation programs 216 stored in storage device 212 of IMD 200, and test stimulation programs 216 may be updated according to user input via an external programmer and/or may be updated according to a signal from sensor(s) 222. In one example, stimulation pulses 504 may have a pulse width of less than approximately 300 microseconds (e.g., the total time of the positive phase, the negative phase, and the interphase interval is less than 300 microseconds). In another example, stimulation pulses 504 may have a pulse width of approximately 100 μs for each phase of the bi-phasic pulse. As illustrated in FIG. 5A, stimulation pulses 504 may be delivered via channel 502. Delivery of stimulation pulses 504 may be delivered by leads 230 in a guarded cathode electrode combination. For example, if leads 230 are linear 8-electrode leads, a guarded cathode combination is a central cathodic electrode with anodic electrodes immediately adjacent to the cathodic electrode.

Second channel 506 is a time/voltage (and/or current) graph indicating the voltage (or current) of at least one electrode of electrodes 232, 234. In one example, the electrodes of second channel 506 may be located on the opposite side of the lead as the electrodes of first channel 502. ECAPs 508 may be sensed at electrodes 232, 234 from the spinal cord of the patient in response to stimulation pulses 504. ECAPs 508 are electrical signals which may propagate along a nerve away from the origination of stimulation pulses 504. In one example, ECAPs 508 are sensed by different electrodes than the electrodes used to deliver stimulation pulses 504. As illustrated in FIG. 5A, ECAPs 508 may be recorded on second channel 506.

Stimulation signals 509A, 509B, and 509N may be sensed by leads 230 and sensing circuitry 206 and may be sensed during the same period of time as the delivery of stimulation pulses 504. Since the stimulation signals may have a greater amplitude and intensity than ECAPs 508, any ECAPs arriving at IMD 200 during the occurrence of stimulation signals 509 might not be adequately sensed by sensing circuitry 206 of IMD 200. However, ECAPs 508 may be sufficiently sensed by sensing circuitry 206 because each ECAP 508, or at least a portion of ECAP 508 used as feedback for stimulation pulses 504, falls after the completion of each a stimulation pulse 504. As illustrated in FIG. 5A, stimulation signals 509 and ECAPs 508 may be recorded on channel 506. In some examples, ECAPs 508 may not follow respective stimulation signals 509 when ECAPs are not elicited by stimulation pulses 504 or the amplitude of ECAPs is too low to be detected (e.g., below the detection threshold).

Figure 5B:
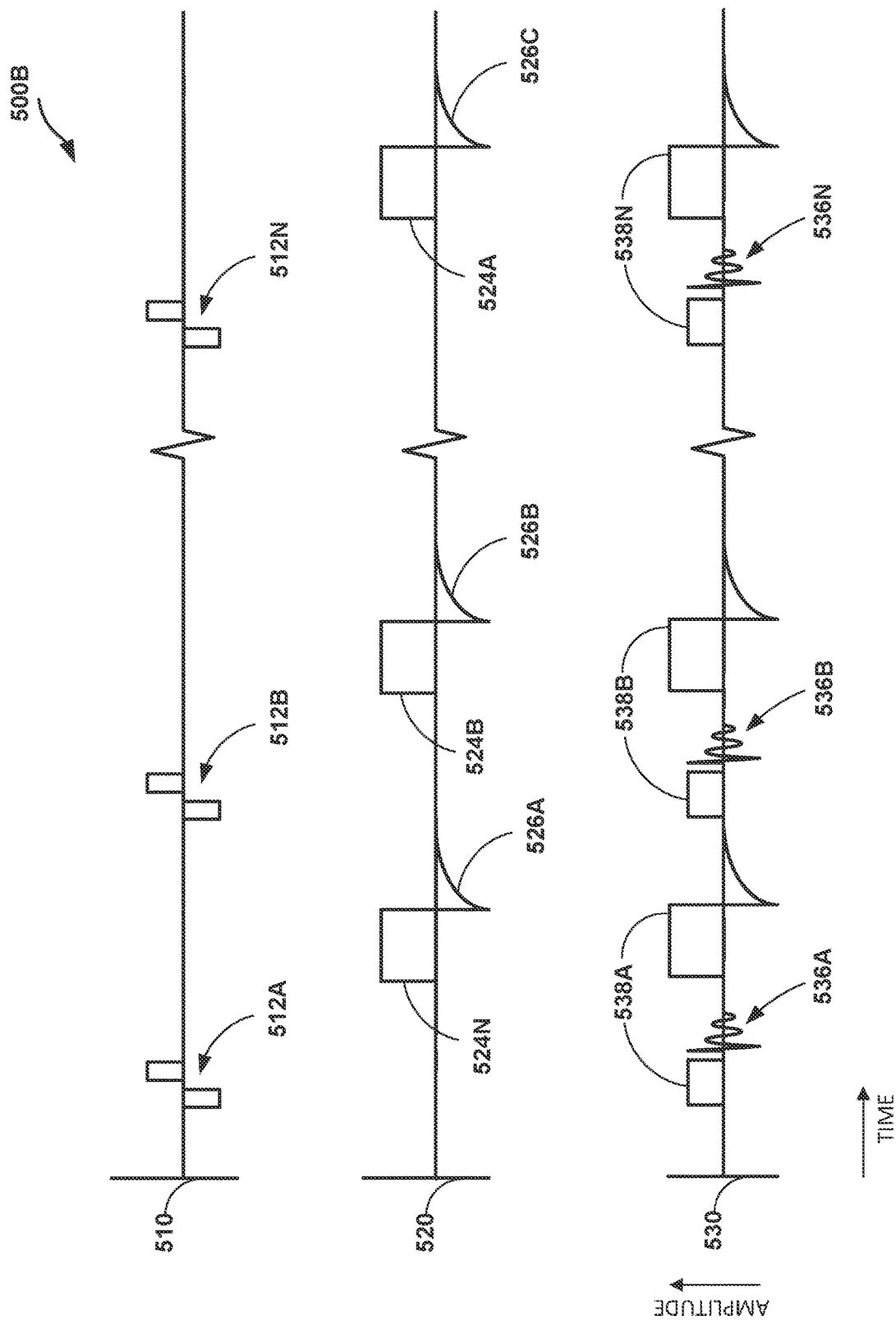
FIG. 5B is a timing diagram illustrating another example of electrical stimulation pulses, respective stimulation signals, and respective sensed ECAPs.

FIG. 5B is a timing diagram 500B illustrating one example of electrical stimulation pulses, respective stimulation signals, and respective sensed ECAPs, in accordance with one or more techniques of this disclosure. For convenience, FIG. 5B is described with reference to IMD 200 of FIG. 2. As illustrated, timing diagram 500B includes first channel 510, a plurality of control pulses 512A-512N (collectively "control pulses 512"), second channel 520, a plurality of informed pulses 524A-524N (collectively "informed pulses 524") including passive recharge phases 526A-526N (collectively "passive recharge phases 526"), third channel 530, a plurality of respective ECAPs 536A-536N (collectively "ECAPs 536"), and a plurality of stimulation signals 538A-538N (collectively "stimulation signals 538").

First channel 510 is a time/voltage (and/or current) graph indicating the voltage (or current) of at least one electrode of electrodes 232, 234. In one example, the stimulation electrodes of first channel 510 may be located on the opposite side of the lead as the sensing electrodes of third channel 530. Control pulses 512 may be electrical pulses delivered to the spinal cord of the patient by at least one of electrodes 232, 234, and control pulses 512 may be balanced biphasic square pulses with an interphase interval. In other words, each of control pulses 512 are shown with a negative phase and a positive phase separated by an interphase interval. For example, a control pulse 512 may have a negative voltage for the same amount of time that it has a positive voltage. It is noted that the negative voltage phase may be before or after the positive voltage phase. Control pulses 512 may be delivered according to test stimulation programs 216 stored in storage device 212 of IMD 200, and test stimulation programs 216 may be updated according to user input via an external programmer and/or may be updated according to a signal from sensor(s) 222. In one example, control pulses 512 may have a pulse width of 300 microseconds (e.g., the total time of the positive phase, the negative phase, and the interphase interval is 300 microseconds). In another example, control pulses 512 may have a pulse width of approximately 100 μs for each phase of the bi-phasic pulse. As illustrated in FIG. 5B, control pulses 512 may be delivered via first channel 510. Delivery of control pulses 512 may be delivered by leads 230 in a guarded cathode electrode combination. For example, if leads 230 are linear 8-electrode leads, a guarded cathode combination is a central cathodic electrode with anodic electrodes immediately adjacent to the cathodic electrode.

Second channel 520 is a time/voltage (and/or current) graph indicating the voltage (or current) of at least one electrode of electrodes 232, 234 for the informed pulses. In one example, the electrodes of second channel 520 may partially or fully share common electrodes with the electrodes of first channel 510 and third channel 530. Informed pulses 524 may also be delivered by the same leads 230 that are configured to deliver control pulses 512. Informed pulses 524 may be interleaved with control pulses 512, such that the two types of pulses are not delivered during overlapping periods of time. However, informed pulses 524 may or may not be delivered by exactly the same electrodes that deliver control pulses 512. Informed pulses 524 may be monophasic pulses with pulse widths of greater than approximately 300 μs and less than approximately 1000 μs. In fact, informed pulses 524 may be configured to have longer pulse widths than control pulses 512. As illustrated in FIG. 5B, informed pulses 524 may be delivered on second channel 520.

Informed pulses 524 may be configured for passive recharge. For example, each informed pulse 524 may be followed by a passive recharge phase 526 to equalize charge on the stimulation electrodes. Unlike a pulse configured for active recharge, where remaining charge on the tissue following a stimulation pulse is instantly removed from the tissue by an opposite applied charge, passive recharge allows tissue to naturally discharge to some reference voltage (e.g., ground or a rail voltage) following the termination of the therapy pulse. In some examples, the electrodes of the medical device may be grounded at the medical device body. In this case, following the termination of informed pulse 524, the charge on the tissue surrounding the electrodes may dissipate to the medical device, creating a rapid decay of the remaining charge at the tissue following the termination of the pulse. This rapid decay is illustrated in passive recharge phases 526. Passive recharge phase 526 may have a duration in addition to the pulse width of the preceding informed pulse 524. In other examples (not pictured in FIG. 5B), informed pulses 524 may be bi-phasic pulses having a positive and negative phase (and, in some examples, an interphase interval between each phase) which may be referred to as pulses including active recharge. An informed pulse that is a bi-phasic pulse may or may not have a following passive recharge phase.

Third channel 530 is a time/voltage (and/or current) graph indicating the voltage (or current) of at least one electrode of electrodes 232, 234. In one example, the electrodes of third channel 530 may be located on the opposite side of the lead as the electrodes of first channel 510. ECAPs 536 may be sensed at electrodes 232, 234 from the spinal cord of the patient in response to control pulses 512. ECAPs 536 are electrical signals which may propagate along a nerve away from the origination of control pulses 512. In one example, ECAPs 536 are sensed by different electrodes than the electrodes used to deliver control pulses 512. As illustrated in FIG. 5B, ECAPs 536 may be recorded on third channel 530.

Stimulation signals 538A, 538B, and 538N may be sensed by leads 230 and may be sensed during the same period of time as the delivery of control pulses 512 and informed pulses 524. Since the stimulation signals may have a greater amplitude and intensity than ECAPs 536, any ECAPs arriving at IMD 200 during the occurrence of stimulation signals 538 may not be adequately sensed by sensing circuitry 206 of IMD 200. However, ECAPs 536 may be sufficiently sensed by sensing circuitry 206 because each ECAP 536 falls after the completion of each a control pulse 512 and before the delivery of the next informed pulse 524. As illustrated in FIG. 5B, stimulation signals 538 and ECAPs 536 may be recorded on channel 530.

Figure 6A:
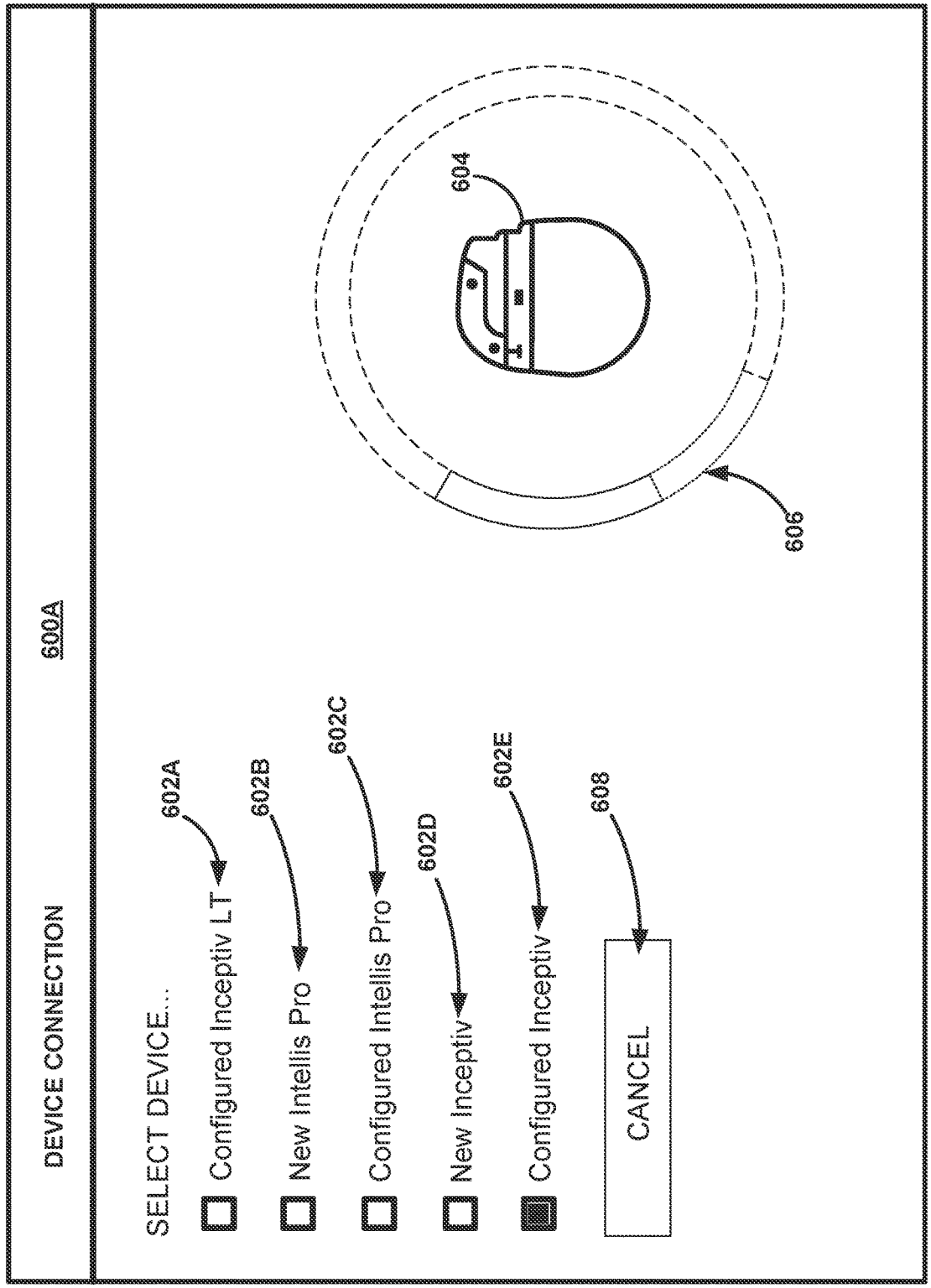
FIG. 6A is an example select-device screen of a graphical user interface (GUI) of a system for controlling electrical stimulation therapy.
Figure 6B:
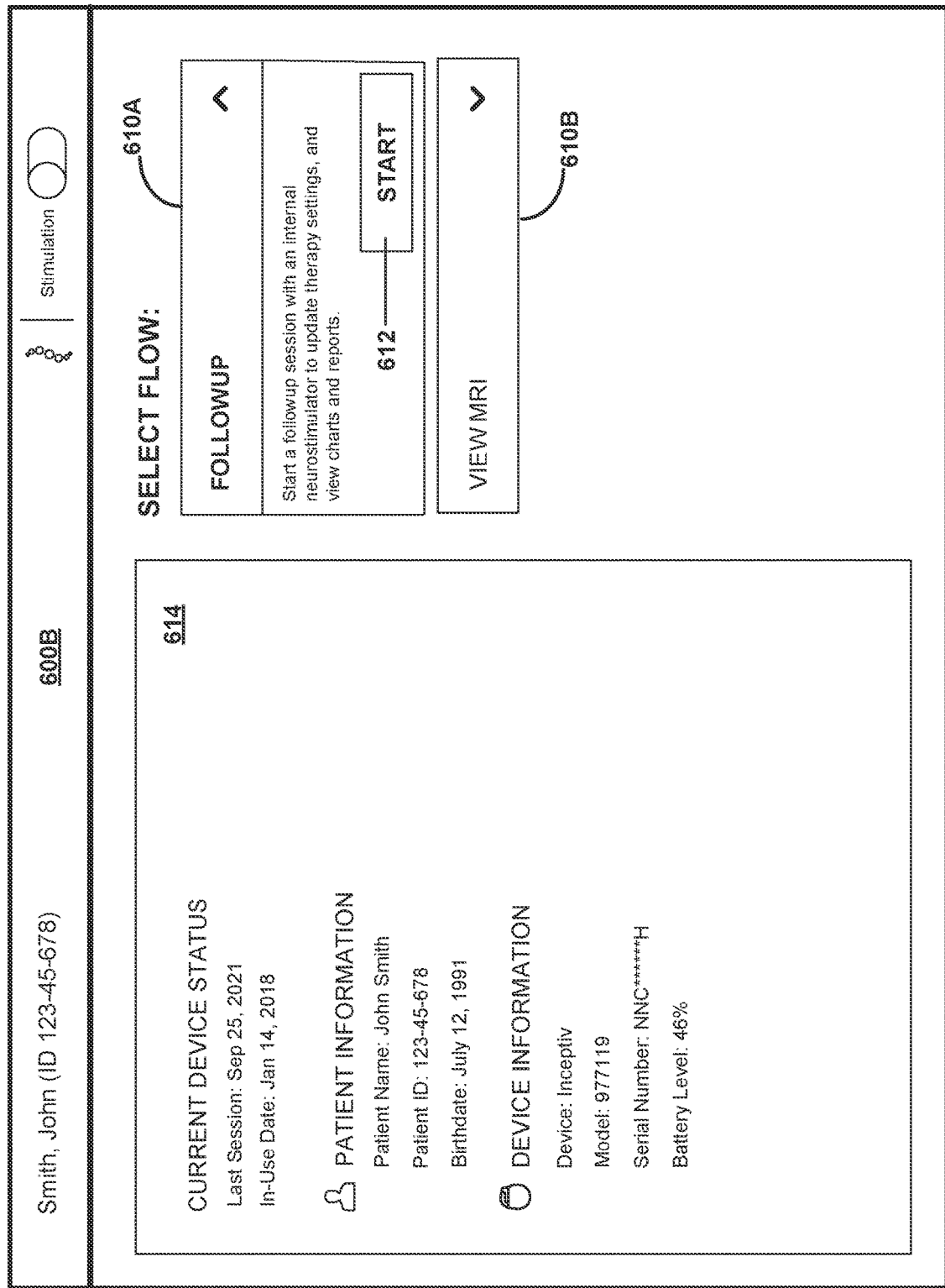
FIG. 6B is an example select-flow screen of the GUI of FIG. 6A.
Figure 6C:
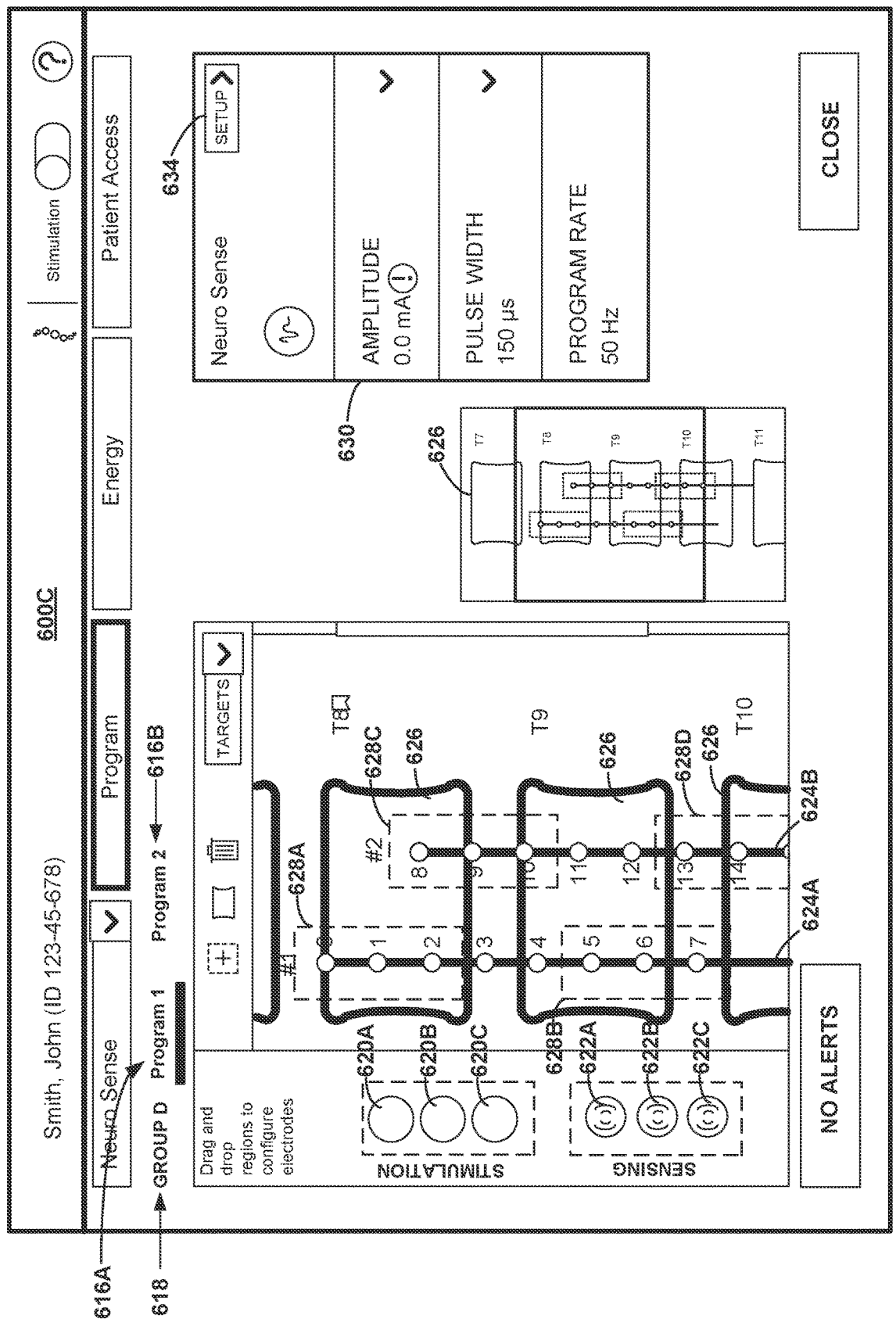
FIGS. 6C-6F are examples of a programs screen of the GUI of FIGS. 6A and 6B.
Figure 6D:
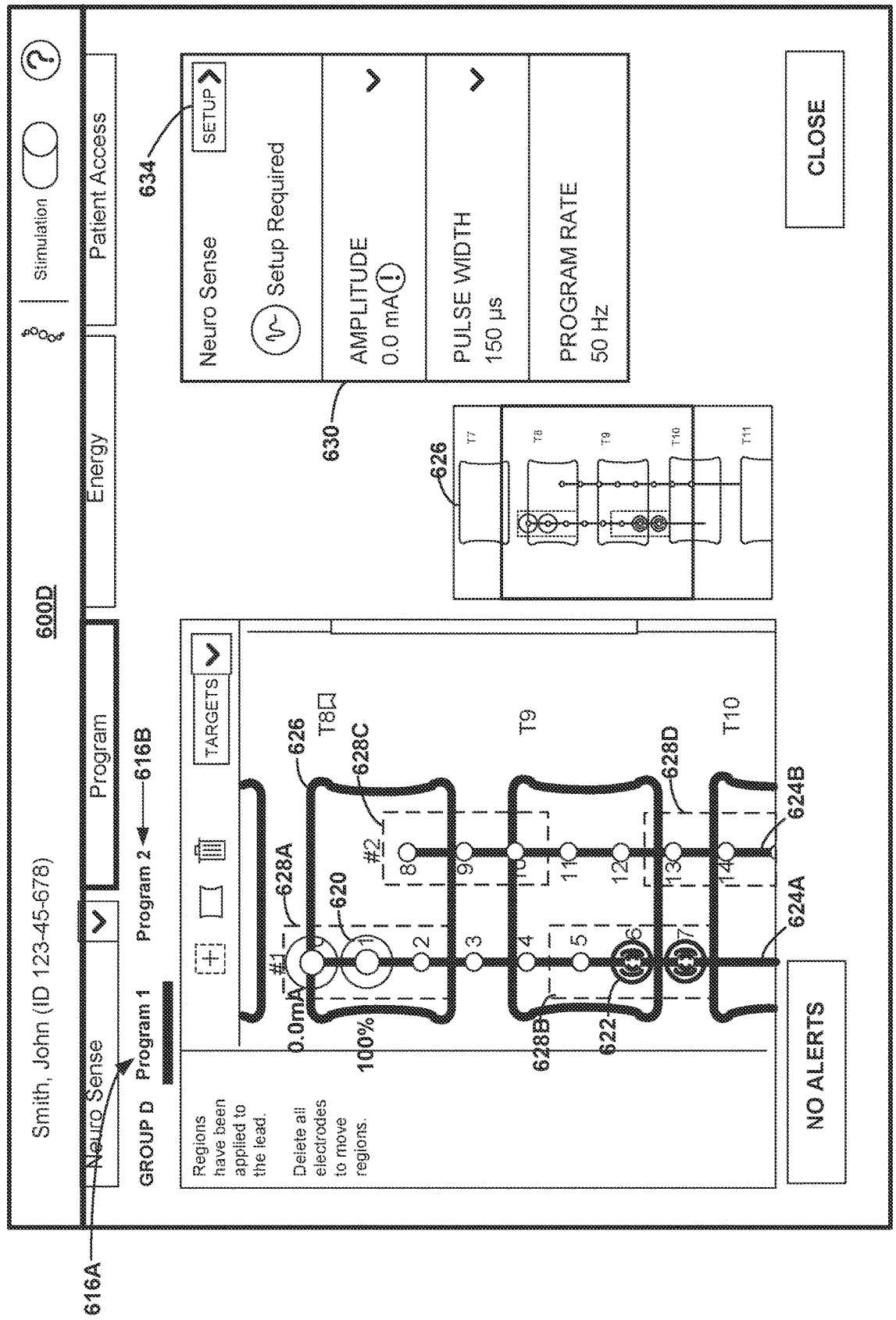
Figure 6E:
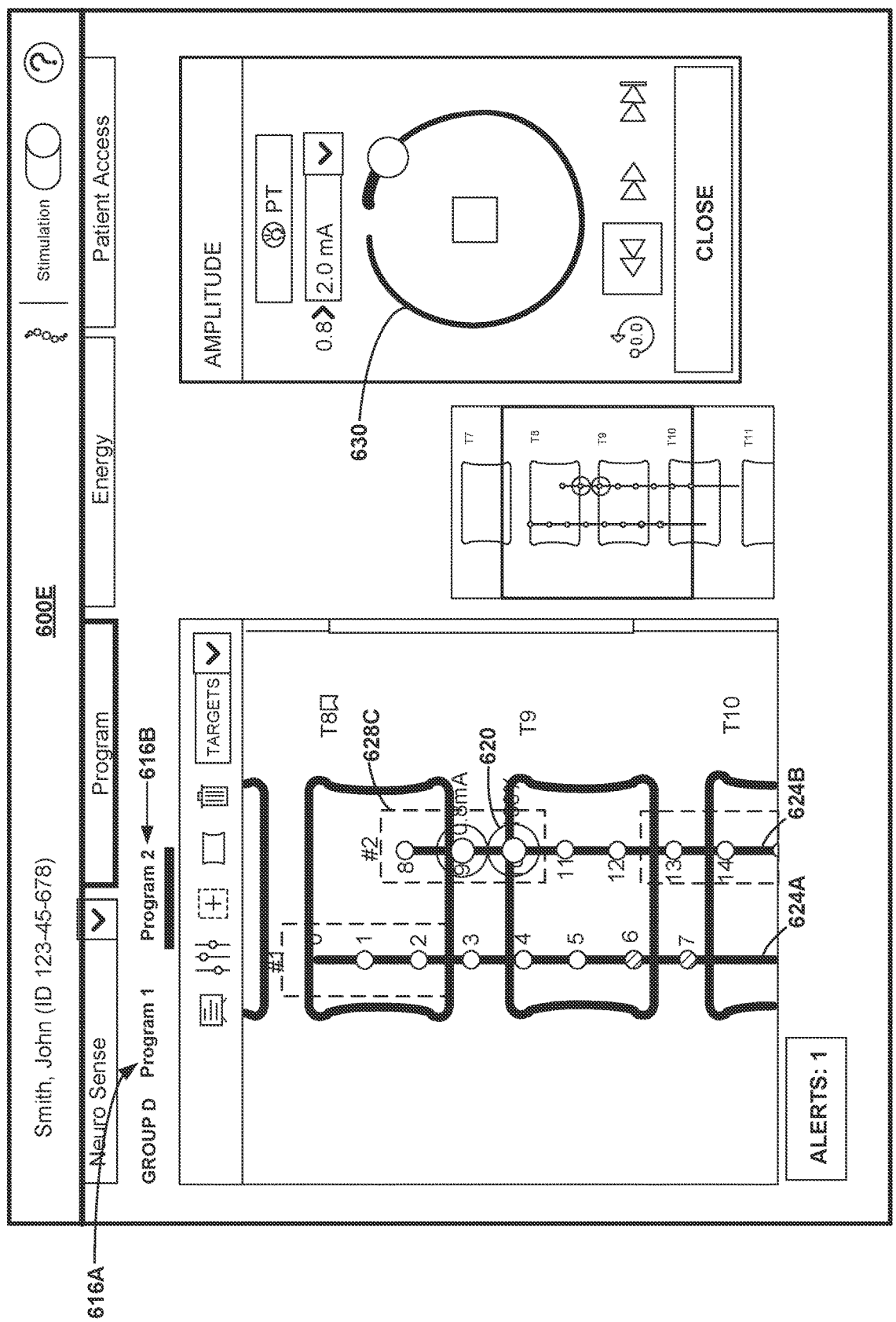
Figure 6F:
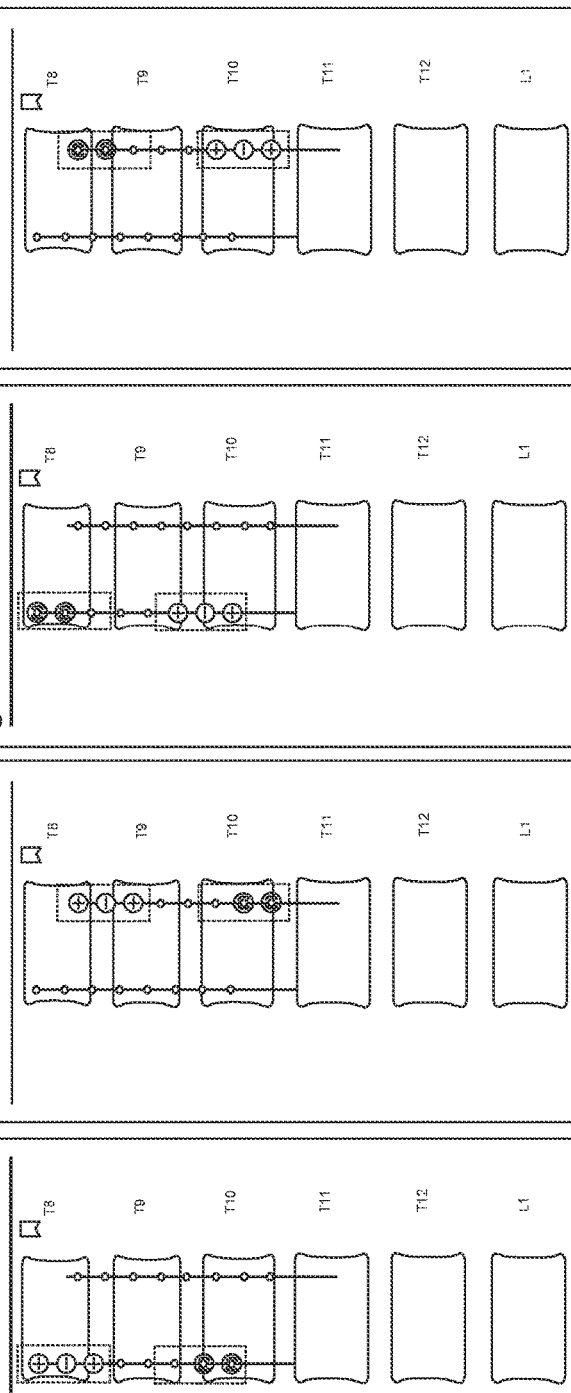
Figure 6G:
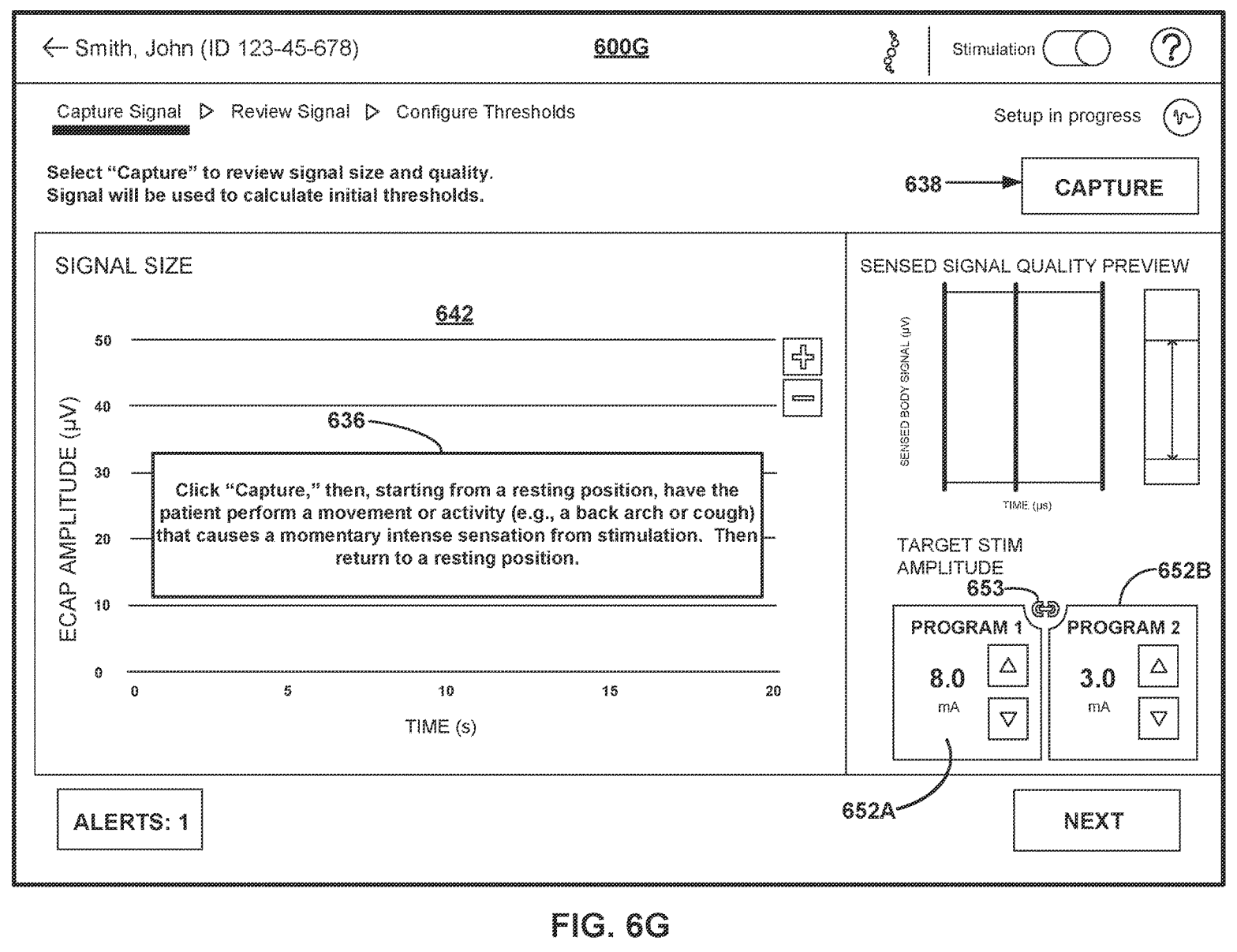
Figure 6H:
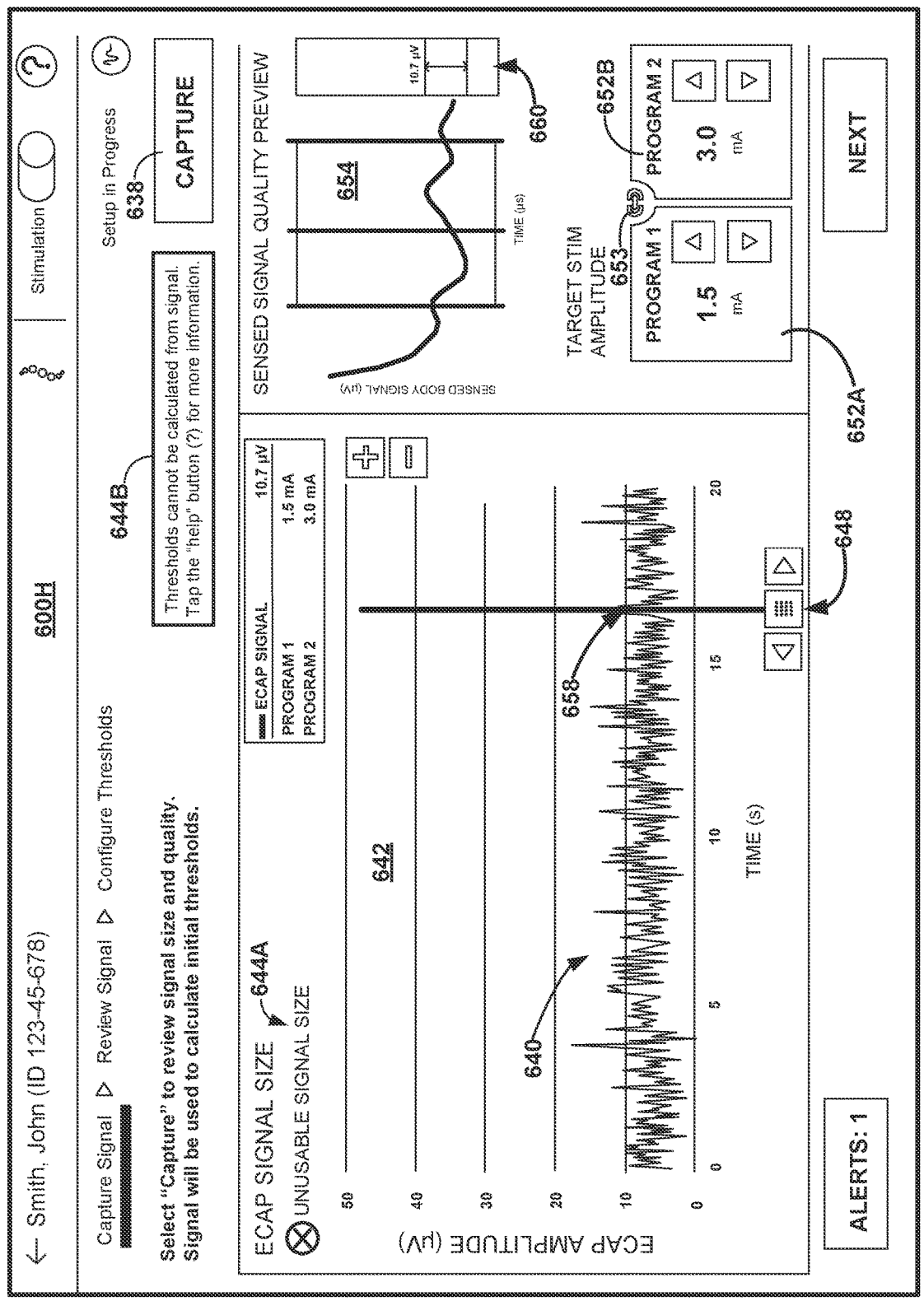
Figure 6I:
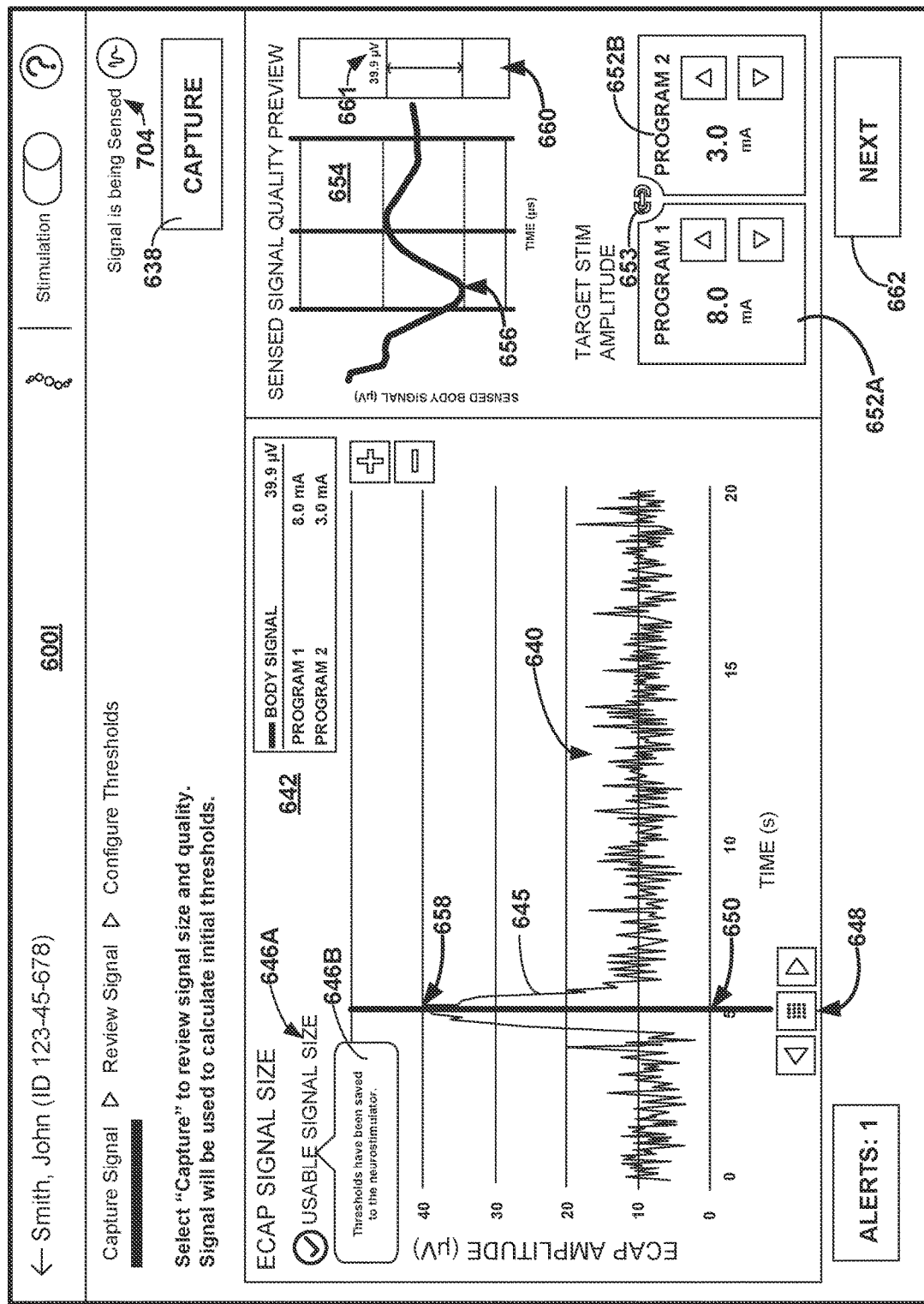
Figure 6J:
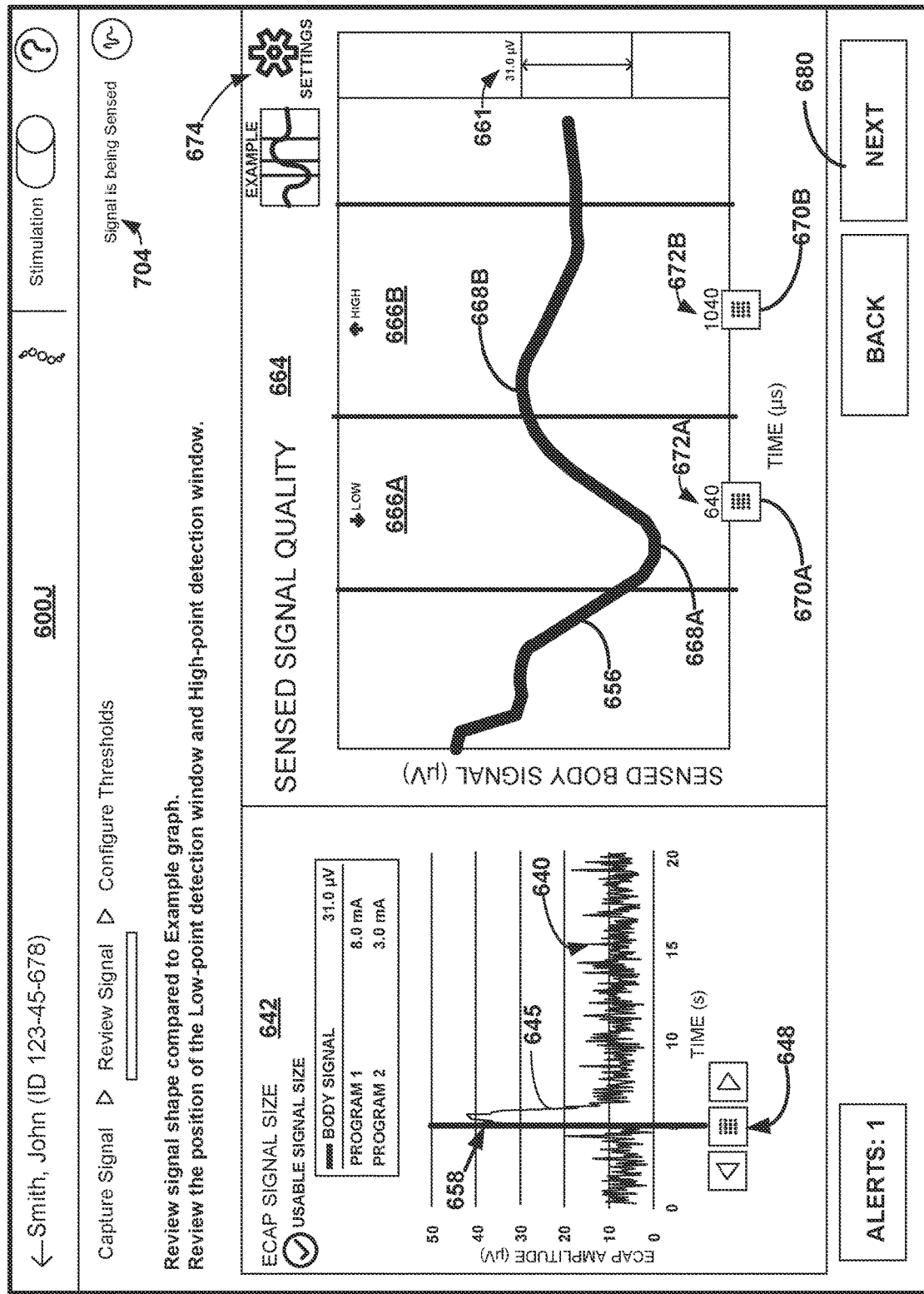
FIGS. 6J and 6K are examples of a review-signal screen of the GUI of FIGS. 6A-6I.
Figure 6K:
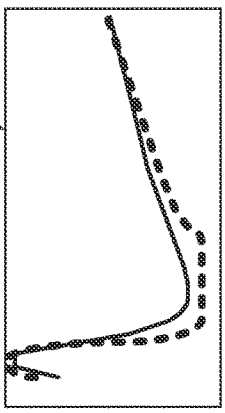
Figure 6L:
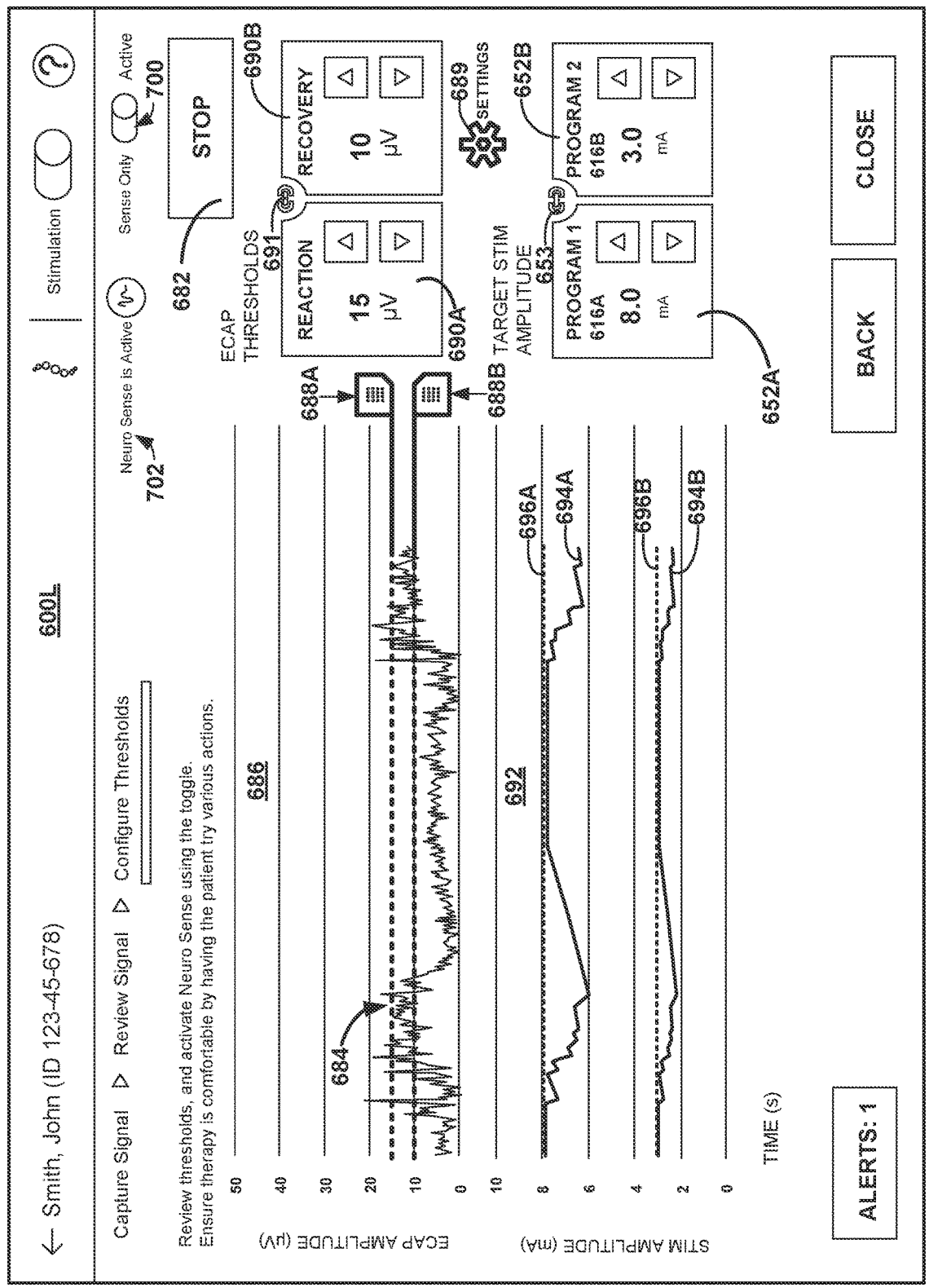
FIGS. 6L-6N are examples of a configure-thresholds screen of the GUI of FIGS. 6A-6K.
Figure 6M:
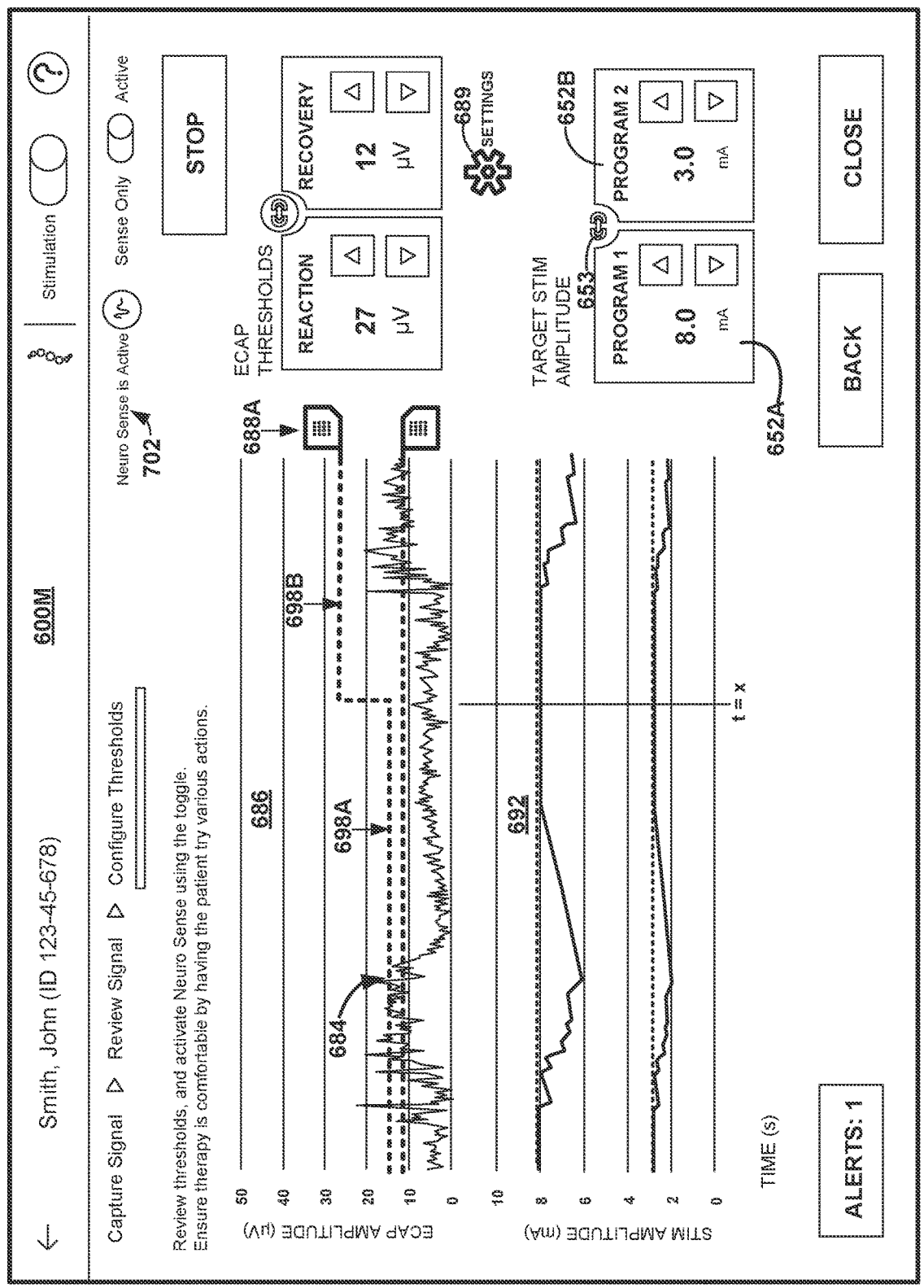
Figure 6N:
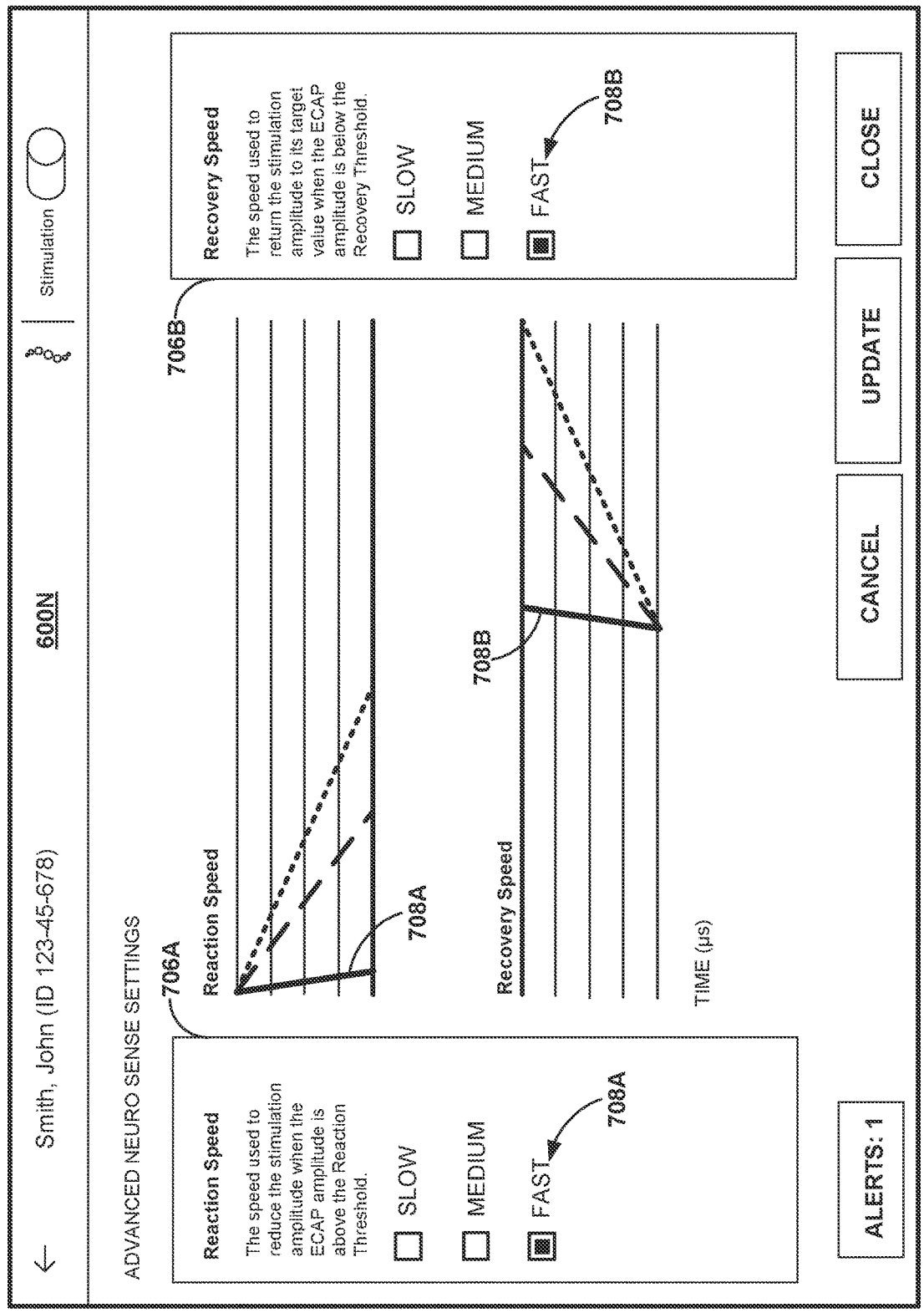

FIGS. 6A-6N are examples of screens or windows of the graphical user interface (GUI) of therapy-management application 346, e.g., that may be displayed via user interface 356 of external programmer 300 of FIG. 3. In general, therapy-management application 346 is configured to enable a user to capture an ECAP signal peak (FIGS. 6G-6I) from a sensed body signal, modify or customize representative ECAP signal parameters based on an ECAP signal within ECAP signal peak (FIGS. 6J and 6K), and manually adjust one or more stimulation therapy parameters in real-time (FIGS. 6L-6N).

In other examples, therapy-management application 346 may include more, fewer, or different screens than those shown in FIGS. 6A-6N. For example, one or more aspects attributed to receiving user input may be automated such that those associated screens are no longer required to be shown. Accordingly, it is to be understood that FIGS. 6A-6N are merely examples illustrating the functionality of therapy-management application 346. For instance, although not described in detail in this application, the therapy-management application GUI can include a device-info screen, a lead-selection screen, a tip-selection screen, a lead-manipulation screen, an impedance screen, a diaries screen, a reports screen, and/or a summary screen.

In some examples, but not all examples, therapy-management application 346 includes a select-device screen 600A, an example screenshot of which is illustrated in FIG. 6A. In the example shown in FIG. 6A, select-device screen 600A includes a list of different types of medical devices 602A-602E (e.g., IMD 110 of FIG. 1 or IMD 200 of FIG. 2) from which a user may select. In the example illustrated in FIG. 6A, the user has selected the checkbox next to the "Configured Inceptiv" option 602E, represented by the device icon 604. Select-device screen 600A further includes a "loading" ring 606, indicating that therapy-management application 346 is currently retrieving device-specific data from memory 354 (FIG. 3). However, should the user wish to abort the data retrieval, select-device screen 600A further includes a "Cancel" button 608.

Upon completing the device-specific data retrieval, in some examples, therapy-management-application 346 is further configured to output for display a select-flow screen 600B, an example screenshot of which is shown in FIG. 6B. Select-flow screen 600B includes indications for a plurality of different "flows" 610A, 610B, or series of actions, that may be performed in conjunction with the selected IMD 602E. In the example shown in FIG. 6B, the user has selected the "Followup" flow 610A, revealing a selectable "Start" button 612 to initiate the selected flow 610A.

In some examples, but not all examples, select-flow screen 600B is further configured to display the device-specific (and in some cases, patient-specific) information 614, previously retrieved from memory 354. Such information 614 may include, as non-limiting examples, a current device status (e.g., timestamps indicating a first use of the selected device 602E and/or a most-recent use of the selected device 602E); other device information such as a device name, a device model number, a device serial number, and a current device battery level; and in some examples, but not all examples, patient-specific information including a patient name, a patient identifier, and a patient date-of-birth.

FIGS. 6C-6F are screenshots 600C-600F, respectively, of examples of an electrode-placement screen of the GUI of therapy-management application 346. For instance, in some examples, but not all examples, the "Followup" flow 610A selected in select-flow screen 600B may include an electrode-placement screen 600C-600F enabling the user to customize, for each of one or more stimulation therapy programs 616A, 616B within a particular group 618 of therapy programs 616, an anatomical placement for one or more sets of stimulation electrodes 620A-620C and/or one or more sets of sensing electrodes 622A-622C, relative to electrode leads 624A, 624B (e.g., leads 130A, 130B of FIG. 1).

In some examples, Group D (618) of screen 600C may include a "Neuro Sense" group of therapy programs 616, whereas other groups may include, as non-limiting examples, a "legacy" group and a differential-target-multiplexed (DTM) spinal cord stimulation (SCS) group. Although therapy Group D (618) is shown to include two therapy programs 616A, 616B, in other examples, a therapy group may include just one therapy program 616, or more than two therapy programs.

For instance, electrode-placement screen 600C may include a graphical representation 626 of the spinal cord 120 (FIG. 1) of the patient, overlaid with leads 624. Each of leads 624 includes a respective plurality of available electrode regions 628A-628D. By dragging and dropping the stimulation electrodes 620 and the sensing electrodes 622 onto desired regions 628, the user indicates to therapy-management program 346 which electrodes 232, 234 (FIG. 2) of leads 230 to activate during execution of the respective therapy program 616.

In the example shown in FIG. 6C, the user has not yet selected regions for stimulation electrodes 620 or sensing electrodes 622 for therapy Program 1 (616A). By comparison, in electrode-placement screen 600D of FIG. 6D, the user has selected region 628A on lead 624A for the stimulation electrodes 620, and region 628B on lead 624A for the sensing electrodes 622.

Similarly, as shown in electrode-placement screen 600E of FIG. 6E, the user has selected region 628C on lead 624B for the stimulation electrodes 620 of therapy Program 2 (616B). However, individual electrodes 6 and 7 on lead 624A are "greyed out," indicating that these electrodes are already in use by therapy Program 1 (616A) and are not available for use in therapy Program 2 (616B). Also shown in electrode-placement screen 600E of FIG. 6E is an amplitude adjustment wheel 630 configured to enable the user to select an initial stimulation amplitude 630 for the respective therapy Program 2 (616B).

As illustrated in FIG. 6F, in some examples, but not all examples, therapy-management application 346 includes an electrode-templates screen 600F. Electrode-templates screen 600F includes a plurality of predetermined electrode-placement configurations 632A-632D from which the user may select, e.g., in addition to, or instead of, manually placing electrodes via electrode-placement screens 600C-600D. Once the electrode placements are configured via either or both interfaces, and optionally, once initial stimulation amplitudes are selected via wheel(s) 630, the user may select the "Setup" button 634 (FIGS. 6C, 6D) to begin collecting data to inform the stimulation therapy parameters. For instance, user-actuation of "Setup" button 634 may cause therapy-management program 346 to load and display a capture-signal screen of the GUI of therapy-management program 346, examples of which are shown in FIGS. 6G-6I.

FIG. 6G is a first screenshot 600G of an example capture-signal screen of therapy-management application 346. The capture-signal screen is configured to guide the user to capture an ECAP signal peak based on sensed signals from electrodes placed proximate to the body of the patient. Parameters of a point within the representative ECAP signal peak may be extracted and used to inform or determine ECAP signal-capture parameters for capturing subsequent ECAP signals, which may then be used to determine initial values for control policy parameters of subsequent stimulation therapy for the patient. For instance, dimensions of a selected representative ECAP waveform associated with a selected point within the ECAP signal peak may be used to identify appropriate sensing windows (e.g., times and/or durations), signal filters, or other parameters that define how the system can detect subsequent ECAP signals. Additionally or alternatively, parameters of the representative ECAP waveform and/or ECAP signal peak can be used to set an initial ECAP reaction threshold and/or an initial ECAP recovery threshold, for enabling a decrement mode or an increment mode, respectively, of IMD 200, as described above with respect to FIG. 2.

FIG. 6G shows a capture-signal screen 600G while in an initial-setup configuration. In this state, screen 600G displays an instruction window 636 instructing the user to have the patient perform an aggressor action, such as a back arch or a cough, to trigger a transient overstimulation while IMD 200 senses a body signal via sensing electrodes, such as the sensing electrodes 622 selected via the electrode-placement screen(s) 600C-600E and/or electrode-template screen 600F, as described above. As detailed above, and further below, therapy-management application 346 identifies one or more ECAP waveforms within the sensed body signal, and determines or generates another dataset of ECAP amplitudes, wherein each ECAP amplitude corresponds to an identified ECAP waveform within the sensed body signal. For instance, as detailed further below, the ECAP amplitude may indicate a difference between a high-point (e.g., local maximum) amplitude of the ECAP waveform and a low-point (e.g., local minimum) amplitude of the ECAP waveform. Therapy-management application 346 may then display a plot or line graph of the ECAP amplitudes as a "continuous" ECAP signal 640 (FIG. 6H) in ECAP signal size graph 642.

In some examples, therapy-management application 346 may define a limited time window starting from the time at which the user actuates the "Capture" button 638, such as about 20 seconds (as shown in FIG. 6G), during which to perform the aggressor action and sense the body signal from the patient. In some such examples, as illustrated in capture-signal screen 600H of FIG. 6H, therapy-management application 346 may analyze ECAP signal 640 (as displayed via ECAP signal-size graph 642 in screen 600H), and determine that ECAP signal 640 does not meet minimum criteria for containing at least one "usable" ECAP signal peak. As one non-limiting example, the minimum criteria may include that an amplitude of the ECAP signal 640 (e.g., a characteristic or representative ECAP value) exceeds a threshold amplitude. The threshold amplitude can include an absolute amplitude value, a predetermined multiple above a baseline-noise amplitude within the ECAP signal 640, or some other threshold.

In some such examples, capture-signal screen 600H may display an "Unusable Signal Size" indication 644A and/or an indication 644B that ECAP parameters cannot be calculated from the ECAP signal 640 using the current signal-sensing parameters, and prompt the user to re-capture the ECAP signal 640. For instance, the user may attempt to re-capture ECAP signal 640 after using target-stimulation-amplitude-adjustment widget(s) 652A, 652B to increase a target stimulation amplitude of any of the delivered electrical stimulation pulses that may elicit an ECAP signal. However, in instances in which the user actuates either of amplitude widgets 652 to adjust the target stimulation amplitude while "sensing" the ECAP signal 640, therapy-management application 346 may display a window indicating that the amplitude of the electrical stimulation signal should not be changed during sensing for a usable ECAP signal peak, and that the ECAP signal 640 should be re-captured after pausing the sensing to adjust the amplitude.

As shown in FIGS. 6G-6I, target-amplitude-adjustment widgets 652 include a "link" toggle 653 that, when actuated, causes a change in any one stimulation amplitude 652 for a particular therapy program 616 (FIG. 6E) to be applied to the other stimulation amplitude(s) as well. In some cases, link toggle 653 causes all stimulation amplitudes to be increased by a same "absolute" amount, such that a difference between any pair of stimulation amplitudes is preserved. In other cases, link toggle 653 causes all stimulation amplitudes to be increased by a same "relative" amount, such that a ratio between any pair of stimulation amplitudes is preserved.

In other examples, as illustrated via capture-signal screen 600I of FIG. 6I, therapy-management application 346 may analyze ECAP signal 640 and determine that ECAP signal 640 does meet minimum criteria for including at least one usable (e.g., above-threshold) signal peak 645 that includes one or more characteristic or representative ECAP values that are sufficient to configure parameters of subsequent ECAP signals for controlling stimulation therapy. In some such instances, therapy-management application 346 may display, via capture-signal screen 600I, an indication 646A of a usable signal peak 645 present within ECAP signal 640 and/or an indication 646B that initial or preliminary ECAP parameters have been calculated based on a particular ECAP value (e.g., occurring at the maximum amplitude) of the ECAP signal peak 645 and saved to memory 212 (FIG. 2) of IMD 200. In other examples, rather than defining a limited time window during which to capture a usable ECAP signal peak 645, therapy-management application 346 may continuously stream ECAP signal 640 until such a usable signal peak 645 is detected.

Upon identifying a usable signal peak 645, therapy-management application 346 is configured to display, via capture-signal screen 600I, a slidable marker 648 that identifies an amplitude of the ECAP signal 640 at a specific time 650, e.g., overlaid onto the displayed ECAP signal 640. For instance, therapy-management application 346 may be configured, by default, to initially position slidable marker 648 at the location of the maximum amplitude of ECAP signal peak 645. Slidable marker 648 (also referred to as "scrubber 648") is configured to be user-movable to different time instances within the time window defined by ECAP signal-size graph 642. For instance, as detailed further below, depending on one or more parameters of the selected ECAP amplitude value 658 within signal peak 645, the user may desire to move slidable marker 648 to select or indicate a different representative ECAP value within ECAP signal peak 645, or within a different ECAP signal peak, if present, within ECAP signal 640.

As shown in FIGS. 6G-6I, capture-signal screens 600G-600I each include a signal-quality-preview window 654 configured to display the ECAP waveform 656 (e.g., the portion of the original body signal sensed by the electrodes) associated with the selected ECAP amplitude value 658 indicated by the selected position of slidable marker 648. In some examples, capture-signal screen 600I further includes an indication of one or more ECAP parameter values 660 associated with the selected ECAP waveform 656. For instance, the ECAP parameter values 660 may include an indication of the net ECAP amplitude 661 of ECAP waveform 656 (e.g., equivalent to the selected ECAP amplitude 658), wherein the net ECAP amplitude 661 corresponds to a difference between a local ECAP minimum 668A (FIG. 6J) and a local ECAP maximum 668B of the selected ECAP waveform 656. ECAP parameters 660 may additionally or alternatively include a maximum sensed-signal amplitude (e.g., P2) contained within signal-quality-preview window 654.

When the user is satisfied with the selected representative ECAP waveform 656 (e.g., based on an initial or approximate alignment of ECAP waveform 656 within signalquality-preview window 654, the user can select the "Next" button 662 to advance to a review-signal screen to more-precisely analyze and refine the representative ECAP waveform 656. An example review-signal screen 600J of the GUI of therapy-management program 346 is shown in FIG. 6J.

As shown in FIG. 6J, review-signal screen 600J includes a scaled-down version of the ECAP-signal-size graph 642 of FIG. 6I, as well as a signal-quality graph 664 of the selected representative ECAP waveform 656 corresponding to the selected ECAP amplitude 658, as identified by the position of slidable marker 648 in the ECAP-signal-size graph 642. Signal-quality graph 664 includes a low-point detection window 666A capturing a local minimum value 668A (e.g., N1) of ECAP waveform 656, and a high-point detection window 666B (e.g., P2) capturing a local maximum value 668B of ECAP waveform 656. Each detection window 666A, 666B includes a respective horizontal slider 670A, 670B, enabling the user to readjust the horizontal position (e.g., in time) of the respective detection window 666 relative to ECAP waveform 656 (e.g., with ECAP waveform 656 remaining stationary). In other examples, signal-quality graph 664 includes a horizontal slider enabling the user to readjust the horizontal position of ECAP waveform 656 relative to detection windows 666 (e.g., with detection windows 666 remaining stationary). Above the horizontal sliders 670A, 670B are respective time values 672A, 672B indicating relative start times of the detection windows 666 based on the horizontal positions of detection windows 666. The relative start times 672 may indicate an amount of time since an end of a delivered electrical stimulation pulse triggering the ECAP waveform 656, an amount of time since a beginning or origin of the duration displayed in either of signal-quality graph 664 or ECAP-signal-size graph 642, or any of these values with a certain amount of time "masked" from the beginning of the respective signal to shift the values.

In some examples, signal-quality graph 664 includes user-input means (e.g., horizontal sliders 670 or another mechanism) enabling the user to modify a relative width (e.g., duration in time) of each detection window 666. In other examples, the widths of detection windows 666 are fixed values, e.g., calculated by therapy-management application 346 based on a plurality of factors, including, as non-limiting examples, a selected electrode configuration of leads 624 (FIG. 6D), a pulse width of a delivered electrical stimulation pulse triggering the ECAP waveform 656, a lead type of electrode leads 624, and or the application and/or configuration of one or more filters or settings applied to ECAP waveform 656, such as a derivative filter (as detailed further below). For instance, review-signal screen 600J includes a selectable "Advanced Settings" icon 674, causing therapy-management application 346 to load an advanced-signal-settings screen, an example of which is shown in FIG. 6K.

As shown in FIG. 6K, advanced-signal-settings screen 600K includes a plurality of customizable filters and/or settings 676A-676C for manipulating and customizing ECAP waveform 656. In the example shown in FIG. 6K, settings 676A-676C include: a noise-reduction filter setting 676A configured to reduce an amount of noise within the original sensed body signal and/or the corresponding ECAP signal 640; an artifact-reduction filter setting 676B configured to modify a shape of ECAP signal 640 and/or ECAP waveform 656 to reduce stimulation artifacts; and a gain setting 676C configured to modify an amount by which therapy-management application 346 amplifies the original sensed body signal and/or ECAP signal 640. In other examples, settings 676 may include additional, fewer, or different filters and/or settings.

In some examples, external programmer 300 (FIG. 3) is configured to interface with IMD 200 (FIG. 2) to apply the selected settings 676 to the raw sensed body signal prior to streaming the sensed signal from IMD 200 to external programmer 300. In other examples, external programmer 300 is configured to generate and store a copy of the raw sensed body signal with each filter or setting 676 applied, in order to show the user what the sensed signal would look like with the filter or setting applied. In some examples, but not all examples, therapy-management application 346 is configured to "decimate" or "drop" certain datapoints of sensed body signal(s) received from IMD 200, thereby marginally reducing a resolution of the sensed signal, but also conserving limited streaming bandwidth and/or processing power. In some examples, this signal resolution may be configured by another user-customizable filter 676.

In some examples, noise-reduction filter 676A indicates an averaging over a certain number of consecutive received data samples or datapoints of the sensed body signal. For instance, as non-limiting examples, a "low" setting for noise-reduction filter 676A may indicate an averaging over 2 or 3 datapoints; a "medium" setting for noise-reduction filter 676A may indicate an averaging over 4 datapoints; and a "high" setting for noise-reduction filter 676A may indicate an averaging over 6 consecutive datapoints. In some examples, these integer "averaging" values may be predetermined and fixed within therapy-management application 346. In other examples, the user may be able to specify a custom value for the integer "averaging" value. In other examples, the user may be able to specify a custom integer value for each of the "low," "medium," and "high" settings.

In some examples, artifact-reduction filter 676B comprises a derivative filter defining a coefficient value indicating a relative amount by which to filter the original sensed body signal. In some examples, the coefficient value comprises a predetermined, fixed value. In other examples, the coefficient value may be customizable by the user. In some examples, therapy-management application 346 comprises a machine-learning-based model trained to refine the coefficient value based on parameters of the sensed body signal. In some examples, the artifact-reduction filter may include a plurality of derivative filters, each derivative filter defining a respective coefficient value corresponding to a respective electrode configuration along leads 624.

In the example shown in FIG. 6K, the gain value 676C includes a selectable "high" gain setting and a selectable "low" gain setting, indicating predetermined relative gain coefficients by which to multiply individual amplitude values within the sensed body signal and/or the calculated ECAP signal 640. In other examples, the gain value 676C may include a selectable range of values, or a user-customizable value. In some examples, therapy-management application 640 is configured to determine the gain value 676B based on a detected posture state of the patient, e.g., as indicated by an accelerometer, as described above. Additionally or alternatively, therapy-management application 640 may be configured to determine and automatically update the gain value 676B in real-time based on whether the original sensed body signal and/or the ECAP signal is currently increasing or decreasing, e.g., relative to one or more threshold values, and/or based on a current saturation of the respective signal at that point in time. Additionally or alternatively, therapy-management application 346 may be configured to apply a different predetermined gain value 676B based on whether selected IMD 602 (FIG. 6A)

includes a cervical-spine electrical stimulator, a surgical lead, or another type of medical device requiring a device-specific gain value.

In some examples, therapy-management application 346 is configured to store and apply a "default" selection for each of filters 676A-676C. As a non-limiting example, therapy-management application 346 may apply a "medium" selection for noise-reduction filter 676A by default; an "on" selection for artifact-reduction filter 676B by default; and a "high" selection for gain value 676C by default. In the example shown in FIG. 6K, screen 600K includes a plurality of "preview" windows 678A-678C illustrating an effect of applying the respective filter 676. In some such examples, therapy-management application 346 is configured to generate the preview windows by applying the selected filter option to a copy of the sensed signal stored in memory, as described above.

Once the user approves of the positions of detection windows 666 (FIG. 6J) and optionally applies or modifies filters 676 to refine ECAP waveform 656, the user may select the "Next" button 680 on screen 600J. Next button 680 causes therapy-management application 346 to configure, based on the selected and/or refined ECAP waveform 656, one or more control policy parameters or ECAP sensing parameters, such as the positions and widths of detection windows 666 for determining local minima and maxima 668 when extracting ECAP waveforms from subsequent sensed body signals to determine net ECAP amplitudes of ECAP signal 640. In some examples, based on parameters of the refined ECAP waveform 656, therapy-management application 346 may additionally or alternatively configure (or reconfigure, as appropriate) initial ECAP-reaction and ECAP-recovery thresholds for subsequent stimulation therapy. In examples in which therapy-management application 346 automatically determined initial ECAP threshold values upon capture of ECAP signal 640 and detection of a usable signal peak 645, selecting the "Next" button 680 causes therapy-management application 346 to re-calculate and update the initial ECAP thresholds, as appropriate. Therapy-management application 346 then loads a configure-thresholds screen, examples of which are shown in FIGS. 6L and 6M.

FIG. 6L is an example configure-thresholds screen 600L of the GUI of therapy-management application 600L. In some examples, therapy-management application 346 configures screen 600L based on values (e.g., ECAP parameter values) received from previous capture-signal screen(s) and review-signal screen(s). In other examples, the user may skip directly to configure-thresholds screen 600L, e.g., without interacting with capture-signal screen(s) or review-signal screen(s). In some such cases, therapy-management application 346 may apply predetermined default values for, e.g., ECAP parameters and/or threshold values.

Upon user-selection of the Start/Stop button 682 of screen 600L, therapy-management application 346 begins streaming ECAP signal 684. Similar to ECAP signal 640 (FIG. 6I), ECAP signal 684 includes individual ECAP amplitude values calculated from respective ECAP waveforms extracted from raw sensed body signal, e.g., elicited by a stimulation (or "ping") signal. More specifically, datapoints within ECAP signal 684 may include the "net" ECAP amplitudes (e.g., net ECAP amplitude 661 of FIG. 6J) determined, in real-time, from ECAP waveforms extracted from an original sensed body signal. Therapy-management application 346 displays ECAP signal 684 within ECAP signal graph 686.

In some examples, but not all examples, ECAP signal 684 is a real-time data stream of characteristic ECAP values determined from respective sensed body signals, e.g., updated and displayed as the signal is detected by IMD 200 (FIG. 2) and received by programmer 300 (FIG. 3). In other examples, ECAP signal 684 is a historical data stream, or a set of parameters defining characteristic behaviors of a theoretical data stream, retrieved from memory. In some examples, in response to a maximum amplitude of ECAP signal 684 either exceeding a vertical scale of ECAP graph 686 or falling below a threshold vertical scale of ECAP graph 686, therapy-management application 346 may be configured to automatically re-adjust the vertical scale of ECAP signal graph 686 to better-accommodate the sensed signal. Additionally or alternatively, ECAP signal graph 686 may include Zoom-In and Zoom-Out buttons enabling the user to manually re-adjust the vertical scale of ECAP signal graph 686.

ECAP signal graph 686 includes a pair of movable vertical sliders 688A, 688B. For instance, vertical slider 688A enables the user to modify the value of the ECAP reaction threshold, as described above. Similar functionality is provided by the up-and-down arrows of reaction-threshold widget 690A. Similarly, vertical slider 688B enables the user to modify the value of the ECAP recovery threshold, as described above. Similar functionality is provided by the up-and-down arrows of recovery-threshold widget 690B. Similar to target-amplitude widgets 652, ECAP threshold widgets 690 include a link toggle 691 that, when actuated, causes the ECAP reaction threshold and the ECAP recovery threshold to be modified by the same amount, whether an "absolute" amount (e.g., preserving a difference between the thresholds) or a "relative" amount (e.g., preserving a ratio between the thresholds).

Configure-thresholds screen 600L further includes a stimulation-amplitude graph 692. Stimulation-amplitude graph 692 includes, for each therapy program 616A, 616B of the selected group 618 (FIG. 6C) of therapy programs 616, respective stimulation amplitudes 694A, 694B. In some examples, but not all examples, stimulation-amplitude graph 692 may be positioned directly above or directly below ECAP-signal graph 686, and horizontally aligned with ECAP-signal graph 686 with respect to the horizontal time axis, such that the two graphs may share a common horizontal (e.g., time) axis.

Each stimulation amplitude 694 represents an amplitude of an electrical stimulation signal as determined and instructed by therapy-management application 346 for delivery to the patient by IMD 200. In some examples, this amplitude 694 corresponds to the amplitude of the electrical stimulation signal as actually delivered by IMD 200 to the patient. In other examples, the amplitudes of line graphs 694 may slightly deviate from actual-delivered stimulation amplitudes based on one or more factors (e.g., electrical impedance, etc.).

Stimulation amplitude graph 692 further displays each stimulation amplitude signal 694 relative to an indicator 696A, 696B of a respective target stimulation amplitude. That is, a difference in amplitude (e.g., at a common point in time) between "delivered" stimulation amplitude 694 (e.g., solid line) and the respective "target" stimulation amplitude 696 (e.g., dashed line) indicates that therapy-management application 346 is actively changing the delivered stimulation therapy amplitude 694, either to re-approach the target stim amplitude 696, to increment or decrement based on ECAP amplitudes 684 relative to ECAP thresholds 688, or both.

In some examples, relative vertical positions of ECAP threshold sliders 688 and target-amplitude indicators 696 represent only a "present" or "current" value of the respective signal amplitude. In other examples, such as the example shown in FIG. 6M, each of vertical threshold sliders 688 and amplitude indicators 696 are configured to change shape in response to modification of the respective value, in order to represent the ECAP-threshold or target-amplitude signal at the point in time at which the respective value was applied. For instance, in the example shown in FIG. 6M, the user modified the ECAP-reaction threshold at time t=x, and more specifically, from 15 µV to 27 µV. Accordingly, in addition to the vertically movable tab, vertical slider 688A includes a first dotted-line portion 698A at 15 µV extending from t=0 to t=x, and a second dotted line portion 698B at 27 µV extending from t=x to the present (e.g., right-most) time.

Although not shown in FIG. 6L or 6M, in some examples, ECAP-signal graph 686 is configured to display a historical ECAP signal overlaid with the present ECAP signal 684 for comparison between the two signals. For instance, the historical ECAP signal may include one or more indicators highlighting particular values or behaviors of the historical ECAP signal. Additionally or alternatively, therapy-management application 346 may be configured to identify and indicate certain values or behaviors within the present ECAP signal 684, such as by identifying certain ECAP amplitude values or trends, and/or by comparing the present ECAP signal 684 to the historical ECAP signal.

As shown in FIGS. 6L and 6M, configure-thresholds screens 600L, 600M include a Sense/Active toggle 600. While in the "sense only" position of toggle 700, therapy-management application is configured to sense body signal (and determine ECAP signal 684) without actively adjusting stimulation amplitudes 694, e.g., in response to ECAP signal 684 crossing either of ECAP thresholds 688. While in this sense-only mode, target stimulation amplitudes 652 can be modified by the user. However, while in the "active" mode of toggle 700, in which therapy-management application 346 is actively modifying stimulation amplitudes 694 in response to values of ECAP signal 684, an attempt by the user to modify the target stimulation amplitudes 652 may cause therapy-management application 346 to output an indication that the stimulation amplitudes cannot be changed.

While in the "active" mode of toggle 700, therapy-management application 346 may be configured to display an active-status indicator 702 (e.g., FIGS. 6L, 6M) regardless of which screen of the GUI is active at the time. Similarly, while therapy-management application 346 is in a sense-only mode, the active screen (e.g., FIGS. 6I, 6J) displays a sensing-status indicator 704.

In some examples, therapy-management application 346 enables the user to customize a decremental rate-of-change of the stimulation amplitude 694 in response to ECAP signal 684 exceeding the ECAP-reaction threshold 688A, and/or an incremental rate-of-change of the stimulation amplitude 694 in response to ECAP signal 684 falling below the ECAP-recovery threshold 688B. For instance, by selecting the "Settings" icon 689 on either of screens 600L, 600M, therapy-management application 346 may load an advanced-settings window, an example of which is shown in FIG. 6N.

FIG. 6N shows an example advanced-settings screen 600N. Screen 600N includes a reaction-speed widget 706A and a recovery-speed widget 706B. In response to the user selecting the "Fast" settings 708A, 708B for each widget 706, therapy-management application 746 enacts a more-abrupt rate-of-change of the stimulation amplitude 694 in response to ECAP signal 684 crossing either of the two ECAP thresholds 688. Selection of the specific setting may cause the corresponding slope of the reaction speed and/or recovery speed to be highlighted as a visual indicator of the selected rate of change.

The following numbered examples illustrate systems, devices, and techniques of this disclosure.

Example 1: A method includes determining, by processing circuitry, evoked compound action potential (ECAP) data indicative of a plurality of ECAPs based on signals sensed from a patient; controlling, by the processing circuitry, a user interface to display the ECAP data over a time window; identifying, by the processing circuitry, an ECAP amplitude in the ECAP data at a specific time in the time window, wherein the ECAP amplitude exceeds a threshold amplitude; controlling, by the processing circuitry, the user interface to display a slidable marker that identifies the ECAP amplitude at the specific time over the displayed ECAP data, wherein the slidable marker is configured to be user-movable to different times within the time window; and controlling, by the processing circuitry, the user interface to display an ECAP waveform corresponding to the ECAP amplitude identified by the slidable marker.

Example 2: The method of example 1, wherein the threshold amplitude comprises an absolute amplitude value or a predetermined multiple above a baseline-noise amplitude within the ECAP data.

Example 3: The method of any of examples 1 and 2 or any of examples 1 and 2, further includes determining whether the ECAP data satisfies minimum criteria for containing a usable ECAP of the plurality of ECAPs for determining subsequent ECAP data; and displaying, via the user interface, an indication that the ECAP data includes the usable ECAP.

Example 4: The method of any of examples 1-3, wherein the slidable marker is configured to be user-movable to the different times within the time window, and wherein the different times within the time window indicate respective ones of the plurality of ECAPs.

Example 5: The method of any of examples 1-4, further includes determining a change in an amplitude of an electrical stimulation signal associated with the plurality of ECAPs during the time window; and outputting, via the user interface, an indication that the ECAP data should be re-captured.

Example 6: The method of any of examples 1-5, further includes a select-device screen; a select-flow screen; an electrode-placement screen; a capture-signal screen; a review-signal screen; and a configure-thresholds screen.

Example 7: The method of example 6, wherein the electrode-placement screen comprises: a Program-1 widget enabling a user to select first placements for first sensing electrodes and first stimulation electrodes relative to a representation of a spinal cord of the patient, and a first stimulation amplitude for a first stimulation therapy program associated with the first stimulation electrodes; a Program-2 widget enabling the user to select second placements for second sensing electrodes and second stimulation electrodes relative to the representation of the spinal cord, and a second stimulation amplitude for a second stimulation therapy program associated with the second stimulation electrodes; and a "Setup" button for actuating the capture-signal screen.

Example 8: The method of example 7, wherein the Program-1 widget and the Program-2 widget each comprise an adjustable wheel enabling the user to select the first and second stimulation amplitudes.

Example 9: The method of any of examples 7 and 8 or any of examples 7 and 8, wherein the Program-2 widget comprises one or more non-selectable electrode placements indicative of the first placements for the first sensing electrodes and first stimulation electrodes.

Example 10: The method of any of examples 6-9, wherein the capture-signal screen comprises an indication prompting the user to perform an aggressor action that causes a momentary intense sensation from stimulation configured to elicit a usable ECAP of the plurality of ECAPs.

Example 11: The method of any of examples 7-10, wherein the capture-signal screen comprises: an ECAP-signal graph displaying the ECAP data over the time window; a signal-quality-preview widget comprising the ECAP waveform corresponding to the ECAP amplitude identified by the slidable marker, and ECAP values associated with ECAP waveform; and a stimulation amplitude widget enabling the user to adjust a stimulation amplitude of an electrical stimulation signal configured to elicit the plurality of ECAPs.

Example 12: The method of example 11, wherein the electrical stimulation signal comprises first and second electrical stimulation signals comprising first and second stimulation amplitudes, respectively.

Example 13: The method of example 12, wherein the stimulation amplitude widget comprises a link toggle enabling the user to simultaneously adjust the first stimulation amplitude and the second stimulation amplitude.

Example 14: The method of example 13, wherein the link toggle preserves a difference between the first and second stimulation amplitudes.

Example 15: The method of any of examples 13 and 14, wherein the link toggle preserves a ratio between the first and second stimulation amplitudes.

Example 16: The method of any of examples 6-15, wherein the review-signal screen comprises a signal-quality graph includes the ECAP waveform; a low-point detection window indicating a local minimum amplitude of the ECAP waveform; a high-point detection window indicating a local maximum amplitude of the ECAP waveform; and a vertical range indicating a difference between the local maximum amplitude and the local minimum, wherein the difference equals the identified ECAP amplitude within the ECAP data.

Example 17: The method of example 16, wherein the signal-quality graph further comprises a third user input mechanism enabling a user to adjust relative positions of the low-point detection window and the high-point detection window within the defined time window.

Example 18: The method of any of examples 16 and 17 or any of examples 16 and 17, wherein the low-point and high-point detection windows further comprise respective indications of a relative start time of the detection window.

Example 19: The method of example 18, wherein the start time comprises an amount of time since a beginning of the respective detection window.

Example 20: The method of any of examples 18 and 19, wherein the start time comprises an amount of time since an end of a stimulation pulse eliciting the ECAP waveform.

Example 21: The method of any of examples 16-20, wherein detection windows comprise respective fixed widths based on one or more of an electrode configuration, a stimulation pulse width, an electrode lead type, and a derivative filter.

Example 22: The method of any of examples 6-21, wherein the review-signal screen further comprises a plurality of filter options for modifying the ECAP waveform.

Example 23: The method of example 22, further includes receiving selections for the plurality of filter options; determining a filtered ECAP waveform based on the selections; and configuring, based on the filtered ECAP waveform, ECAP parameters for determining subsequent ECAP data.

Example 24: The method of any of examples 22 and 23 or any of examples 22 and 23, wherein the plurality of filter options comprises: a noise-reduction filter configured to modify an amount of noise in the sensed signals; an artifact-reduction filter configured to modify a shape of the sensed signals to reduce stimulation artifacts; and a gain value configured to modify an amplification of the sensed signals.

Example 25: The method of example 24, wherein a selection for the noise-reduction filter indicates a number of received data samples of the sensed signal over which to be averaged.

Example 26: The method of example 25, wherein the selection for the noise-reduction filter comprises: a "low" selection indicating an average over 2 data samples; a "medium" selection indicating an average over 4 data samples; or a "high" selection indicating an average over 6 data samples.

Example 27: The method of any of examples 25 and 26 or any of examples 25 and 26, wherein the selection for the noise-reduction filter comprises a desired integer number of received data samples over which to be averaged.

Example 28: The method of any of examples 24-27, wherein the artifact-reduction filter comprises a derivative filter defining a predetermined coefficient value.

Example 29: The method of example 28, wherein the instructions further comprise a machine-learning model trained to refine the coefficient value based on the sensed signals.

Example 30: The method of any of examples 24-27, wherein the artifact-reduction filter comprises a derivative filter defining a user-specified coefficient value.

Example 31: The method of any of examples 24-30, wherein the artifact-reduction filter comprises a plurality of derivative filters defining a respective coefficient value for each of a plurality of selected electrode configurations.

Example 32: The method of any of examples 24-31, wherein a selection for the gain value indicates a predetermined high gain value or a predetermined low gain value.

Example 33: The method of any of examples 24-31, wherein a selection for the gain value comprises a user-specified gain value.

Example 34: The method of any of examples 24-31, wherein a selection for the gain value comprises applying the gain value based on a posture state of the patient.

Example 35: The method of any of examples 24-31, wherein a selection for the gain value comprises an indication to apply a predetermined gain value in response to determining whether a stimulation amplitude is increasing or decreasing.

Example 36: The method of any of examples 24-31, wherein a selection for the gain value comprises an indication to apply a predetermined gain value associated with a cervical spine electrical stimulator.

Example 37: The method of any of examples 24-31, wherein a selection for the gain value comprises an indication to apply a predetermined gain value associated with a surgical lead.

Example 38: The method of any of examples 24-31, wherein a selection for the gain value comprises an indication to automatically adjust a gain value based on a saturation of the sensed signal.

Example 39: The method of any of examples 24 through 38, further includes a "medium" selection for the noise-reduction filter; an "on" selection for the artifact-reduction filter; and a "high" selection for the gain value.

Example 40: The method of any of examples 22-39, further includes receiving user selections for the plurality of filter options; prompting the user to re-capture the sensed signals; and receiving subsequent filtered sensed signals according to the user selections for the plurality of selectable filters.

Example 41: The method of any of examples 22-39, further includes receiving user selections for the plurality of selectable filters; and modifying the sensed signals according to the user selections.

Example 42: The method of any of examples 22-41, further includes receiving user selections for the plurality of filter options; and updating a set of preview images of the ECAP data and the ECAP waveform based on the user selections.

Example 43: The method of example 42, wherein the preview images comprise patient-specific preview images.

Example 44: A system includes a memory; and processing circuitry coupled to the memory and configured to: determine evoked compound action potential (ECAP) data indicative of a plurality of ECAPs based on signals sensed from a patient; control a user interface to display the ECAP data over a time window; identify an ECAP amplitude in the ECAP data at a specific time in the time window, wherein the ECAP amplitude exceeds a threshold amplitude; control the user interface to display a slidable marker that identifies the ECAP amplitude at the specific time over the displayed ECAP data, wherein the slidable marker is configured to be user-movable to different times within the time window; and control the user interface to display an ECAP waveform corresponding to the ECAP amplitude identified by the slidable marker.

Example 45: The system of example 44, wherein the threshold amplitude comprises an absolute amplitude value or a predetermined multiple above a baseline-noise amplitude within the ECAP data.

Example 46: The system of any of examples 44 and 45, wherein the processing circuitry is configure configured to: determine whether the ECAP data satisfies minimum criteria for containing a usable ECAP of the plurality of ECAPs for determining subsequent ECAP data; and control a display device to displaying, via the user interface, an indication that the ECAP data includes the usable ECAP.

Example 47: The system of any of examples 44 through 46, wherein the slidable marker is configured to be user-movable to the different times within the time window, and wherein the different times within the time window indicate respective ones of the plurality of ECAPs.

Example 48: The system of any of examples 44 through 47, wherein the processing circuitry is configure configured to: determine a change in an amplitude of an electrical stimulation signal associated with the plurality of ECAPs during the time window; and output, via the user interface, an indication that the ECAP data should be re-captured.

Example 49: The system of any of examples 44 through 48, further includes a select-device screen; a select-flow screen; an electrode-placement screen; a capture-signal screen; a review-signal screen; and a configure-thresholds screen.

Example 50: The system of example 49, wherein the electrode-placement screen comprises: a Program-1 widget enabling a user to select first placements for first sensing electrodes and first stimulation electrodes relative to a representation of a spinal cord of the patient, and a first stimulation amplitude for a first stimulation therapy program associated with the first stimulation electrodes; a Program-2 widget enabling the user to select second placements for second sensing electrodes and second stimulation electrodes relative to the representation of the spinal cord, and a second stimulation amplitude for a second stimulation therapy program associated with the second stimulation electrodes; and a "Setup" button for actuating the capture-signal screen.

Example 51: The system of example 50, wherein the Program-1 widget and the Program-2 widget each comprise an adjustable wheel enabling the user to select the first and second stimulation amplitudes.

Example 52: The system of any of examples 49 through 51, wherein the Program-2 widget comprises one or more non-selectable electrode placements indicative of the first placements for the first sensing electrodes and first stimulation electrodes.

Example 53: The system of any of examples 49 through 52, wherein the capture-signal screen comprises an indication prompting the user to perform an aggressor action that causes a momentary intense sensation from stimulation configured to elicit a usable ECAP of the plurality of ECAPs.

Example 54: The system of any of examples 50 through 53, wherein the capture-signal screen comprises: an ECAP-signal graph displaying the ECAP data over the time window; a signal-quality-preview widget comprising the ECAP waveform corresponding to the ECAP amplitude identified by the slidable marker, and ECAP values associated with ECAP waveform; and a stimulation amplitude widget enabling the user to adjust a stimulation amplitude of an electrical stimulation signal configured to elicit the plurality of ECAPs.

Example 55: The system of example 54, wherein the electrical stimulation signal comprises first and second electrical stimulation signals comprising first and second stimulation amplitudes, respectively.

Example 56: The system of any of examples 54 and 55, wherein the stimulation amplitude widget comprises a link toggle enabling the user to simultaneously adjust the first stimulation amplitude and the second stimulation amplitude.

Example 57: The system of example 56, wherein the link toggle preserves a difference between the first and second stimulation amplitudes.

Example 58: The system of any of examples 56 and 57, wherein the link toggle preserves a ratio between the first and second stimulation amplitudes.

Example 59: The system of any of examples 44 through 58, wherein the review-signal screen comprises a signal-quality graph includes the ECAP waveform; a low-point detection window indicating a local minimum amplitude of the ECAP waveform; a high-point detection window indicating a local maximum amplitude of the ECAP waveform; and a vertical range indicating a difference between the local maximum amplitude and the local minimum, wherein the difference equals the identified ECAP amplitude within the ECAP data.

Example 60: The system of example 59, wherein the signal-quality graph further comprises a third user input mechanism enabling a user to adjust relative positions of the low-point detection window and the high-point detection window within the defined time window.

Example 61: The system of any of examples 59 and 60, wherein the low-point and high-point detection windows further comprise respective indications of a relative start time of the detection window.

Example 62: The system of example 61, wherein the start time comprises an amount of time since a beginning of the respective detection window.

Example 63: The method of any of examples 61 and 62, wherein the start time comprises an amount of time since an end of a stimulation pulse eliciting the ECAP waveform.

Example 64: The system of any of examples 59 through 63, wherein detection windows comprise respective fixed widths based on one or more of an electrode configuration, a stimulation pulse width, an electrode lead type, and a derivative filter.

Example 65: The system of any of examples 48-64, wherein the review-signal screen further comprises a plurality of filter options for modifying the ECAP waveform.

Example 66: The system of example 65, wherein the processing circuitry is configure configured to: receive selections for the plurality of filter options; determine a filtered ECAP waveform based on the selections; and configure, based on the filtered ECAP waveform, ECAP parameters for determining subsequent ECAP data.

Example 67: The system of any of examples 65 and 66, wherein the plurality of filter options comprises: a noise-reduction filter configured to modify an amount of noise in the sensed signals; an artifact-reduction filter configured to modify a shape of the sensed signals to reduce stimulation artifacts; and a gain value configured to modify an amplification of the sensed signals.

Example 68: The system of example 67, wherein a selection for the noise-reduction filter indicates a number of received data samples of the sensed signal over which to be averaged.

Example 69: The system of example 68, wherein the selection for the noise-reduction filter comprises: a "low" selection indicating an average over 2 data samples; a "medium" selection indicating an average over 4 data samples; or a "high" selection indicating an average over 6 data samples.

Example 70: The system of any of examples 67 through 69, wherein the selection for the noise-reduction filter comprises a desired integer number of received data samples over which to be averaged.

Example 71: The system of any of examples 67, wherein the artifact-reduction filter comprises a derivative filter defining a predetermined coefficient value.

Example 72: The system of example 71, wherein the instructions further comprise a machine-learning model trained to refine the coefficient value based on the sensed signals.

Example 73: The system of any of examples 67 through 72, wherein the artifact-reduction filter comprises a derivative filter defining a user-specified coefficient value.

Example 74: The system of any of examples 67 through 73, wherein the artifact-reduction filter comprises a plurality of derivative filters defining a respective coefficient value for each of a plurality of selected electrode configurations.

Example 75: The system of any of examples 67 through 74, wherein a selection for the gain value indicates a predetermined high gain value or a predetermined low gain value.

Example 76: The system of any of examples 67 through 75, wherein a selection for the gain value comprises a user-specified gain value.

Example 77: The system of any of examples 67 through 76, wherein a selection for the gain value comprises applying the gain value based on a posture state of the patient.

Example 78: The system of any of examples 67 through 77, wherein a selection for the gain value comprises an indication to apply a predetermined gain value in response to determining whether a stimulation amplitude is increasing or decreasing.

Example 79: The system of any of examples 67 through 78, wherein a selection for the gain value comprises an indication to apply a predetermined gain value associated with a cervical spine electrical stimulator.

Example 80: The system of any of examples 67 through 79, wherein a selection for the gain value comprises an indication to apply a predetermined gain value associated with a surgical lead.

Example 81: The system of any of examples 67 through 80, wherein a selection for the gain value comprises an indication to automatically adjust a gain value based on a saturation of the sensed signal.

Example 82: The system of any of examples 67 through 81, further includes a "medium" selection for the noise-reduction filter; an "on" selection for the artifact-reduction filter; and a "high" selection for the gain value.

Example 83: The system of any of examples 67 through 82, wherein the processing circuitry is configure configured to: receive user selections for the plurality of filter options; prompt the user to re-capture the sensed signals; and receive subsequent filtered sensed signals according to the user selections for the plurality of selectable filters.

Example 84: The system of any of examples 67 through 83, wherein the processing circuitry is configure configured to: receive user selections for the plurality of selectable filters; and modify the sensed signals according to the user selections.

Example 85: The system of any of examples 67 through 84, further includes receive user selections for the plurality of filter options; and update a set of preview images of the ECAP data and the ECAP waveform based on the user selections.

Example 86: The system of example 85, wherein the preview images comprise patient-specific preview images.

Example 87: A non-transitory, computer-readable medium including instructions that, when executed, cause processing circuitry to determine evoked compound action potential (ECAP) data indicative of a plurality of ECAPs based on signals sensed from a patient; control a user interface to display the ECAP data over a time window; identify an ECAP amplitude in the ECAP data at a specific time in the time window, wherein the ECAP amplitude exceeds a threshold amplitude; control the user interface to display a slidable marker that identifies the ECAP amplitude at the specific time over the displayed ECAP data, wherein the slidable marker is configured to be user-movable to different times within the time window; and control the user interface to display an ECAP waveform corresponding to the ECAP amplitude identified by the slidable marker.

The techniques described in this disclosure may be implemented, at least in part, in hardware, software, firmware, or any combination thereof. For example, various aspects of the techniques may be implemented within one or more microprocessors, DSPs, ASICs, FPGAs, or any other equivalent integrated or discrete logic QRS circuitry, as well as any combinations of such components, embodied in external devices, such as physician or patient programmers, stimulators, or other devices. The terms "processor" and "processing circuitry" may generally refer to any of the foregoing logic circuitry, alone or in combination with other logic circuitry, or any other equivalent circuitry, and alone or in combination with other digital or analog circuitry.

For aspects implemented in software, at least some of the functionality ascribed to the systems and devices described in this disclosure may be embodied as instructions on a computer-readable storage medium such as RAM, DRAM, SRAM, FRAM, magnetic discs, optical discs, flash memory, or forms of EPROM or EEPROM. The instructions may be executed to support one or more aspects of the functionality described in this disclosure.

In addition, in some aspects, the functionality described herein may be provided within dedicated hardware and/or software modules. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components. Also, the techniques could be fully implemented in one or more circuits or logic elements. The techniques of this disclosure may be implemented in a wide variety of devices or apparatuses, including an IMD, an external programmer, a combination of an IMD and external programmer, an integrated circuit (IC) or a set of ICs, and/or discrete electrical circuitry, residing in an IMD and/or external programmer.

What is claimed is:

1. A method comprising:
    determining, by processing circuitry, evoked compound action potential (ECAP) data indicative of a plurality of ECAPs based on signals sensed from a patient;
    controlling, by the processing circuitry, a user interface to display the ECAP data over a time window;
    identifying, by the processing circuitry, an ECAP amplitude in the ECAP data at a specific time in the time window, wherein the ECAP amplitude exceeds a threshold amplitude;
    controlling, by the processing circuitry, the user interface to display a slidable marker that identifies the ECAP amplitude at the specific time over the displayed ECAP data, wherein the slidable marker is configured to be user-movable to different times within the time window; and
    controlling, by the processing circuitry, the user interface to display an ECAP waveform corresponding to the ECAP amplitude identified by the slidable marker.

2. The method of claim 1, wherein the threshold amplitude comprises an absolute amplitude value or a predetermined multiple above a baseline-noise amplitude within the ECAP data.

3. The method of claim 1, further comprising:
    determining whether the ECAP data satisfies minimum criteria for containing a usable ECAP of the plurality of ECAPs for determining subsequent ECAP data; and
    displaying, via the user interface, an indication that the ECAP data includes the usable ECAP.

4. The method of claim 1, wherein the slidable marker is configured to be user-movable to the different times within the time window, and wherein the different times within the time window indicate respective ones of the plurality of ECAPs.

5. The method of claim 1, further comprising:
    determining a change in an amplitude of an electrical stimulation signal associated with the plurality of ECAPs during the time window; and
    outputting, via the user interface, an indication that the ECAP data should be re-captured.

6. The method of claim 1, further comprising displaying, by the processing circuitry via the user interface, a graphical user interface (GUI) of a therapy-management application, wherein the GUI comprises a plurality of screens comprising:
    a select-device screen;
    a select-flow screen;
    an electrode-placement screen;
    a capture-signal screen;
    a review-signal screen; and
    a configure-thresholds screen.

7. The method of claim 6, wherein the electrode-placement screen comprises:
    a Program-1 widget enabling a user to select first placements for first sensing electrodes and first stimulation electrodes relative to a representation of a spinal cord of the patient, and a first stimulation amplitude for a first stimulation therapy program associated with the first stimulation electrodes;
    a Program-2 widget enabling the user to select second placements for second sensing electrodes and second stimulation electrodes relative to the representation of the spinal cord, and a second stimulation amplitude for a second stimulation therapy program associated with the second stimulation electrodes; and
    a "Setup" button for actuating the capture-signal screen.

8. The method of claim 6, wherein the review-signal screen comprises a signal-quality graph comprising:
    the ECAP waveform;
    a low-point detection window indicating a local minimum amplitude of the ECAP waveform;
    a high-point detection window indicating a local maximum amplitude of the ECAP waveform; and
    a vertical range indicating a difference between the local maximum amplitude and the local minimum, wherein the difference equals the identified ECAP amplitude within the ECAP data.

9. The method of claim 6, wherein the review-signal screen further comprises a plurality of filter options for modifying the ECAP waveform.

10. The method of claim 9, further comprising:
    receiving selections for the plurality of filter options;
    determining a filtered ECAP waveform based on the selections; and
    configuring, based on the filtered ECAP waveform, ECAP parameters for determining subsequent ECAP data.

11. A system comprising:
    a memory; and
    processing circuitry coupled to the memory and configured to:
    determine evoked compound action potential (ECAP) data indicative of a plurality of ECAPs based on signals sensed from a patient;
    control a user interface to display the ECAP data over a time window;
    identify an ECAP amplitude in the ECAP data at a specific time in the time window, wherein the ECAP amplitude exceeds a threshold amplitude;
    control the user interface to display a slidable marker that identifies the ECAP amplitude at the specific time over the displayed ECAP data, wherein the slidable marker is configured to be user-movable to different times within the time window; and
    control the user interface to display an ECAP waveform corresponding to the ECAP amplitude identified by the slidable marker.

12. The system of claim 11, wherein the threshold amplitude comprises an absolute amplitude value or a predetermined multiple above a baseline-noise amplitude within the ECAP data.

13. The system of claim 11, wherein the processing circuitry is configure configured to:
determine whether the ECAP data satisfies minimum criteria for containing a usable ECAP of the plurality of ECAPs for determining subsequent ECAP data; and
control a display device to displaying, via the user interface, an indication that the ECAP data includes the usable ECAP.

14. The system of claim 11, wherein the slidable marker is configured to be user-movable to the different times within the time window, and wherein the different times within the time window indicate respective ones of the plurality of ECAPs.

15. The system of claim 11, wherein the processing circuitry is configure configured to:
determine a change in an amplitude of an electrical stimulation signal associated with the plurality of ECAPs during the time window; and
output, via the user interface, an indication that the ECAP data should be re-captured.

16. The system of claim 11, further comprising a display device, wherein the processing circuitry is configured to control the display device to display, via the user interface, a graphical user interface (GUI) of a therapy-management application, wherein the GUI comprises a plurality of screens comprising:
a select-device screen;
a select-flow screen;
an electrode-placement screen;
a capture-signal screen;
a review-signal screen; and
a configure-thresholds screen.

17. The system of claim 16, wherein the electrode-placement screen comprises:
a Program-1 widget enabling a user to select first placements for first sensing electrodes and first stimulation electrodes relative to a representation of a spinal cord of the patient, and a first stimulation amplitude for a first stimulation therapy program associated with the first stimulation electrodes;
a Program-2 widget enabling the user to select second placements for second sensing electrodes and second stimulation electrodes relative to the representation of the spinal cord, and a second stimulation amplitude for a second stimulation therapy program associated with the second stimulation electrodes; and
a "Setup" button for actuating the capture-signal screen.

18. The system of claim 16, wherein the review-signal screen comprises a signal-quality graph comprising:
the ECAP waveform;
a low-point detection window indicating a local minimum amplitude of the ECAP waveform;
a high-point detection window indicating a local maximum amplitude of the ECAP waveform; and
a vertical range indicating a difference between the local maximum amplitude and the local minimum, wherein the difference equals the identified ECAP amplitude within the ECAP data.

19. The system of claim 16, wherein the review-signal screen further comprises a plurality of filter options for modifying the ECAP waveform.

20. A non-transitory, computer-readable medium comprising instructions that, when executed by a processor, cause the processor to:
determine evoked compound action potential (ECAP) data indicative of a plurality of ECAPs based on signals sensed from a patient;
control a user interface to display the ECAP data over a time window;
identify an ECAP amplitude in the ECAP data at a specific time in the time window, wherein the ECAP amplitude exceeds a threshold amplitude;
control the user interface to display a slidable marker that identifies the ECAP amplitude at the specific time over the displayed ECAP data, wherein the slidable marker is configured to be user-movable to different times within the time window; and
control the user interface to display an ECAP waveform corresponding to the ECAP amplitude identified by the slidable marker.

\* \* \* \* \*